United States Patent
Fujiwara et al.

(10) Patent No.: US 7,092,982 B2
(45) Date of Patent: Aug. 15, 2006

(54) STORAGE SYSTEM WITH METHOD OF MINIMIZING REDUNDANT TRANSMISSIONS OVER A PLURALITY OF COMMUNICATION PATHS

(75) Inventors: Keisei Fujiwara, Kawasaki (JP); Kenta Shiga, Tokyo (JP); Atsuya Kumagai, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 10/884,474

(22) Filed: Jul. 1, 2004

(65) Prior Publication Data

US 2005/0240681 A1 Oct. 27, 2005

(30) Foreign Application Priority Data

Apr. 27, 2004 (JP) ............... 2004-131240

(51) Int. Cl.
*G06F 15/16* (2006.01)
*G06F 11/00* (2006.01)
*G06F 12/00* (2006.01)

(52) U.S. Cl. ............. 709/200; 711/162; 714/6
(58) Field of Classification Search ............ None
See application file for complete search history.

(56) References Cited

U.S. PATENT DOCUMENTS

| | | | |
|---|---|---|---|
| 6,157,962 A | 12/2000 | Hodges et al. | |
| 6,601,187 B1 * | 7/2003 | Sicola et al. | 714/6 |
| 6,775,230 B1 * | 8/2004 | Watanabe et al. | 370/228 |
| 6,859,865 B1 | 2/2005 | De Margerie et al. | |
| 6,883,065 B1 | 4/2005 | Pittelkow et al. | |
| 6,883,108 B1 * | 4/2005 | Lee et al. | 714/4 |
| 2005/0078653 A1 * | 4/2005 | Agashe et al. | 370/349 |

FOREIGN PATENT DOCUMENTS

JP 2003-124964 4/2003

OTHER PUBLICATIONS

Hufferd iSCSI: *The Universal Storage Connection* Addison-Wesley pub., pp. 52-55, figure 4-3 (2003).

* cited by examiner

*Primary Examiner*—Wen-Tai Lin
(74) *Attorney, Agent, or Firm*—Townsend and Townsend and Crew LLP

(57) ABSTRACT

Each of the storage devices 1, 2 is provided with transmission queues 306a, 306b with respect to each of transmission paths A and B. The storage device 1 stores identical request data in each of the transmission queues 306a and 306b, and transmits each data to the counterpart storage device 2, respectively via the transmission path A and B (S811, 812). The storage device 2, being a counterpart, stores the request data or response data arrived earlier in the receive history information table 300 (S817), and discards the request data arrived later (S903, 904). Furthermore, if the storage device 1, being a transmission source, receives at least one response data against the request data, the storage device 1 searches the transmission queues 306a, 306b, and if there remains request data in any of the transmission queue, deletes the request data (S909).

20 Claims, 39 Drawing Sheets

FIG.2A REMOTE COPY INFORMATION TABLE 305

| MASTER NODE NAME (3051) | MASTER LOGICAL DEVICE ID (3052) | REMOTE NODE NAME (3053) | REMOTE LOGICAL DEVICE ID (3054) |
|---|---|---|---|
| X1 | sdb1 | Y1 | sdb2 |
| X1 | sdc1 | Y2 | sdb1 |
| ... | ... | ... | ... |

(3050)

FIG.2B REQUEST INFORMATION TABLE 304

| REQUEST TAG (3041) | FIRST MEMORY ADDRESS (3042) | DATA LENGTH (3043) | PROCESSED DATA LENGTH (3044) |
|---|---|---|---|
| p1 | 150000 | 50000 | 7000 |
| p2 | 200000 | 50000 | 3000 |
| ... | ... | ... | ... |

(3040)

FIG.2C RESPONSE INFORMATION TABLE 303

| RESPONSE TAG (3031) | LOGICAL DEVICE ID (3032) | LOGICAL BLOCK ADDRESS (3033) | DATA LENGTH (3034) | PROCESSED DATA LENGTH (3035) |
|---|---|---|---|---|
| q1 | sdb2 | 1000 | 50000 | 7000 |
| q2 | sda2 | 2000 | 50000 | 3000 |
| ... | ... | ... | ... | ... |

(3030)

FIG.2D SESSION INFORMATION TABLE 302

| SESSION ID (3021) | MASTER NODE ID (3022) | MASTER IP ADDRESS (3023) | MASTER PORT NUMBER (3024) | REMOTE NODE NAME (3025) | REMOTE IP ADDRESS (3026) | REMOTE PORT NUMBER (3027) | TRANSMISSION QUEUE ADDRESS (3028) |
|---|---|---|---|---|---|---|---|
| S1 | X1 | 211.1.1.20 | 10000 | Y1 | 178.1.8.15 | 12000 | 1000 |
| S2 | X1 | 211.1.2.20 | 11000 | Y1 | 178.1.9.15 | 13000 | 2000 |
| ... | ... | ... | ... | ... | ... | ... | ... |

(3020)

| GATEWAY IP ADDRESS (3029) | TIMEOUT VALUE (302a) |
|---|---|
| 211.1.1.1 | 10 |
| 211.1.2.1 | 10 |
| ... | ... |

FIG.2E TRANSMISSION QUEUE INFORMATION TABLE 301

| SEQUENCE CONTROL TAG (3012) | TASK TAG (3013) | COMMAND ADDRESS (3014) |
|---|---|---|
| 1 | p1 | 15000 |
| 2 | p1 | 17000 |
| : | : | : |
| 7 | p2 | 20000 |

(3010, 3011)

FIG.2F RECEIVE HISTORY INFORMATION TABLE 300

| SEQUENCE CONTROL TAG (3001) | TASK TAG (3002) | RETURN FLAG (3003) | HISTORY HOLDING COUNTER (3004) | HISTORY HOLDING TIMEOUT (3005) |
|---|---|---|---|---|
| 1 | p1 | 0 | 2 | 1 |
| 2 | p1 | 1 | 1 | 8 |
| ... | ... | ... | ... | ... |

REMOTE COPY INFORMATION SETTING WINDOW — G300

- MASTER NODE NAME — G301
- MASTER LOGICAL DEVICE ID — G302
- REMOTE NODE NAME — G303
- REMOTE LOGICAL DEVICE ID — G304

PATH 1 (G305)
- MASTER IP ADDRESS — G310
- MASTER PORT NUMBER — G311
- MASTER GATEWAY IP ADDRESS — G312
- REMOTE IP ADDRESS — G313
- REMOTE PORT NUMBER — G314
- REMOTE GATEWAY IP ADDRESS — G315
- TIMEOUT VALUE — G316

PATH 2 (G306)
- MASTER IP ADDRESS — G320
- MASTER PORT NUMBER — G321
- MASTER GATEWAY IP ADDRESS — G322
- REMOTE IP ADDRESS — G323
- REMOTE PORT NUMBER — G324
- REMOTE GATEWAY IP ADDRESS — G325
- TIMEOUT VALE — G326

OK (G307)   CANCEL (G308)

REMOTE COPY SEQUENCE (3/3)

TRANSMISSION AVAILABLE STATUS NOTICE PROCESSING iSCSI DECAPSULATION PROCESSING

REDUNDANT COMMAND RECEIVE PROCESSING (1/2)

FIG.27A STORAGE ACCESS INFORMATION TABLE 355, 360

3550

| HOST NAME (3551) | HOST LOGICAL DEVICE ID (3552) | STORAGE NAME (3553) | STORAGE LOGICAL DEVICE ID (3554) |
|---|---|---|---|
| X1 | sdb1 | Y1 | sdb2 |
| X1 | sdc1 | Y2 | sdb1 |
| ... | ... | ... | ... |

FIG.27B SESSION INFORMATION TABLE 353, 358

3520

| SESSION ID (3521) | HOST NAME (3522) | HOST IP ADDRESS (3523) | HOST PORT NUMBER (3524) | STORAGE NAME (3525) | STORAGE IP ADDRESS (3526) | STORAGE PORT NUMBER (3527) | TRANSMISSION QUEUE ADDRESS (3528) |
|---|---|---|---|---|---|---|---|
| S1 | X1 | 211.1.1.20 | 10000 | Y1 | 211.1.1.21 | 12000 | 1000 |
| S2 | X1 | 211.1.2.20 | 11000 | Y1 | 211.1.2.21 | 13000 | 2000 |
| ... | ... | ... | ... | ... | ... | ... | ... |

| TIMEOUT VALUE (3029) |
|---|
| 10 |
| 10 |
| ... |

Read SEQUENCE (2/2)

DATA READOUT RESPONSE TRANSMISSION PROCESSING

STORAGE SYSTEM WITH METHOD OF MINIMIZING REDUNDANT TRANSMISSIONS OVER A PLURALITY OF COMMUNICATION PATHS

This application claims a priority based on Japanese Patent Application No. 2004-131240 filed on Apr. 27, 2004, the entire contents of which are incorporated herein by reference for all purpose.

BACKGROUND

The present invention relates to a communication device which sends transmission data including an identifier to other communication device, via a plurality of different communication paths, an operating program in the communication device, and a communication method thereof.

As information technology penetrates into key business operations in corporations and organizations, both volume and importance of electronic data possessed by the corporations and organizations are on the increase. It is necessary to hold an accurate copy of the data so that the possessed data can be protected and restored immediately, in the case where a large scale disaster such as an earthquake, power outage and terrorism has occurred.

Usually, in such a process of data copying as described above, a remote copy technique is employed among a plurality of storage devices which store data, and data in one storage device is copied to the other storage device or devices. Those plurality of storage devices are respectively installed at sites, being some distance geographically away from one another (for example, hundreds of miles), so as to localize the damage of disaster. At each site, in addition to the storage device for storing data, there is installed a computer (hereinafter referred to as a "host") for accessing the storage device. A leased line, a wide area Ethernet, or a Wide Area Network (WAN), for example, the Internet, establishes connection among each site. Generally in this remote copy technique, a storage device which stores an original of data is referred to as "master storage device", a host which is connected to the master storage device is referred to as "master host", and a site where the master storage device and the master host are installed is referred to as "master site". In addition, a storage device which stores a copy of data is referred to as "remote storage device", a host which is connected to the remote storage device is referred to as "remote host", and a site where the remote storage device and the remote host are installed is referred to as "remote site".

This sort of remote copy as described above may include synchronous remote copy and asynchronous remote copy. Differences therebetween is found in a process from when the master storage device receives a write processing request from the master host until when the master storage device responds to the master host. In the synchronous remote copy, when the master storage device receives the write processing request from an application such as a database of the master host, the master storage device firstly copies the write data to the remote storage device, and then responds to the host. On the other hand, in the asynchronous remote copy, when the master storage device receives the write processing request from the master host, the master storage device saves the write data in the memory thereof, and immediately thereafter responds to the master host. Subsequently, the master storage device copies the write data thus saved in the memory to the remote storage device, and erases the saved data.

Usually, in order to prevent a loss of important data, a protocol which ensures reliability, such as TCP (Transmission Control Protocol)/IP (Internet Protocol), is utilized in the intersite communication in the remote copy system. The TCP/IP is described in "iSCSI: The Universal Storage Connection", authored by John L. Hufferd, published by Addison-Wesley, 2003, P.52–55, FIG. 4-3. Specifically, in the TCP/IP, a send side device holds a copy of transmission data in a memory, and repeats retransmission until the send side device receives acknowledgement of receipt from a receive side device, thereby assuring reliability.

However, in the TCP/IP communication, there is a case that the remote copy data may stagnate due to a property of congestion control of Transmission Control Protocol as described in RFC2581 (pages 3 to 7). That is, the TCP has a property that at a time when packet discarding occurs, associated with a congestion in a network or a failure in any of the devices configuring the network (switches, routers and the like configuring the LAN or WAN), a send side device drastically reduces a transmission rate, and thereafter retransmits the packet. With this property, throughput degradation due to the transmission rate reduction and response time increase by retransmitting the packet may occur at the time of congestion and/or failure. Such throughput degradation and/or response time increase as described above may cause the remote copy communications to stagnate.

When the remote copy communications stagnates, a response from the master storage device to the master host, as to a write processing request from the master host, may be delayed and there is a possibility that the application of the master host may be suspended. Specifically, in the synchronous remote copy as described above, since the master storage device responds to the master host after the remote copy is carried out, stagnation of the remote copy communication may cause a stagnation of the response to the master host.

On the other hand, in asynchronous remote copy, when the remote copy communication stagnates, data transmission amount is reduced, and the memory of the master storage device may be saturated with non erased data. As a result, the data cannot be saved in the memory any more, and responding to the master host may be stagnated. If such stagnation occurs in responding to the master host, write processing cannot be completed and timeout may occur in critical applications such as database, which are executed by the master host, and there is a possibility that those applications are suspended.

In view of the situations above, it is important to provide a technique for preventing a stagnation of remote copy communication in the intersite communications in the remote copy system, the stagnation being caused by the throughput degradation and response time increase due to a property of TCP/IP at the time of network congestion and/or failure.

A technique for handling a failure in equipment constituting a network is described, for example, in the Japanese Patent Laid-Open Publication No. 2003-124964 (FIG. 1, FIG. 3), as the following. This technique comprises a method which implements redundancy in a network line, by employing a control device (for example, a device in which redundancy is implemented by use of a plurality of Ethernet lines of 10/100 Mbps, which will be referred to as "line redundant device", hereinafter), for providing an upper level layer (e.g., applications) with physically multiple network lines functioning as a logically one line. With this method, at the time of sending, failure information of the entire network lines under control is firstly referred to, and then, identical data is transmitted to all the lines where no failure has occurred. On the other hand, at the time of receiving, the upper level layer (application) is notified of one of a plurality of identical data items (generally, the earliest arriving normal data item), which are received from multiple network lines, and the other identical data items are discarded.

SUMMARY

In the Japanese Patent Laid-Open Publication No. 2003-124964, the identical data items are transmitted to all the network lines without any failure, out of a plurality of network lines used for the communication, regardless of difference in transmission rate. Therefore, a waiting time for sending the data to the network line with a lowered transmission rate becomes longer than that for sending the data to the network line the transmission rate of which has not been lowered. Then, the data items sent to the network line whose transmission rate has not been lowered arrive earlier continuously, causing a large difference in response time among the multiple network lines. If a network line having a high transmission rate fails and stops the data transmission, the remote copy communication is forced to wait for a long time until the data arrives from the network line with lowered transmission rate. Therefore, the response time is largely elongated, and the remote copy communications stagnate. As a result, there is a possibility that an important application of the host, such as a database, is suspended. When such important application is suspended, data critical for corporations or organizations may be lost, and there is a problem that such corporations or organizations may suffer from an enormous damage.

Furthermore, in the technique as described in the Japanese Patent Laid-Open Publication No. 2003-124964 (FIG. 1, FIG. 3), as mentioned above, since identical data items are transmitted to all the network lines without any failure, regardless of difference in transmission rate, there is also a problem that data amount in the network becomes large, and the transmission rate for the network as a whole may be deteriorated.

In order to solve the above problems, the following configuration is suggested as one embodiment of the present invention. That is, the present invention is directed to a communication device which sends transmission data including an identifier to other communication device, via a plurality of different communication paths, comprising, transmission data storage areas which are respectively provided on the plurality of communication paths and store the transmission data temporarily, a redundant means which stores the transmission data in each of the plurality of transmission data storage areas, a send/receive control means which transmits the transmission data stored in each of the plurality of transmission data storage areas to the other communication device via a plurality of different communication paths, and also receives receive data including an identifier from the other communication device via the plurality of different communication paths, a redundant receive processing means which compares the identifier in the receive data received by the send/receive control means with the identifier in the transmission data, and when it is determined that the receive data is the one associated with the transmission data, searches the plurality of transmission data storage areas to find whether any of the transmission data storage areas stores the transmission data including the identifier associated with the identifier of the receive data, and when it is found that the transmission data is stored, deletes the transmission data.

As another embodiment of the present invention, it is directed to a communication device which sends transmission data including an identifier to other communication device, via a plurality of different communication paths, comprising, transmission queues which are provided respectively on the plurality of different communication paths and temporarily store the transmission data, and a processor which controls a communication with the other communication device, wherein, the processor executes, a redundant processing step which stores the transmission data in each of the plurality of transmission queues, a send/receive control step which sends the transmission data stored in each of the plurality of transmission queues to the other communication device via the plurality of different communication paths, and receives receive data including an identifier from the other communication device via the plurality of communication paths, and a redundant receive processing step which determines from the identifier in the receive data received in the send/receive control step that the receive data is the one associated with certain transmission data, searches the plurality of transmission queues to find whether any of the transmission queues stores the transmission data including the identifier associated with the identifier of the receive data, and when it is found the transmission data is stored, deletes the transmission data.

Further in the aforementioned embodiment, the present invention may be configured to provide a receive history information table, which stores a history of the receive data received in the send/receive control step, and in the redundant receive processing step, it is determined from the identifier of the receive data received in the send/receive control step, whether or not identical receive data has already been stored in the receive history information table, when the identical receive data is stored, the receive data come in later is deleted, and when the identical receive data is not stored, information as to the receive data is stored in the receive history information table.

As another embodiment of the present invention, it may be configured with a communication method which sends transmission data including an identifier, from one communication device to other communication device, via a plurality of different communication paths, comprising, a redundant processing step which stores transmission data in each of a plurality of transmission queues respectively provided to the plurality of communication paths, a send/receive control step which sends the transmission data stored in each of the plurality of transmission queues to the other communication device via the plurality of different communication paths, and receives receive data including an identifier from the other communication device via the plurality of communication paths, and a redundant receive processing step which determines from the identifier in the receive data received in the send/receive control step that the receive data is the one associated with certain transmission data, searches the plurality of transmission queues to find whether any of the transmission queues stores the transmission data including the identifier associated with the identifier of the receive data, and when it is found the transmission data is stored, deletes the transmission data.

BRIEF DESCRIPTION OF THE DRAWINGS

FIGS. 2A to 2F include explanatory views showing each structure of various tables according to the first embodiment of the present invention:

FIG. 2A is a view showing a structure of remote copy information table;

FIG. 2B is a view showing a structure of request information table;

FIG. 2C is a view showing a structure of response information table;

FIG. 2D is a view showing a structure of session information table;

FIG. 2E is a view showing a structure of transmission queue information table; and FIG. 2F is a view showing a structure of receive history information table.

FIG. 3 is an explanatory view showing a display example of a remote copy information setting window according to the first embodiment of the present invention.

FIG. 16A is a flowchart showing operations of transmission available status notice processing; and FIG. 16B is a flowchart showing operations of iSCSI decapsulation processing.

FIGS. 27A and 27B include explanatory views showing each structure of various tables according to the second embodiment of the present invention:

FIG. 27A is a view showing a structure of storage access information table; and

FIG. 27B is a view showing a structure of session information table.

FIG. 39A is an explanatory diagram schematically showing a structure of the storage system according to the first embodiment; and FIG. 39B is a schematic communication diagram according to the first embodiment.

DESCRIPTION OF THE PREFERRED EMBODIMENTS

Hereinafter, each embodiment of the present invention will be explained with reference to the attached drawings. In the following explanations, the same elements are labeled the same and redundant explanations will be omitted. Furthermore, the present invention is not limited to the following embodiments, and any other applications which agree with the idea of the present invention may be included. Unless otherwise specified, each element may indicate a plural number or a singular number.

As a first embodiment, there will be explained a storage system which comprises a plurality of storage devices, and employs iSCSI in mutual remote copy among the storage devices. As indicated in the prior art document mentioned above, iSCSI is a technique which encapsulates SCSI commands for writing/reading data with the TCP/IP protocol, and data exchange is carried out via the TCP/IP network.

Figure 1:
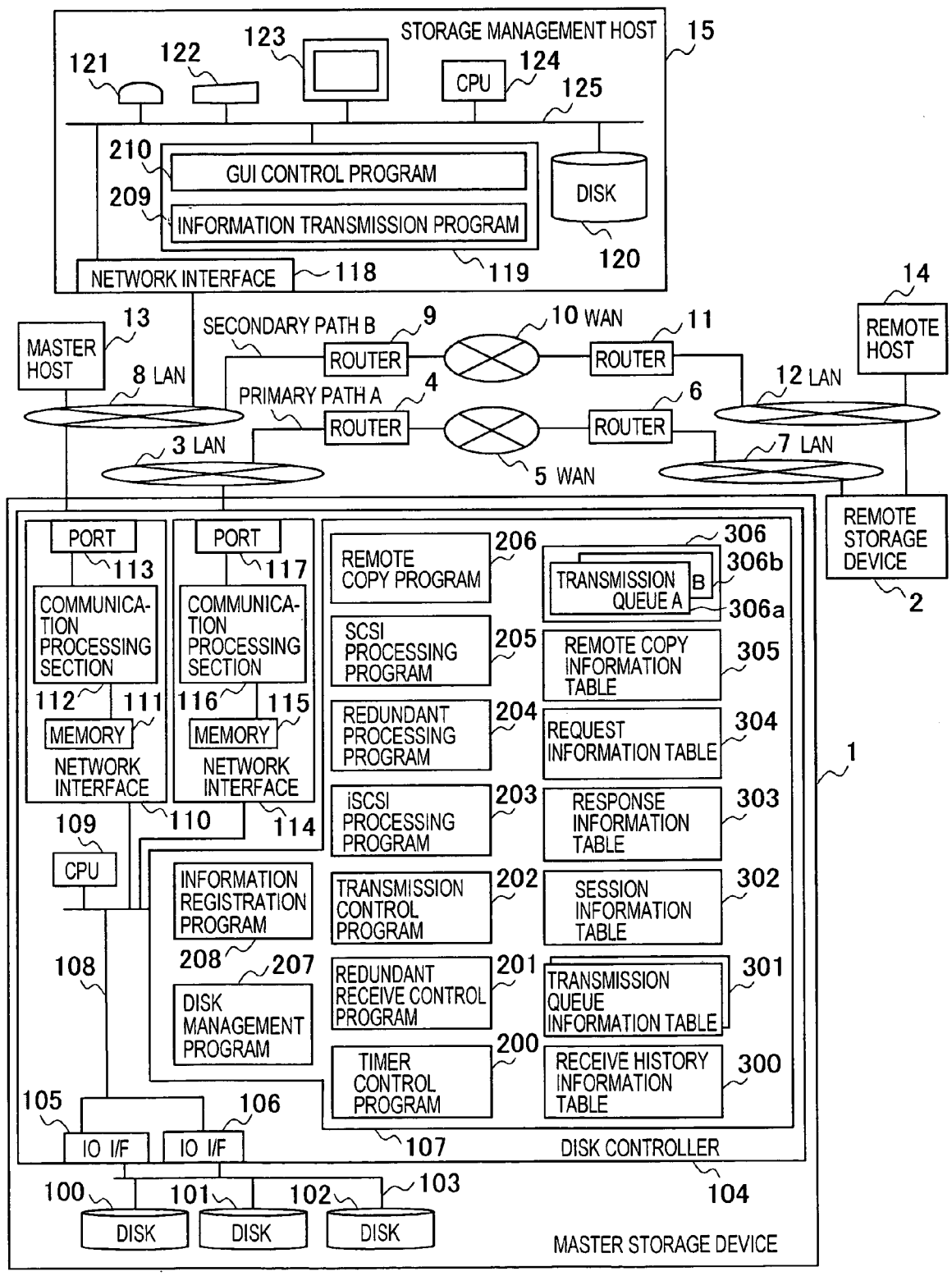
FIG. 1 is explanatory diagram showing a structural example of a storage system according to the first embodiment of the present invention.

FIG. 1 is a diagram showing a structural example of the storage system according to the first embodiment. This storage system includes a master site and a remote site via WAN (Wide Area Network) 5 and WAN 10. In the master site, there are provided a master storage device 1, a router 4, a router 9, a master host 13 and a storage management host 15, which is a management terminal of the master storage device 1. Those elements are connected to one another by way of LAN (Local Area Network) 3 and LAN 8, such as gigabit Ethernet ("Ethernet" is a registered trademark of Xerox Corporation, U.S.). Furthermore, in the remote site, there are provided a remote storage device 2, a router 6, a router 11 and a remote host 14. Those elements are mutually connected to one another by way of LAN 7 and LAN 12.

The master storage device 1 and the remote storage device 2 are storage device systems having a single storage unit or a plurality of storage units. It is to be noted that the storage unit includes a unit utilizing a nonvolatile storage medium, such as hard disk drive and a DVD. In addition, RAID configuration may be employed in the storage device system. Each of the master storage device 1 and the remote storage device 2 includes a plurality of storage units (hereinafter, referred to as "disks") 100, 101, and 102, a disk controller 104 which controls data writing and reading to/from these disks 100, 101, and 102, and an IO path 103 which is a communication line such as a bus to establish connection between each of the disks 100, 101, 102 and the disk controller 104.

The disk controller 104 comprises network interfaces (hereinafter, referred to as "network I/F") 110, 114, which establish connection with other devices via LAN 3 or LAN 8, a volatile memory (hereinafter, simply referred to as "memory") 107 which stores various programs and the like, a Central Processing Unit (hereinafter, referred to as "CPU") 109 which executes each program stored in the memory 107, IO interfaces (hereinafter, referred to as "IO I/F") 105, 106, which are interfaces to connect the disk controller 104 with the IO path 103, and a communication line 108, such as a bus (hereinafter, referred to as "internal bus").

The memory 107 stores an information registration program 208 which registers information received by the storage device in tables and the like, a disk management program 207 which is executed when data stored in the disk is updated and the remote copy program is notified of the updating, a remote copy program 206 which is executed when the remote copy is carried out, a SCSI processing program 205 which is executed when a SCSI command for data writing is generated, a redundant processing program 204 which is executed when redundant processing of the SCSI command is carried out, iSCSI processing program 203 which is executed when the SCSI command is encapsulated with TCP/IP, a transmission control program 202 which is executed when the encapsulated SCSI command is sent to the network interface 110, a redundant receive control program 201 which is executed when the redundant command receive processing for processing the SCSI command received redundantly is carried out in accordance with the order of arrival of the SCSI command, and a timer control program 200 which is executed when a receive history is erased in accordance with a lapse of time. It is to be noted that the aforementioned SCSI command comprises two types, i.e., a SCSI request transmitted by the master storage device 1, and a SCSI response which is transmitted by the remote storage device 2. With respect to one data write, a plurality of SCSI requests and responses are generated and transmitted.

The memory 107 stores a cache memory 306 which stores update data associated with the data writing, being read out from the disk, a remote copy information table 305 which stores correspondence information between the master storage device that stores an original of data and the remote storage device that stores a copy of data, a request information table 304 which stores information for uniquely identifying a group of SCSI request series generated by certain data writing, a response information table 303 which stores information for uniquely identifying a group of SCSI response series generated by the data writing, a session information table 302 which stores information of an iSCSI session established between the master storage device 1 and the remote storage device 2, a transmission queue information table 301 which stores information regarding the wait-for-sending SCSI request/response, and a receive history information table 300 which stores information of SCSI command which has already been received. Furthermore, on the cache memory 306, there are formed wait-for-sending queues 306a and 306b in which the wait-for-sending SCSI request/response is stored. The wait-for-sending queues 306a and 306b are provided in such a manner as associated with the ports 113 and 117 respectively. In the present embodiment, it is assumed that the tables as described above are stored in the memory 107 whose read/write speed is high, but those tables may be stored in the disks 100 to 102. The aforementioned programs 201 to 208 are read in advance from a portable type recording medium, or down loaded via LAN 3 or LAN 8 from other device, stored in the disk 100, and transferred to the memory 107 as appropriate. Then, CPU 109 executes the programs.

Network Interface 110 comprises a memory 111 used as a buffer for communication, a communication processing section 112 which handles a communication with other device and a port 113 connected to a cable constituting LAN 8. Similar to the above, network Interface 114 also comprises a memory 115, a communication processing section 116 and a port 117 connected to a cable constituting LAN 3.

Storage management host 15 comprises a memory 119 which stores various programs and the like, a disk 120, CPU 124 which executes each program stored in the memory 119, an output unit 123 such as a display unit (hereinafter, referred to as "display unit"), a character input device 122 such as a keyboard, a pointing device 121 such as a mouse and a touch panel, an internal bus 125, and a network interface 118 which is an interface to connect the storage management host 15 with the LAN 8.

The memory 119 stores a GUI (Graphical User Interface) control program 210 which is executed when a GUI screen is displayed for a system administrator and the like to perform operations such as inputting information necessary for remote copy and an instruction for starting remote copy, and an information transmission program 209 which is executed when the information and the instruction inputted by the system administrator and the like are transmitted to the master storage device 1. These programs are stored in advance in the disk 120, by reading from a portable recording medium or down loaded from other device via the LAN 8, and transferred to the memory 119 as required. Then, the CPU 124 executes these programs.

Master host 13 and remote host 14 are conventional host devices, such as a personal computer, a server, or a mainframe.

Router 4 and router 6 are conventional router units having a gateway function to connect each of the LAN 3 and LAN 7 with WAN 5. Similarly, router 9 and router 11 are conventional router units having a gateway function to connect each of the LAN 8 and LAN 12 with WAN 10.

Next, data structure of the various tables stored in the memory 107 of the master storage device 1 will be explained.

Remote copy information table 305, request information table 304, response information table 303, session information table 302, transmission queue information table 301 and receive history information table 300 are formed in array structure, and at least one record can be stored. However, it is to be noted that data structure of these tables is not limited to the array structure.

FIG. 2A is a view showing a data structure example of the remote copy information table 305. Each record in the remote copy information table 305 comprises, entry 3051 where a master node name as an identifier of the master storage device is registered, entry 3052 where a master logical device ID as an identifier of a disk in the master storage device is registered, entry 3053 where a remote node name as an identifier of the remote storage device is registered, and entry 3054 where a remote logical device ID as an identifier of a disk in the remote storage device is registered. For example, the record 3050 represents that a remote copy destination of the data stored in the disk device whose master logical device ID is "sdb1" within the master storage device whose master node name is "X1", is the disk whose remote logical device ID is "sdb2" within the remote storage device whose remote node name "Y1". In the present embodiment, the logical device and the physical device have one-to-one relationship, but the logical device may have one-to-n or n-to-one relationship with respect to the physical disk.

FIG. 2B is a view showing a data structure example of the request information table 304. Each record of the request information table 304 comprises, entry 3041 where a request tag is registered for uniquely identifying a series of SCSI requests required for remote copy of the data that has been updated with a writing of certain data, out of the SCSI requests associated with other data writing, entry 3042 where the first memory address is registered as to update data stored in the cache memory 306 of the master storage device 1, entry 3043 where a data length of the update data is registered, and entry 3044 where a processed data length is registered as a data length of a part of the update data, whose copying to the remote storage device has been completed. For example, the record 3040 represents that with a series of SCSI requests identified by the request tag "p1", the data corresponding to the processed data length of "7000" bits out of the update data stored in the area of data length "50000" bits from the position of the first memory address "150000" on the cache memory 306, has already been copied.

FIG. 2C is a view showing a data structure example of the response information table 303. Each record in the response information table 305 comprises, entry 3031 where a response tag is registered for uniquely identifying a SCSI response against a series of SCSI requests required for remote copying the data that has been updated with a certain data writing, out of the SCSI responses associated with other data writing, entry 3032 where a logical device ID is registered for identifying a disk as a target for writing the update data, entry 3033 where a logical block address is registered for indicating the first address of a block area as a target for data update within the disk as a target for writing the update data, entry 3034 where a data length of the update data is registered, and entry 3035 where a processed data length is registered as a data length of a part of the update data whose writing to the disk is completed. For example, the record 3030 represents that with a series of SCSI responses identified by the request tag "q1", writing of data corresponding to the processed data length of "7000" bits has been completed, as to the area of data length "50000" bits from the position of the logical block address "1000" on the disk which is specified the logical device ID "sdb2".

FIG. 2D is a view showing a data structure example of the session information table 302. Each record of the session information table 302 comprises, entry 3021 where a session ID is registered for uniquely identifying a session which transmits data, entry 3022 where the above master node name is registered, entry 3023 where a master IP address as an IP address of the session on the master storage device 1 side, entry 3024 where a master port number is registered as a port number of the session on the master storage device 1 side, entry 3025 where the above remote node name is registered, entry 3026 where a remote IP address is registered as an IP address of the session on the remote storage device 2 side, entry 3027 where a remote port number of the session on the remote storage device side, entry 3028 where a transmission queue address is registered as an address of the transmission queue which holds an address of a SCSI command (SCSI request or SCSI response) before being sent out to this session, entry 3029 where a gateway IP address is registered as an address of a router which serves as a relay point between LAN and WAN during the session, and entry 302a where a timeout value of the session established on the path is registered. Here, in the session information table 302 within the master storage device 1, the gate way IP address is assumed to be a master gateway address which is an IP address of the router 4 or the router 9, being a relay point between LAN 3 and WAN 5 or between LAN 8 and WAN 10. On the other hand, in the session information table within the remote storage device 2, the gateway IP address is assumed to be a remote gateway IP address, which is an IP address of the router 6 or the router 11, being relay points between LAN 7 and WAN 5 or between LAN 12 and WAN 10 in the remote site. For example, the record 3020 represents that a session identified by the session ID "S1" connects an end point on the master storage device 1 side, which is specified by the master node name "X1", master IP address "211.1.1.20", and master port number "10000", with an end point on the remote storage device 2 side which is specified by the remote node name "Y1", remote IP address "178.1.8.15", and remote port number "12000", by way of the router identified by the gateway IP address "211.1.1.1" as a relay point. Furthermore, the record 3020 represents that when a communication is stopped during the session, the time for determining as timeout is the timeout value of "10" seconds.

FIG. 2E is a view showing a data structure example of the transmission queue information table 301. The transmission queue information table 301 is created with respect to each session. Each record of the transmission queue information table 301 comprises, entry 3011 where a sequence control tag is registered for uniquely identifying a command, entry 3012 where a task tag is registered (in the master storage device, a request tag is assumed to be the task tag, and in the remote storage device, a response tag is assumed to be the task tag), and entry 3013 where a command address is registered which is an address of the command corresponding to the tag. The record 3010 is a first record to be transmitted at the beginning, and on the other hand, the record 3011 is the rearmost record to be transmitted at the last. A new record is added subsequent to the rearmost record. For example, record 3010 represents that a command firstly sent out is identified by the order control tag "1" and the task tag "p1", and the command is located at the command address "15000". It is to be noted that the command address is the address within the area set as transmission queues 306a, 306b in the cache memory 306.

FIG. 2F is a view showing a data structure example of the receive history information table 300. Each record in the receive history information table 300 comprises, entry 3001 where a sequence control tag is registered, entry 3002 where a task tag is registered (in the master storage device, a request tag is assumed to be the task tag, and in the remote storage device, a response tag is assumed to be the task tag), entry 3003 where a return flag is registered, indicating whether or not a command is returned in response to the received command (0: not returned, 1 or more: already returned), entry 3004 where a history holding counter is held, the counter being decremented by one, every time the same command is received, and the history being deleted when the counter reaches zero (1 or more: holding, 0: delete history), and entry 3005 where a history holding timeout is registered, which is decremented by one, every lapse of one second, and the history is deleted when the history holding timeout reaches zero (1 or more: holding, 0: delete history) For example, record 3000 represents that a command identified by the sequence control tag "1" and the task tag "p1" is received, and a command in response to the above command has not been returned yet (the return flag is "0"), after a receipt of the same command two more times, the record will be deleted (the history holding counter is "2"), and after a lapse of one more second, the record will be deleted (the history holding timeout is "1").

Next, GUI (Graphical User Interface) employed in the first embodiment will be explained. A GUI screen is displayed on the display 123 when the CPU 124 of the storage management host 15 executes the GUI control program 210. A system administrator and the like sets each parameter on the GUI screen thus displayed, by use of the character input device 122 and the pointing device 121.

As for the display 123, the character input device 122 and the pointing device 121 may be provided in a computer separate from the storage management host 15. For example, a console terminal connected to the storage management host 15 via LAN 8 or a serial cable may have the display and the like. In this case, the CPU 124 executes the GUI control program 210 to transmit screen data to the console terminal, and the console terminal displays the GUI screen on the display and the like. In addition, the console terminal transmits to the storage management host 15 each parameter which is set by the system administrator and the like by means of the character input device and the pointing device.

Furthermore, instead of the GUI as explained in the first embodiment, the storage management host 15 may be provided with a command line interface having an equivalent function as the GUI.

FIG. 3 is a view showing a display example of the remote copy information setting window G300, which is used when a system administrator and the like inputs information required for carrying out the remote copy. The remote copy information setting window G300 has area G301 for inputting a master node name, area G302 for inputting the master logical device ID, area G303 for inputting a remote node name, area G304 for inputting a remote logical device ID, area G305 for inputting information regarding the primary path, area G306 for inputting information regarding the secondary path, a button G307 which is designated when the information items specified in these areas are registered in the master storage device 1, and a button G308 which is designated when the registration is canceled.

Furthermore, the area G305 comprises area G310 for inputting a master IP address, area G311 for inputting a master port number, area G312 for inputting master gateway IP address, area G313 for inputting remote IP address, area G314 for inputting a remote port number, area G315 for inputting remote gate way IP address, and area G316 for inputting a timeout value. Similarly, area G306 comprises area G320 for inputting a master IP address, area G321 for inputting a master port number, area G322 for inputting a master gateway IP address, area G323 for inputting a remote IP address, area G324 for inputting a remote port number, area G325 for inputting a remote gateway IP address, and area G326 for inputting a timeout value.

Figure 4:
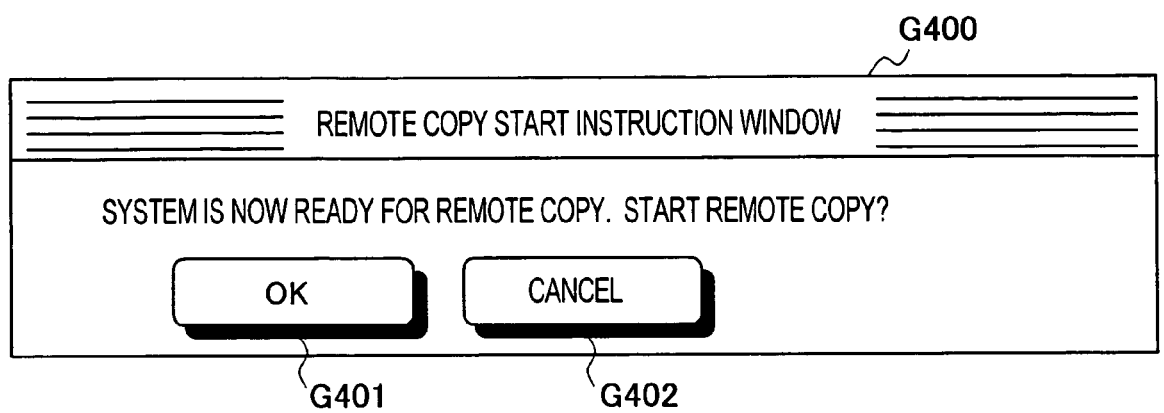
FIG. 4 is an explanatory view showing a display example of a remote copy start instruction window according to the first embodiment of the present invention.

FIG. 4 is a view showing a display example of the remote copy start instruction window G400 which is used by the system administrator and the like to instruct a start of remote copy execution. The remote copy start instruction window G400 comprises a button G401 which is designated when the remote copy is started, and a button G402 which is designated when the start of remote copy is canceled.

Next, a communication sequence between each of the devices in the first embodiment will be explained.

Figure 5:
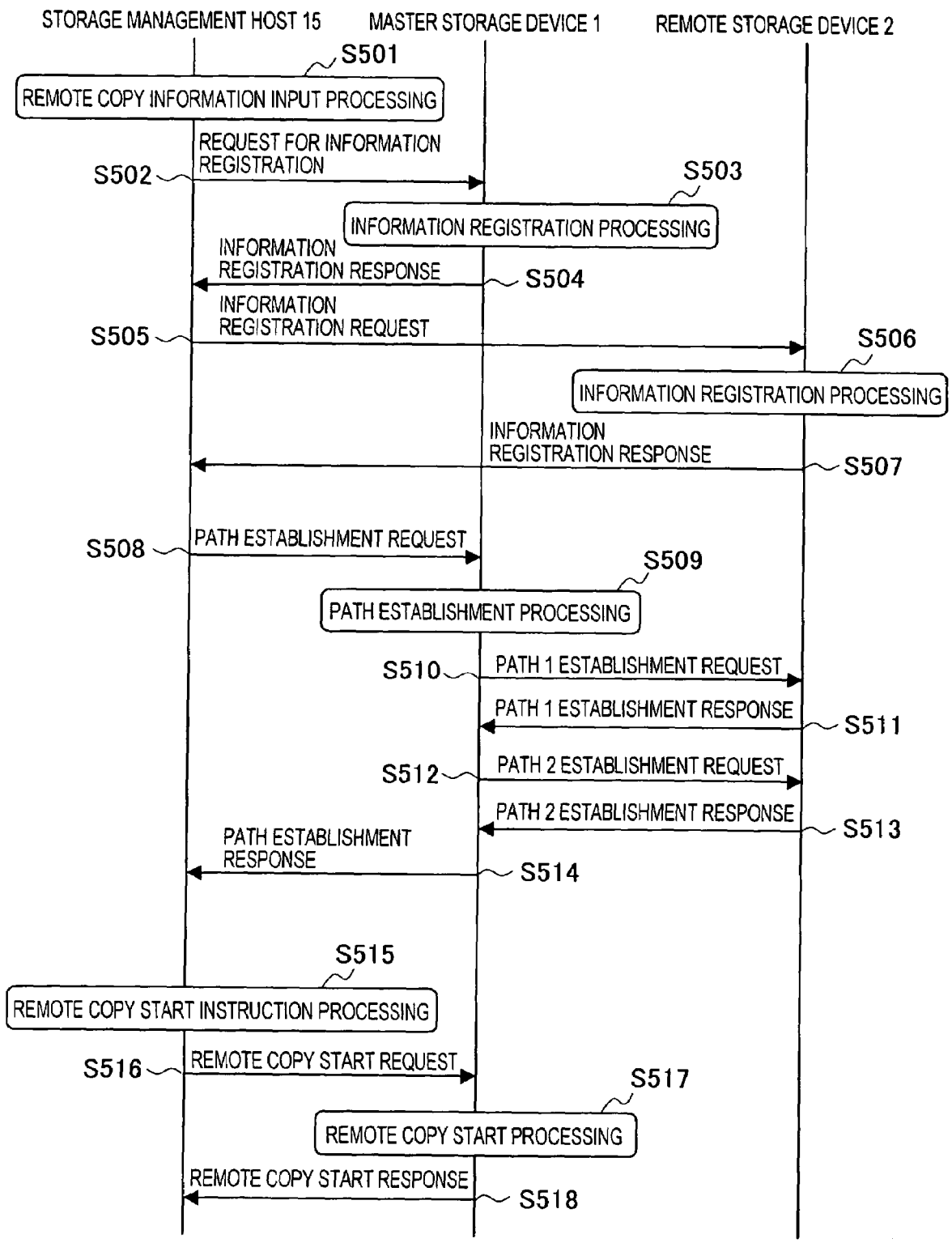
FIG. 5 is a communication sequence diagram regarding the start of remote copy according to the first embodiment of the present invention.

FIG. 5 is a diagram showing a communication sequence example between devices from when a system administrator and the like uses the storage management host 15 to register information necessary for executing remote copy into the master storage device 1 and the remote storage device 2, until when the remote copy is started.

Firstly, the CPU 124 of the storage management host 15 executes the GUI control program 210. Then, the storage management host 15 displays a remote copy information setting window G300 (as shown in FIG. 3) and executes a remote copy information input processing which receives an input from the system administrator and the like (S501). Afterwards, when the system administrator and the like designates the button G307, the CPU 124 executes the information transmission program 209, and the storage management host 15 assembles information registration request including the information inputted in the areas G301 to G306, so as to transmit the request to the master storage device 1 (S502). When the master storage device 1 receives the information registration request, the master storage device 1 executes an information registration processing, which will be explained with FIG. 6, and registers information necessary for executing the remote copy into the various tables. (S503). Then, the master storage device 1 transmits to the storage management host 15 an information registration response indicating that the information has been registered (S504). Next, the storage management host 15 transmits the information registration request thus assembled in S502 to the remote storage device 2 (S505). When the remote storage device 2 receives the information registration request, it executes the information registration processing and registers the information necessary for executing the remote copy in the various tables (S506). Then, the remote storage device 2 transmits an information registration response indicating that the information has been registered, to the storage management host 15 (S507).

Next, when the storage management host 15 receives the information registration response from each of the storage devices 1 and 2, similar to the case of the aforementioned information registration request, the storage management host 15 transmits a path establishment request including the information inputted in the areas G301 to G306 to the master storage device 1 (S508). When the master storage device 1 receives the path establishment request, the following path establishment processing is carried out (S509). At first, the master storage device 1 retrieves a master gateway IP address of path 1 from the path establishment request, so as to obtain physical addresses of routers in the master site, which constitute a primary path by use of ARP (Address Resolution Protocol) and the like. Then, the master storage device 1 retrieves from the path establishment request, a master node name, a remote node name, a master IP address of the path 1, a master port number, a remote IP address and a remote port number, assembles a path 1 establishment request representing a login request from an initiator indicated by the master node name to a target indicated by the remote node name, and transmits the request to the above physical addresses (S510). The source IP address of this path 1 establishment request corresponds to the above master IP address, and the destination IP address corresponds to the above remote IP address. The source TCP (Transmission Control Protocol) port number corresponds to the above master port number, and the destination TCP port number corresponds to the above remote port number. When the remote storage device 2 receives the path 1 establishment request, the remote storage device 2 transmits a path 1 establishment response permitting an iSCSI session (S511). In this way, the iSCSI session is established on the primary path. Afterwards, in a similar manner, an iSCSI session is established on the secondary path (S512, S513). Then, the master storage device 1 assembles a path establishment response indicating that a path has been established, and transmits the response to the storage management host 15 (S514).

Next, when the storage management host 15 receives the above path establishment response, the CPU 124 executes the GUI control program 210, and the storage management host 15 displays a remote copy start instruction window G400 (as shown in FIG. 4). Then, the storage management host 15 executes a remote copy start instruction processing, which is to wait for a remote copy start instruction from the system administrator and the like (S515). Thereafter, when the system administrator and the like designates the button G401, the CPU 124 executes the information transmission program 209, and the storage management host 15 assembles a remote copy start request indicating that the remote copy has been instructed. Then, the request is transmitted to the master storage device 1 (S516). When the master storage device 1 receives the remote copy start request, the CPU 109 executes the remote copy program 206, and the master storage device 1 executes the remote copy start processing (S517). Then, the master storage device 1 assembles a remote copy start response indicating that the remote copy has been normally started, and transmits the response to the storage management host 15 (S518). The description so far explains the communication sequence concerning registration of information necessary for executing the remote copy and the remote copy starting.

Figure 6:
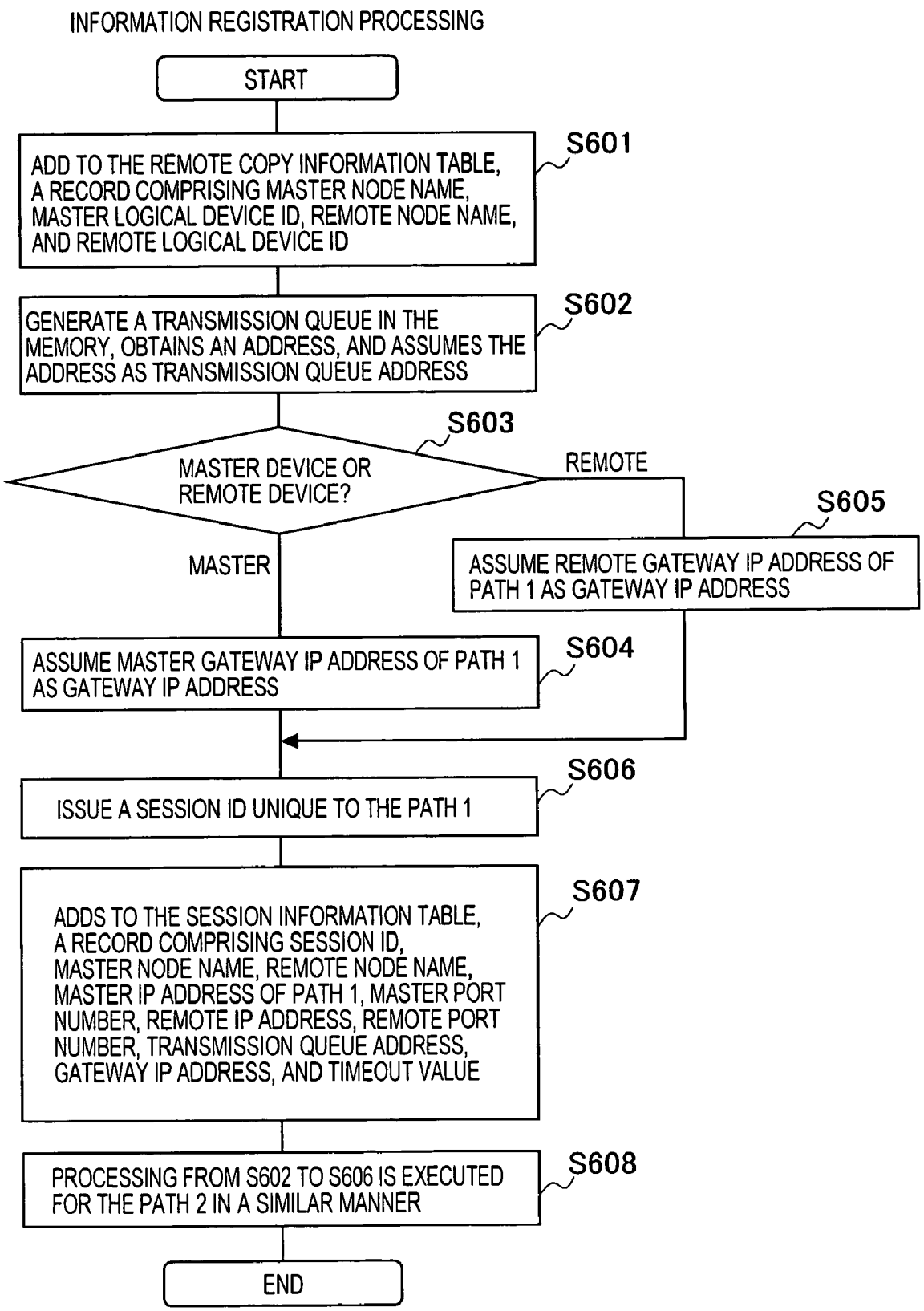
FIG. 6 is a flowchart showing operations of information registration processing according to the first embodiment of the present invention.

FIG. 6 is a flowchart showing an operational procedure of the above mentioned information registration processing (S503, 506). This process is carried out when the CPU 109 in the master storage device 1 or the CPU 109 in the remote storage device 2 execute the information registration program 208. It is to be noted that in the explanation here, the master storage device 1 and the remote storage device 2 are collectively referred to as "storage device". In the present processing, at first, the storage device adds a record to the remote copy information table 305 (FIG. 2A) on the basis of the contents of the information registration request received from the storage management host 15 (S601). In the entries 3041, 3042, 3043, and 3044 of the record added here, there are respectively registered a master node name, a master logical device ID, a remote node name and a remote logical device ID. Next, the storage device forms a transmission queue 306a in the cache memory 306, and also creates a transmission queue information table 301. Then, the storage device sets the first address of the transmission queue 306a as a transmission queue address (S602).

Next, the processing branches out, depending on which performs the processing, the master storage device 1 or the remote storage device 2 (S603). When the master storage device 1 performs the processing, following processing is carried out assuming a master gateway IP address of the primary path A as the gateway IP address (S604). On the other hand, when the remote storage device 2 performs the processing, following processing is carried out assuming a remote gateway IP address of the primary path A as the gateway IP address (S605). Next, the storage device issues a unique session ID (S606). Then, on the basis of the contents of the information registration request, a record is added to the session information table 302 (S607). In the entries 3021, 3022, 3023, 3024, 3025, 3026, 3027, 3028, 3029, 302a of the record added here, there are respectively registered the session ID obtained in S606, the master node name, the master IP address, the master port number, the remote node name, the remote IP address, the remote port number, the transmission queue address obtained in S602, the gateway IP address obtained in S604 or S605, and a timeout value. Then, in the same way as explained above, the storage device executes the processing from S602 to S607 for the secondary path B (S608). By executing the above processing in the same manner for the secondary path B, more particularly, by repeating S602, a transmission queue 306a for the primary path A and a transmission queue 306b for the secondary path B are generated.

Figure 7:
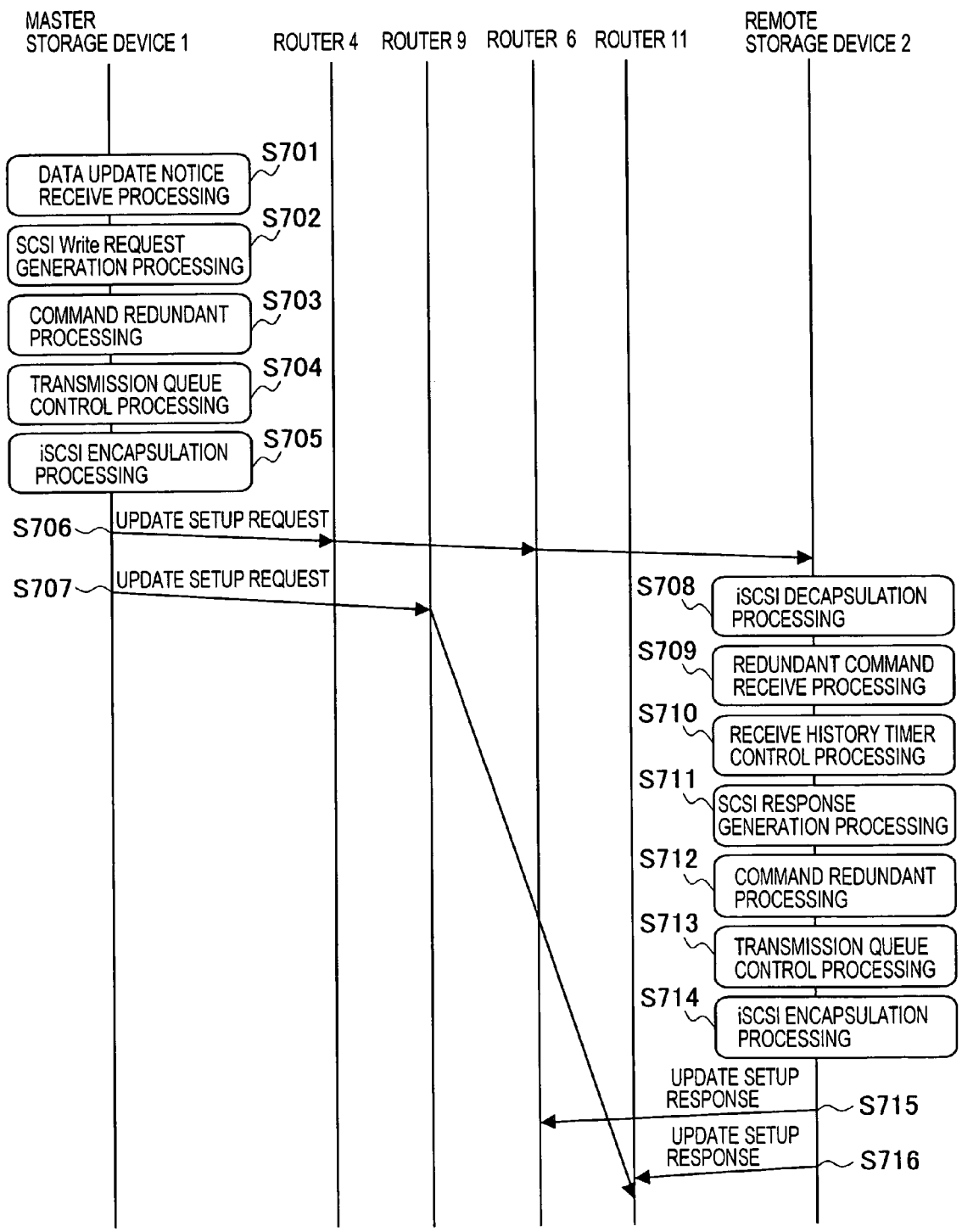
FIG. 7 is a communication sequence diagram regarding remote copy processing according to the first embodiment of the present invention.
Figure 8:
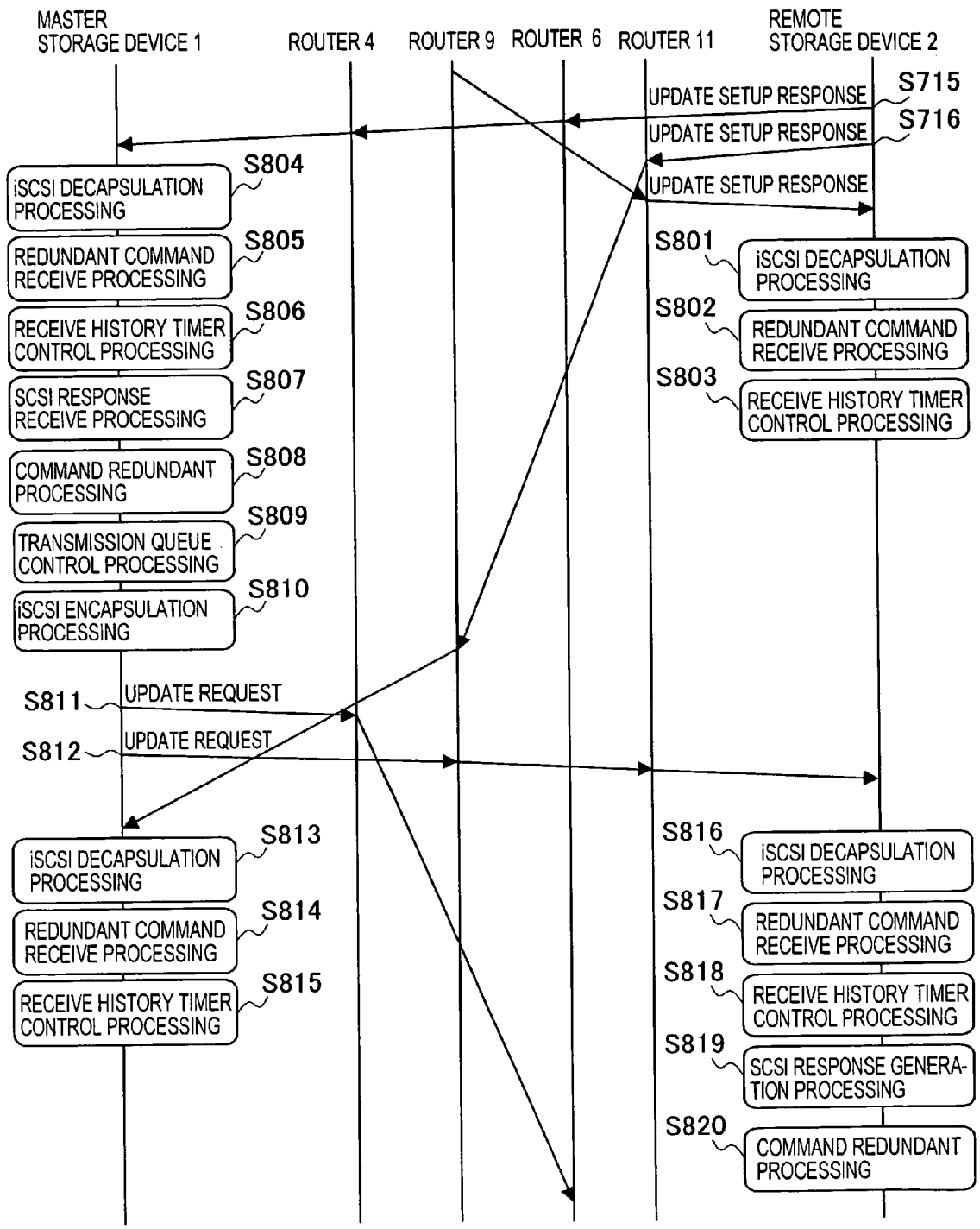
FIG. 8 is a communication sequence diagram regarding remote copy processing according to the first embodiment of the present invention.
Figure 9:
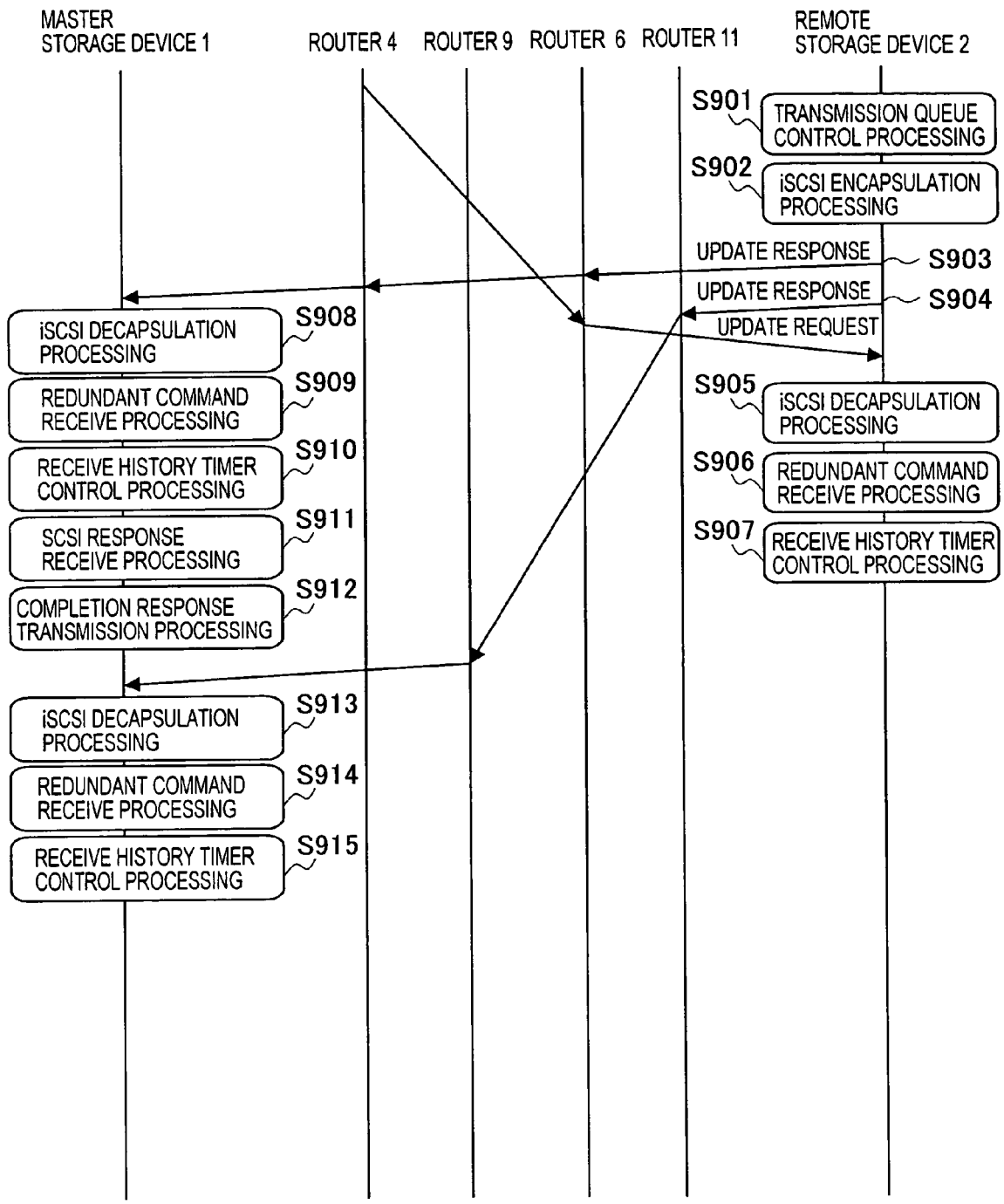
FIG. 9 is a communication sequence diagram regarding remote copy processing according to the first embodiment of the present invention.

FIGS. 7 to 9 are diagrams showing communication sequence examples between devices at the time when the data stored in the disks 100 to 102 in the master storage device 1 is updated. In these communication sequence examples, it is assumed that a path comprising LAN 3, router 4, WAN 5, router 6 and router 7 represents the primary path A, and a path comprising LAN 8, router 9, WAN 10, router 11 and router 12 represents the secondary path B.

When data stored in the disks 100 to 102 is updated, the CPU 109 in the master storage device 1 executes the disk management program 207. As a result of executing the program, the CPU 109 of the master storage device 1 assembles a data update notice comprising the master node name, the master logical device ID, the logical block address, the first memory address, the data length and updated data, and inputs thus assembled update notice to execute the remote copy program 206. When the CPU 109 executes the remote copy program 206, the master storage device 1 carries out a data update notice receive processing which will be explained with FIG. 10, and assembles an update request for requesting the SCSI processing program 205 to update the data in the remote storage device 2 (S701). Next, the CPU 109 executes the SCSI processing program 205 using the update request as an input. Then, the master storage device 1 carries out a SCSI Write request generation processing which will be explained with FIG. 11, and assembles a SCSI command which requests to write the data (S702). Next, the CPU 109 executes the redundant processing program 204 using the above SCSI command as an input, and the master storage device 1 carries out a command redundant processing for sending out an identical command to a plurality of paths, as explained with FIG. 12 and FIG. 13. Then, the master storage device 1 adds the SCSI command to the transmission queue 306a in the primary path A and the transmission queue 306b in the secondary path B, and also stores the information of the command in the transmission queue information table 301 (S703) On the other hand, the CPU 109 constantly executes the transmission control program 202 from the time when the master storage device 1 is activated. Consequently, the master storage device 1 repeatedly executes the transmission queue control processing which will be explained with FIG. 14, and when each SCSI command added to the transmission queues 306a, 306b in S703 reaches the top of the transmission queue 306a or 306b, the master storage device 1 transmits the SCSI command to the iSCSI processing program 203 (S704). Next, the CPU 109 executes the iSCSI processing program 203, and the master storage device 1 carries out an iSCSI encapsulation processing which will be explained with FIG. 15. Then, the master storage device 1 assembles an iSCSI PDU and transmits it to the remote storage device 2 (S705). As a result of processing from S703 to S705 as described above, the master storage device 1 transmits redundantly an update setup request to the router 4 and the router 9 (S706, S707).

In consequence of the processing by the master storage device 1 as described above, when the remote storage device 2 receives the update setup request passed through the primary path A earlier than the update setup request passed through the secondary path B, the CPU 109 in the remote storage device 2 executes the iSCSI processing program 203. Then, the remote storage device 2 carries out an iSCSI decapsulation processing which will be explained with FIG. 16B, and retrieves the SCSI command from the update setup request thus received (S708). Next, the CPU 109 executes a redundant receive control program 201. Then, the remote storage device 2 carries out a redundant command receive processing which will be explained with FIG. 17 and FIG. 18 and checks whether or not an identical update setup request has already been received. Since the identical update setup request has not been received yet at the current timing, the SCSI Write request retrieved in S708 is transmitted to the SCSI processing program 205 (S709). The remote storage device 2 further stores in the receive history information table 300, a receive history indicating that the above update setup request has been received. In addition, the CPU 109 in the remote storage device 2 constantly executes a timer control program 200 from the time when the storage device 2 is activated. Consequently, the storage device 2 repeatedly executes a receive history timer control processing which will be explained with FIG. 19, and when the timeout value of the receive history stored in the receive history table 300 in S709 becomes zero, the storage device erases the receive history from the receive history table (S710). Next, the CPU 109 executes the SCSI processing program 205. Then, the remote storage device 2 carries out a SCSI response generation processing which will be explained with FIG. 22, and assembles a SCSI XFR_RDY (abbreviation of "Transfer Ready"), which is a response to the SCSI Write request retrieved in S709 (S711). Subsequently, the CPU 109 executes a redundant program 204. Then, the remote storage device 2 carries out the command redundant processing, adds the SCSI command to the transmission queue 306a in the primary path A and the transmission queue 306b in the secondary path B, and also stores the information as to this command in the transmission queue information table 301 (S712). On the other hand, similar to the master storage device 1, the CPU 109 in the remote storage device 2 constantly executes the transmission control program 202 from the time when the remote storage device 2 is activated. Consequently, the remote storage device 2 repeatedly executes a transmission queue control processing which will be explained with FIG. 14. When each SCSI command added to the transmission queues in S712 reaches the top of the transmission queues 306a or 306b, the remote storage device 2 transmits the SCSI command to the iSCSI processing program 203 (S713). Next, the CPU 109 executes the iSCSI processing program 203. Then, the remote storage device 2 carries out an iSCSI encapsulation processing which will be explained with FIG. 15, assembles an iSCSI PDU, and transmits it to the master storage device 1 (S714). As a result, the remote storage device 2 transmits redundantly the update setup response to the router 6 and router 11 (S715, S716).

Thereafter, when the remote storage device 2 receives the update setup request which passed through the secondary path B, as shown in FIG. 8, the CPU 109 executes the iSCSI processing program 203. Then, the remote storage device 2 executes the iSCSI decapsulation processing and retrieved the SCSI command from the update setup request thus received (S801). Next, the CPU 109 executes the redundant receive control program 201. Then, the remote storage device 2 carries out a redundant command receive processing, determines that an identical update setup request has already been received, and deletes this request (S802). As described in S710, the CPU 109 constantly executes the timer control program 200 from the time when the remote storage device 2 is activated, and the remote storage device 2 constantly carries out the receive history timer control processing for deleting a receive history whose timeout value becomes zero (S803).

When the master storage device 1 receives the update setup response passed through the primary path A, earlier than the update setup response passed through the secondary path B, the CPU 109 in the master storage device 1 executes the iSCSI processing program 203. Then, the master storage device 1 carries out the iSCSI decapsulation processing, and retrieves a SCSI XFR_RDY response from the above update setup response thus received (S804). Next, the CPU 109 executes the redundant receive control program 201. Then, the master storage device 1 carries out a redundant command receive processing and checks whether or not an identical update setup response has already been received. Since it is not received at the current timing, the SCSI XFR_RDY response retrieved in S804 is transmitted to the SCSI processing program 205 (S805). In addition, the master storage device 1 stores in the receive history information table 300, a receive history indicating that the above update setup response has been received. Similar to the case of the remote storage device, the CPU 109 in the master storage device 1 constantly executes the timer control program 200 from the time when the master storage device 1 is activated, and the master storage device 1 constantly carries out the receive history timer control processing (S806). Next, the CPU 109 executes the SCSI processing program 205. Then, the master storage device 1 carries out the SCSI response receive processing, and assembles SCSI Data_Out request (S807). Subsequently, the CPU 109 executes the redundant processing program 204. Then, the master storage device 1 carries out the command redundant processing and adds the SCSI command generated in S807 to the transmission queue 306a in the primary path A and to the transmission queue 306b in the secondary path B (S808). When each SCSI command added to the transmission queues in S808 reaches the top of any of the transmission queues, the master storage device 1, which repeatedly executes the transmission queue control processing, transmits the SCSI command to the iSCSI processing program 203 (S809) Next, the CPU 109 executes the iSCSI processing program 203. Then, the master storage device 1 carries out the iSCSI encapsulation processing, assembles an iSCSI PDU, and transmits it to the remote storage device 2 (S810). Consequently, the master storage device 1 redundantly transmits the update request to the router 4 and the router 9 (S811, S812).

Thereafter, when the master storage device 1 further receives an update setup response passed through the secondary path B, the CPU 109 executes the iSCSI processing program 203. Then, the master storage device carries out the iSCSI decapsulation processing and retrieves the SCSI command from the update setup response thus received (S813). Next, the CPU 109 executes the redundant receive control program 201. Then, the master storage device 1 carries out the redundant command receive processing, determines that an identical update setup request has already been received, and deletes the update setup response (S814) As described in S806, the CPU 109 in the master storage device 1 constantly executes the timer control program 200 from the time when the master storage device 1 is activated, and the master storage device 1 constantly carries out the receive history timer control processing to delete the receive history (S815).

On the other hand, when the remote storage device 2 receives the update request passed through the secondary path B earlier than the update request passed through the primary path A, the CPU 109 in the remote storage device 2 executes the iSCSI processing program 203. Then, the remote storage device 2 carries out the iSCSI decapsulation processing and retrieves a SCSI Data_Out request from the update request thus received (S816). Next, the CPU 109 executes the redundant receive control program 201. Then, the remote storage device 2 carries out the redundant command receive processing and checks whether or not an identical update request has already been received. Since it has not been received yet at the current timing, the remote storage device 2 transmits the SCSI Data_Out request retrieved in S816 to the SCSI processing program 205 (S817). In addition, the remote storage device 2 stores in the receive history information table 300, a receive history indicating that the above update request has been received. The CPU 109 in the remote storage device 2 constantly executes the timer control program 200 from the time when the remote storage device 2 is activated, and the remote storage device constantly carries out the receive history timer control processing (S818). Next, the CPU 109 executes the SCSI processing program 205. Then, the remote storage device 2 carries out the SCSI response generation processing and updates the data in the disks 100 to 102 in the remote storage device 2 on the basis of the SCSI Data_Out retrieved in S817. Furthermore, the remote storage device 2 assembles a SCSI RSP response, which is a response to the SCSI Data_Out command (S819). In other words, with this processing in S819, the data in the master storage device 1 is remote-copied to the remote storage device 2. Next, the CPU 109 executes the redundant processing program 204. Then, the remote storage device 2 carries out the command redundant processing, and adds the SCSI command generated in S819 to the transmission queue 306a in the primary path A and to the transmission queue 306b in the secondary path B (S820). When each SCSI command added to the transmission queues 306a, 306b reaches the top of the transmission queue 306a or 306b, the remote storage device 2, which repeatedly executes the transmission queue control processing, transmits the SCSI command to the iSCSI processing program 203 (S901). Next, the CPU 109 executes the iSCSI processing program 203. Then, the remote storage device 2 carries out the iSCSI encapsulation processing, assembles iSCSI PDU and transmits it to the master storage device 1 (S902). Consequently, the remote storage device 2 redundantly transmits the update response to the router 6 and to the router 11 (S903, S904).

Thereafter, when the remote storage device 2 receives the update request passed through the primary path A, the CPU 109 executes the iSCSI processing program 203. Then, the remote storage device 2 carries out the iSCSI decapsulation processing and retrieves the SCSI command from the update request thus received (S905). Next, the CPU 109 executes the redundant receive control program 201. Then, the remote storage device 2 carries out the redundant command receive processing, determines that an identical update request has already been received, and deletes the request (S906). As described in S710, the CPU 109 constantly executes the timer control program 200 from the time when the remote storage device is activated, and the remote storage device 2 constantly carries out the receive history timer control processing (S907).

On the other hand, when the master storage device 1 receives the update response passed through the primary path A earlier than the update response passed through the secondary path B, the CPU 109 in the master storage device 1 executes the iSCSI processing program 203. Then, the master storage device 1 carries out the iSCSI decapsulation processing and retrieves a SCSI RSP response from the above update setup response thus received (S908). Next, the CPU 109 executes the redundant receive control program 201. Then, the master storage device 1 carries out the redundant command receive processing, and checks whether or not an identical update response has already been received. Since it has not been received at the current timing, the master storage device 1 transmits the SCSI RSP response retrieved in S908 to the SCSI processing program 205 (S909). In addition, the master storage device 1 stores in the receive history information table 300, a receive history indicating that the above update response has been received. Similar to the case of the remote storage device, the CPU 109 in the master storage device 1 constantly executes the timer control program 200 and the master storage device 1 constantly carries out the receive history timer control processing (S910). Next, the CPU 109 executes the SCSI processing program 205, and the master storage device 1 carries out the SCSI response receive processing (S911). Subsequently, the CPU 109 executes the remote copy program 206 and the master storage device 1 carries out a completion response transmission processing which will be explained with FIG. 25 (S912).

Thereafter, when the master storage device 1 receives the update response passed through the secondary path B, the CPU 109 executes the iSCSI processing program 203. Then, the master storage device 1 carries out the iSCSI decapsulation processing and retrieves a SCSI command from the update setup response thus received (S913). Next, the CPU 109 executes the redundant receive control program 201. Then, the master storage device 1 carries out the redundant command receive processing, determines that an identical update response has already been received, and deletes the response (S914). As described in S806, the CPU 109 in the master storage device 1 constantly executes the timer control program 200 from the time when the master storage device is activated, and the master storage device 1 constantly carries out the receive history timer control processing which deletes a receive history (S915).

In the following, detailed operational procedures of each processing as shown in FIG. 7 to FIG. 9 will be explained.

Figure 10:
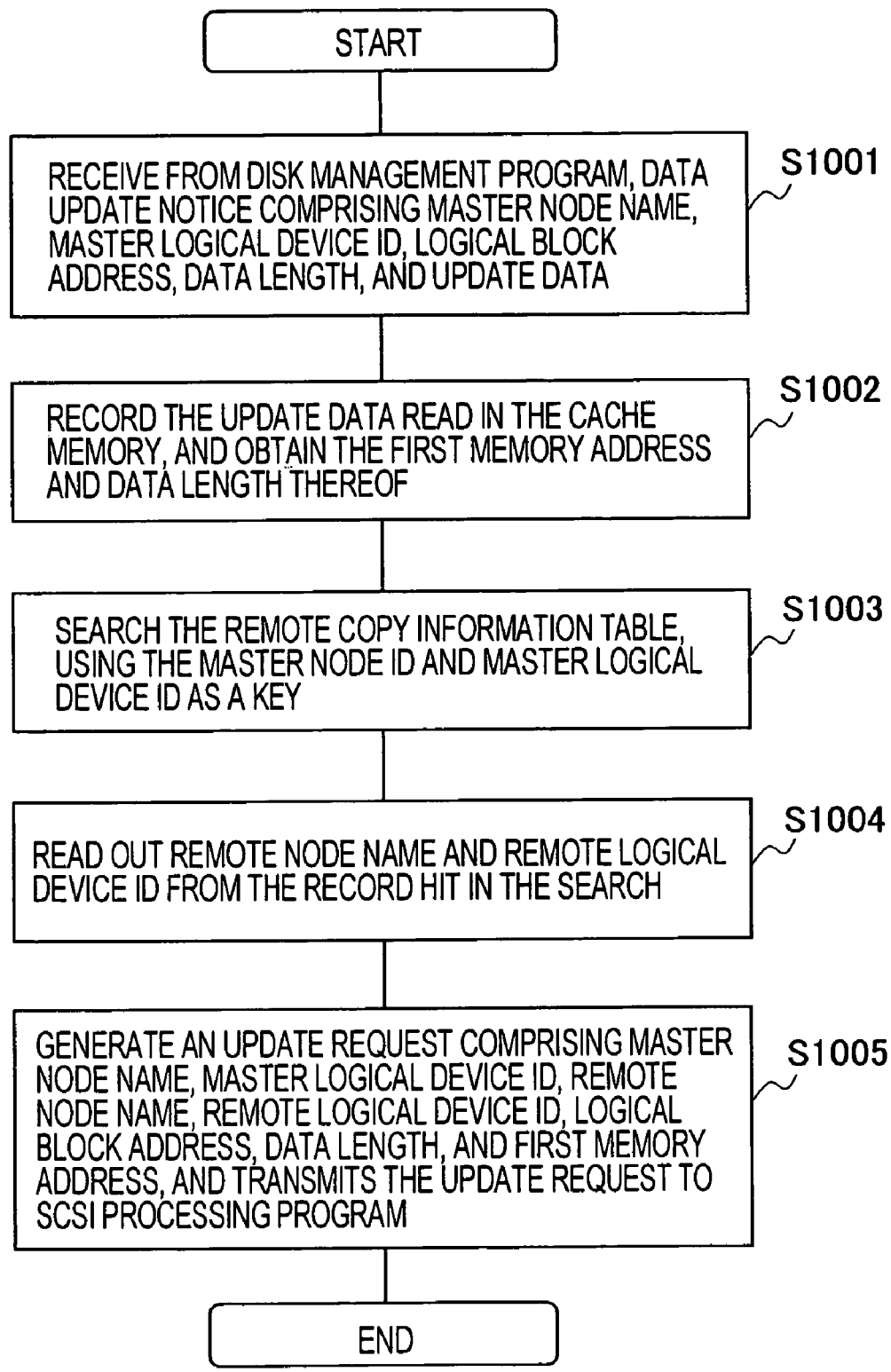
FIG. 10 is a flowchart showing operations of data update notice receive processing according to the first embodiment of the present invention.

FIG. 10 is a flowchart showing operational procedures of the data update notice receive processing (S701) which is shown in FIG. 7. The CPU 109 in the master storage device 1 executes the remote copy program 206, whereby the above processing is executed in the master storage device 1. In the present processing, firstly, the master storage device 1 receives from the disk management program 207, a data update notice comprising a master node name, a master logical device ID, a logical block address, a first memory address, a data length and update data (S1001)

Next, the master storage device 1 records the update data which is read on the cache memory 305, and obtains the first memory address and the data length of the update data (S1002). Next, the master storage device 1 searches the remote copy information table 304, using the master node name and the master logical device ID as a key (S1003). Next, the master storage device 1 reads the remote node name and the remote logical device ID from the record hit in the search carried out in S1003 (S1004). Finally, the master storage device 1 assembles an update request comprising the master node name, the master logical device ID, the remote node name, the remote logical device ID, the logical block address, the data length and the first memory address (S1005), and then, this processing is completed.

Figure 11:
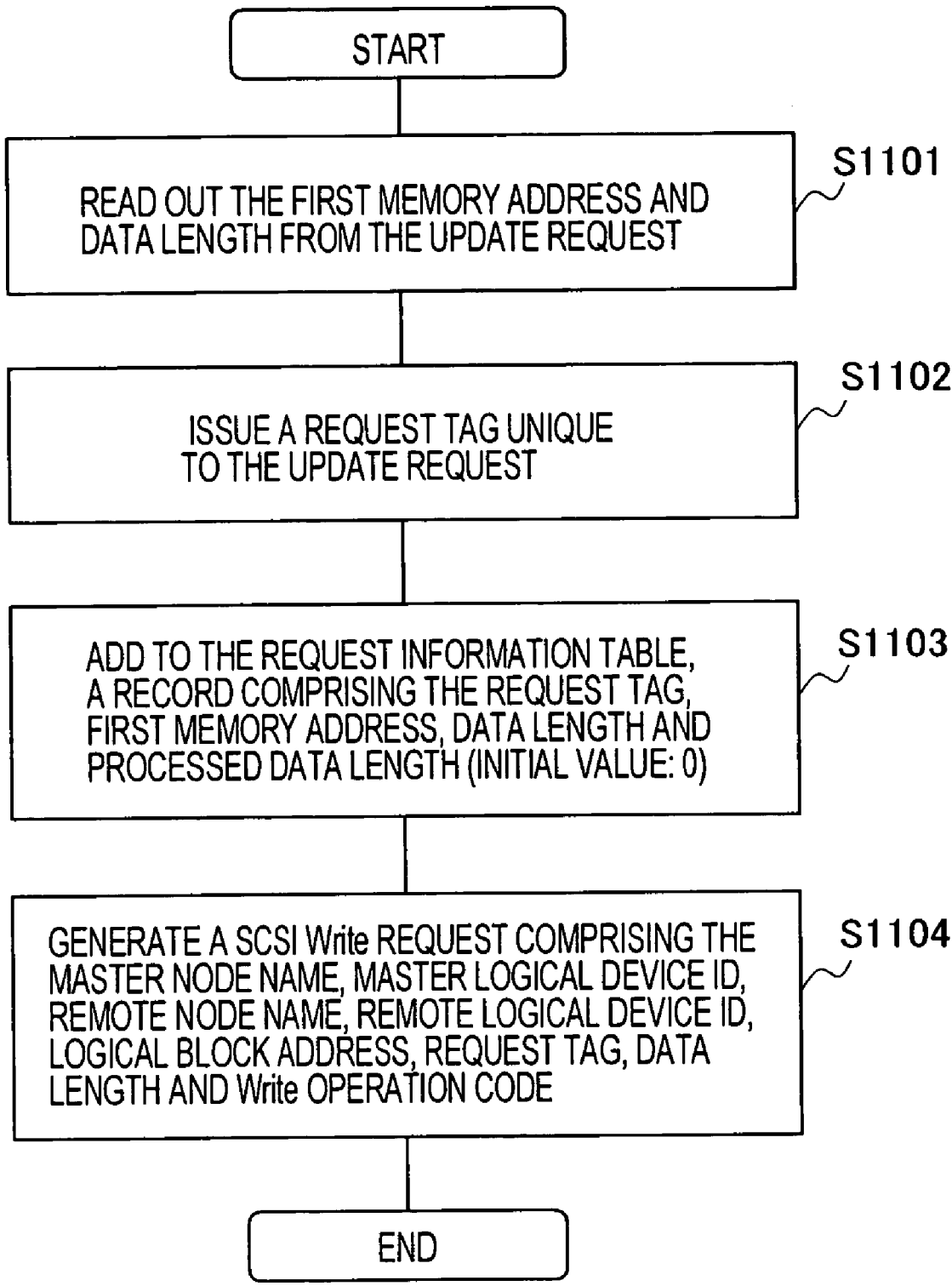
FIG. 11 is a flowchart showing operations of SCSI Write request generation processing according to the first embodiment of the present invention.

FIG. 11 is a flowchart showing operational procedures of the SCSI Write request generation processing (S702) which is shown in FIG. 7. The CPU 109 in the master storage device 1 executes the SCSI processing program 205, whereby the above processing is executed by the CPU 109 in the master storage device 1. In this processing, firstly, the master storage device 1 reads the first memory address and the data length from the update request (S1101). Next, the master storage device 1 issues a request tag which is unique in update request (S1102). Subsequently, the master storage device 1 adds to the task information table 303, a record comprising the request tag, the cache memory address, the data length and transmitted data length (initial value is zero) (S1103). Finally, the master storage device 1 assembles a SCSI Write request comprising the master node name, the master logical device ID, the remote node name, the remote logical device ID, the logical block address, the request tag, the data length and a Write operation code (S1104), and the present processing is completed.

Figure 12:
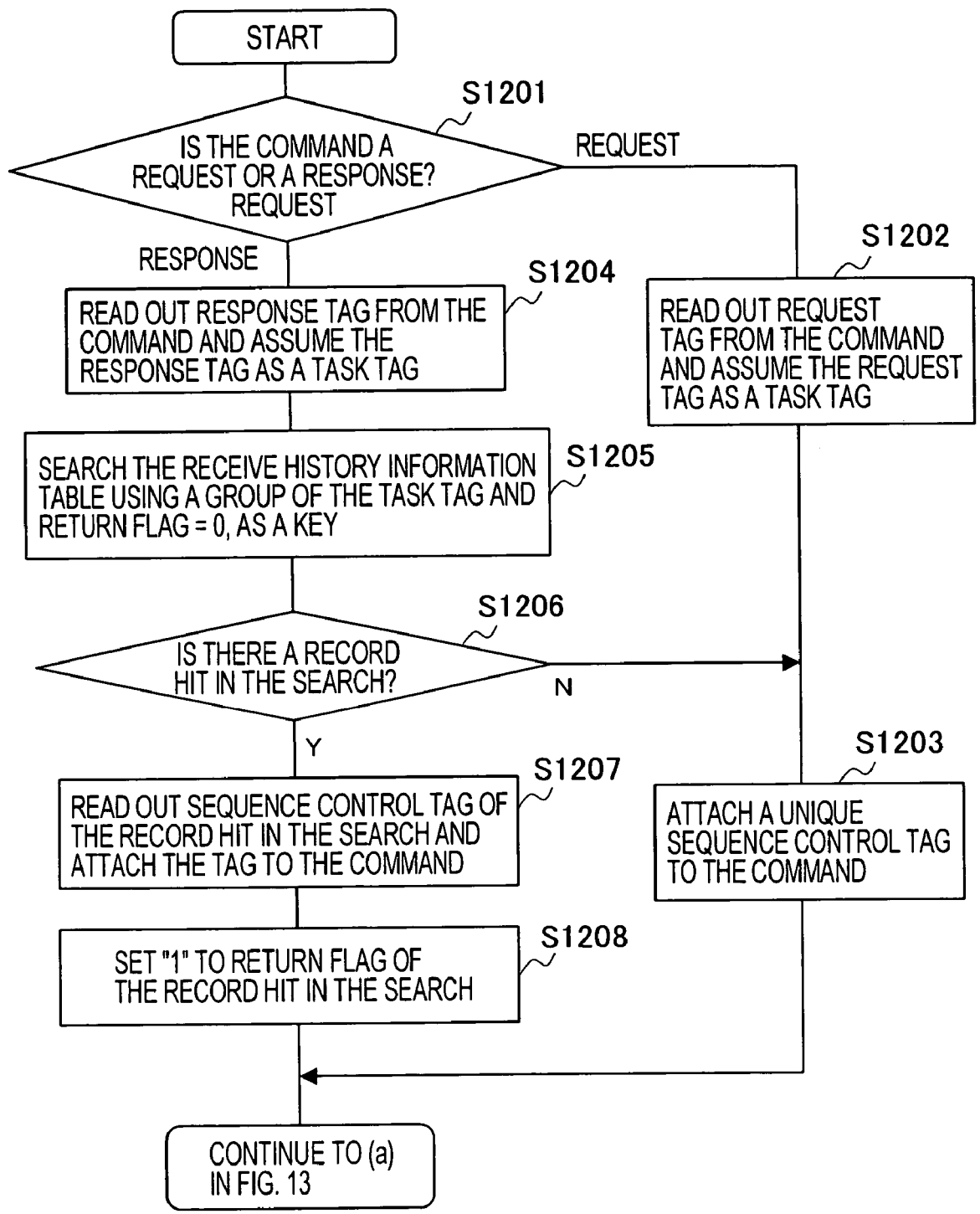
FIG. 12 is a flowchart showing operations of command redundant processing according to the first embodiment of the present invention.
Figure 13:
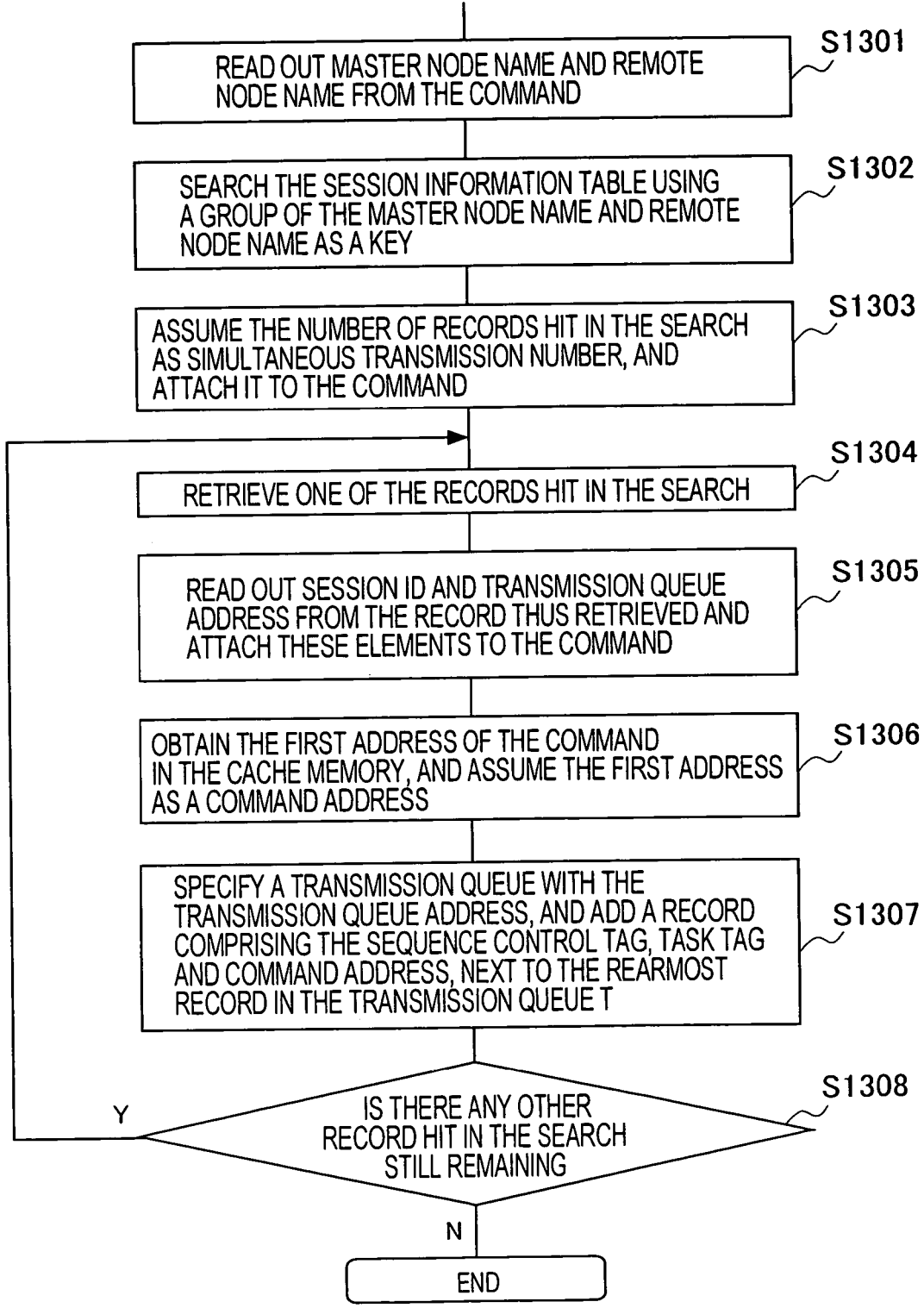
FIG. 13 is a flowchart showing operations of command redundant processing according to the first embodiment of the present invention.

FIG. 12 and FIG. 13 are flowcharts showing examples of operational procedures of the command redundant processing (S703, 712, 808, 820) being shown in FIG. 7 and FIG. 8. The CPU 109 in the master storage device 1 or in the remote storage device 2 executes the SCSI processing program 205, whereby the above processing is executed in the master storage device 1 or in the remote storage device 2. This processing branches depending on whether the command is a request or a response (S1201). When the command is a request, the storage device reads out a request tag from the command, the request tag being assumed to be a task tag (S1202), and then, the storage device attaches to the command a sequence control tag which is unique to the command (S1203), and executes the processing from S1301 (FIG. 13). On the other hand, when the command is a response, the storage device reads out a value of the response tag from the command, the response tag being assumed as a task tag (S1204). Then, the storage device searches the receive history information table 300 under the condition that the value thus read out matches the contents in the entry 3002 of the receive history information table, and the contents of the entry 3003 is "0" (S1205). Then, the processing of the storage device further branches according to a result of the search in S1205 (S1206). When there is a record hit in the search in S1205, the storage device reads out the sequence control tag of the record thus hit and attaches the sequence control tag to the command (S1207). In addition, the storage device sets the return flag value of the record thus hit as "1" (S1208) On the other hand, if there is no record hit in the search, the storage device executes S1203.

Next, a storage device reads out the master node name and the remote node name from the command (S1301 (FIG. 13)). Subsequently, the storage device searches the session information table 302 for a record whose contents in the entry 3022 and the entry 3025 of the session information table 302 respectively match the master node name and the remote node name read out in S1301 (S1302). Then, assuming the number of records hit in the search in S1302 to be a simultaneous transmission number, and the storage device attaches the number to the command (S1303). Next, the storage device retrieves one record out of the records hit in the search (S1304). Subsequently, the storage device reads out the session ID (master IP address, master port number, remote IP address and remote port number) and a transmission queue address from the record thus retrieved, and attaches the session ID and the transmission queue address to the command (S1305). Next, the storage device obtains the first address within the transmission queue on the cache memory 306 where the command is stored, and the first address is assumed to be a command address (S1306). Then, the storage device specifies transmission queue information with the transmission queue address which is read out in S1305, and adds a record comprising the sequence control tag, the task tag, and the command address, next to the rearmost record in the transmission queue information table 301 (S1307). The storage device executes the processing from S1305 to S1307 with respect to all the records hit in the search in S1302 (S1308), and completes the processing.

In other words, with the processing as described above, the command is set in the transmission queues 306a, 306b which are provided respectively on the communication path A and the communication path B.

Figure 14:
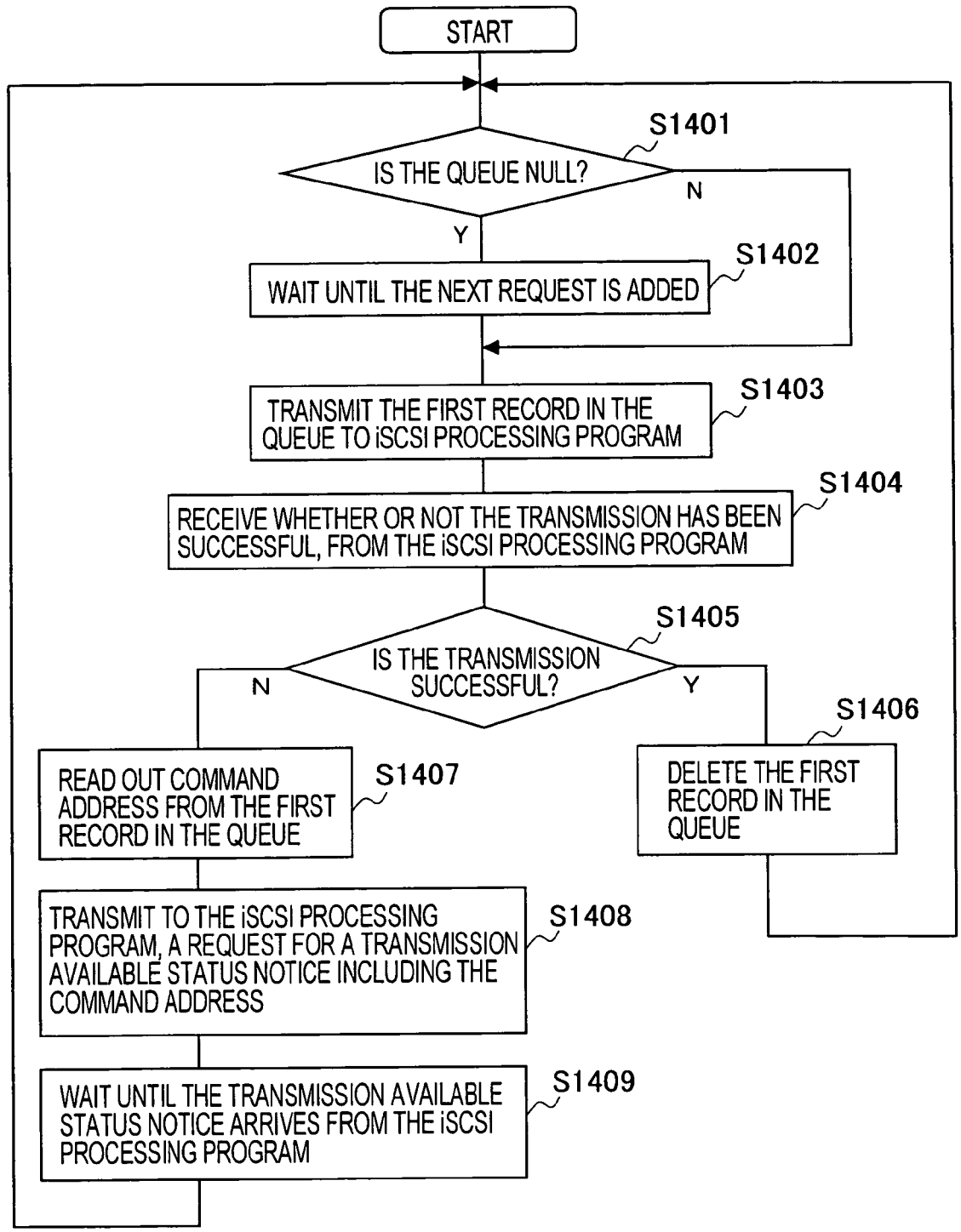
FIG. 14 is a flowchart showing operations of transmission queue control processing according to the first embodiment of the present invention.

FIG. 14 is a flowchart showing operational procedures of the transmission queue control processing (S704, 713, 809, 901) being shown in FIG. 7 to FIG. 9. The CPU 109 in the master storage device 1 or in the remote storage device 2 executes the iSCSI processing program 203, whereby the above processing is executed in the master storage device 1 or in the remote storage device 2. At first, this processing branches depending on whether the transmission queue is null or not (S1401). If the transmission queue is null, the storage device waits until the next record is added (S1402), and starts carrying out the processing from S1403 upon arrival of a command. On the other hand, if the transmission queue is not null, the storage device transmits data in the first record of the transmission queue, i.e., the data in the first record of the transmission queue information table 301, to the iSCSI processing program (S1403). Next, when the storage device receives information from the iSCSI processing program indicating whether or not data transmission has been successful in S1403 (S1404), the processing branches depending on whether the data transmission has been successful or not (S1405). If the transmission has been successful, the storage device deletes the first data in the transmission queue, that is, the first record in the transmission queue information table 301 (S1406), and the processing is returned to S1401. On the other hand, when the transmission has not been successful, the storage device reads out a command address from the first record in the transmission queue information table 301 (S1407), and sends a request for a transmission available status notice including the command address read out in S1407 to the iSCSI processing program (S1408). The storage device waits until it receives from the iSCSI processing program the transmission available status notice indicating that a free space is created in a buffer for transmission in the memories 111, 115 of the network interfaces 110, 114 (S1409), and when the transmission available status notice is received, the processing is returned to S1401. When the iSCSI processing program receives the request for transmission available status notice which has been sent in S1408, the program executes a transmission available status notice processing which will be explained with FIG. 16A and returns the transmission available status notice.

Figure 15:
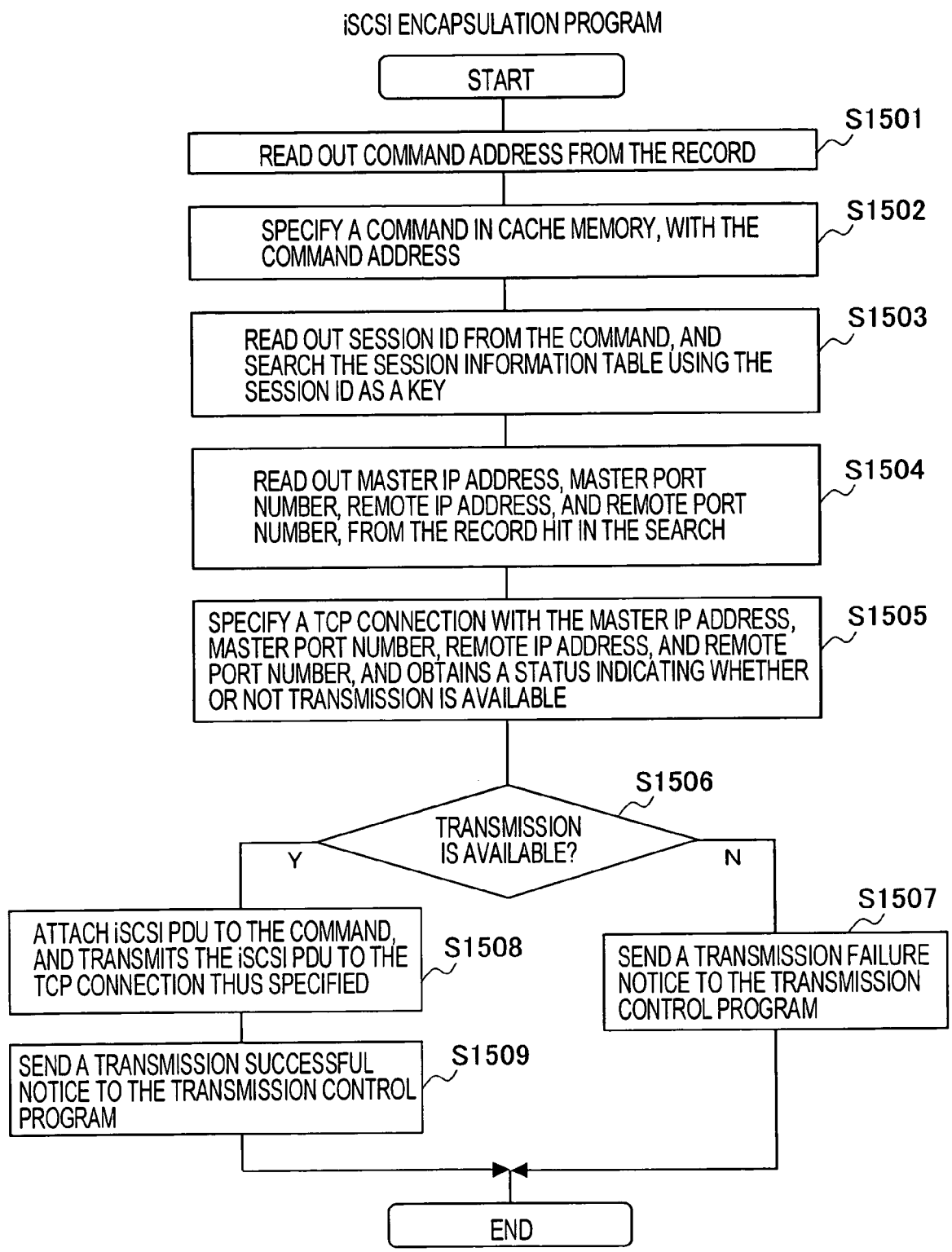
FIG. 15 is a flowchart showing operations of iSCSI encapsulation processing according to the first embodiment of the present invention.

FIG. 15 is a flowchart showing operational procedures of the iSCSI encapsulation processing (S705, 714, 810, 902) being shown in FIG. 7 to FIG. 9. The CPU 109 in the master storage device 1 or in the remote storage device 2 executes the iSCSI processing program 203, whereby the above processing is executed in the master storage device 1 or in the remote storage device 2. In this processing, firstly, the storage device reads out a command address from the record thus received (S1501), specifies a command on the cache memory with the command address (S1502), reads out a session ID from the command thus specified, and searches the session information table 302 using the session ID as a key (S1503). Then, the storage device reads out from the record hit in the search in S1503, the master IP address, the master port number, the remote IP address and the remote port number (Sl504) Next, the storage device specifies a TCP connection with the information read out in S1504, and obtains a status indicating whether transmission is available or not as to the TCP connection (S1505). At the last, the processing branches depending on whether the status of the TCP connection obtained in S1505 indicates that the transmission is available or not (S1506). If the status of the TCP connection indicates that the transmission is available, the storage device attaches an iSCSI PDU header to the command specified in S1502, creates an iSCSI PDU, and transmits the iSCSI PDU to the TCP connection specified in S1505 (S1508). Thereafter, the storage device sends a transmission successful notice to the transmission control program 202 (S1509), and the present processing is completed. On the other hand, if the status of the TCP connection indicates that the transmission is not available, the storage device sends a transmission failure notice to the transmission control program 202 (S1507), and this processing is completed.

Figure 16A:
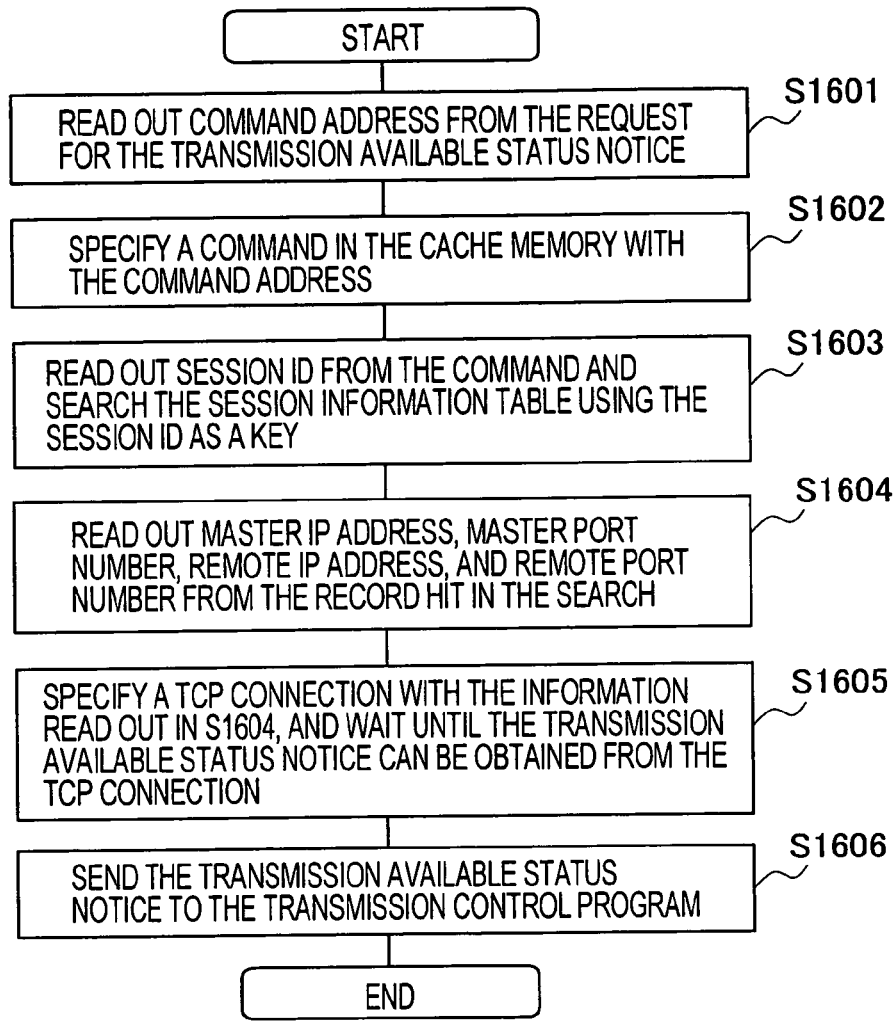
FIGS. 16A and 16B include flowcharts showing each processing in the first embodiment of the present invention.

FIG. 16A is a flowchart showing operational procedures of the transmission available status notice processing. The CPU 109 in the master storage device 1 or in the remote storage 2 executes the iSCSI processing program 203, whereby the above processing is executed in the master storage device 1 or in the remote storage device 2. In this processing, firstly, the storage device reads out a command address from the request for the transmission available status notice thus received (S1601), specifies a command on the cache memory with the command address (S1602), reads out a session ID from the command thus specified, and searches the session information table 302 using the session ID as a key (S1603). Then, the storage device reads from the record hit in the search in S1603, the master IP address, the master port number, the remote IP address and the remote port number (S1604) Next, the storage device specifies a TCP connection with the information read out in S1604, and waits until the storage device obtains the transmission available status from the TCP connection (S1605). Thereafter, when the storage device obtains the transmission available status from the TCP connection, the storage device sends the transmission available status notice to the transmission control program (S1606).

Figure 16B:
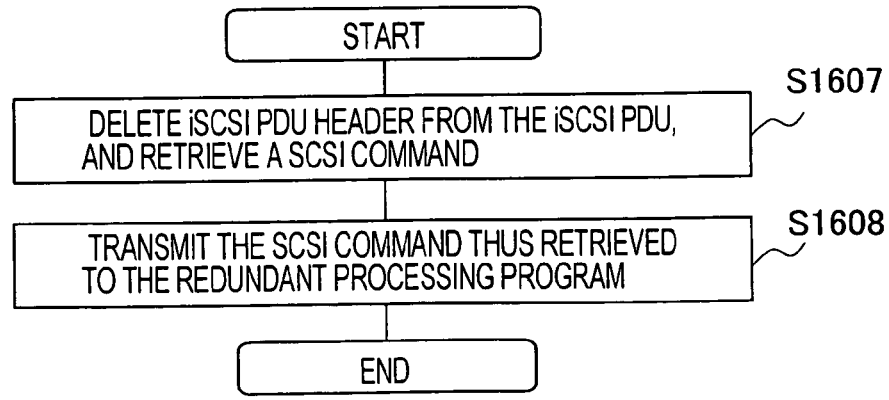

FIG. 16B is a flowchart showing operational procedures of the iSCSI decapsulation processing being shown in FIG. 7 to FIG. 9 (S708, 801, 804, 813, 816, 908, 905, and 913). The CPU 109 in the master storage device 1 or in the remote storage device 2 executes the iSCSI processing program 203, whereby the above processing is executed in the master storage device or in the remote storage device 2. At first, the storage device deletes the iSCSI PDU header from the iSCSI PDU, and retrieves a SCSI command (S1607). Then, the storage device transmits the SCSI command retrieved in S1607 to the redundant processing program 204 (S1608), and the processing is completed.

Figure 17:
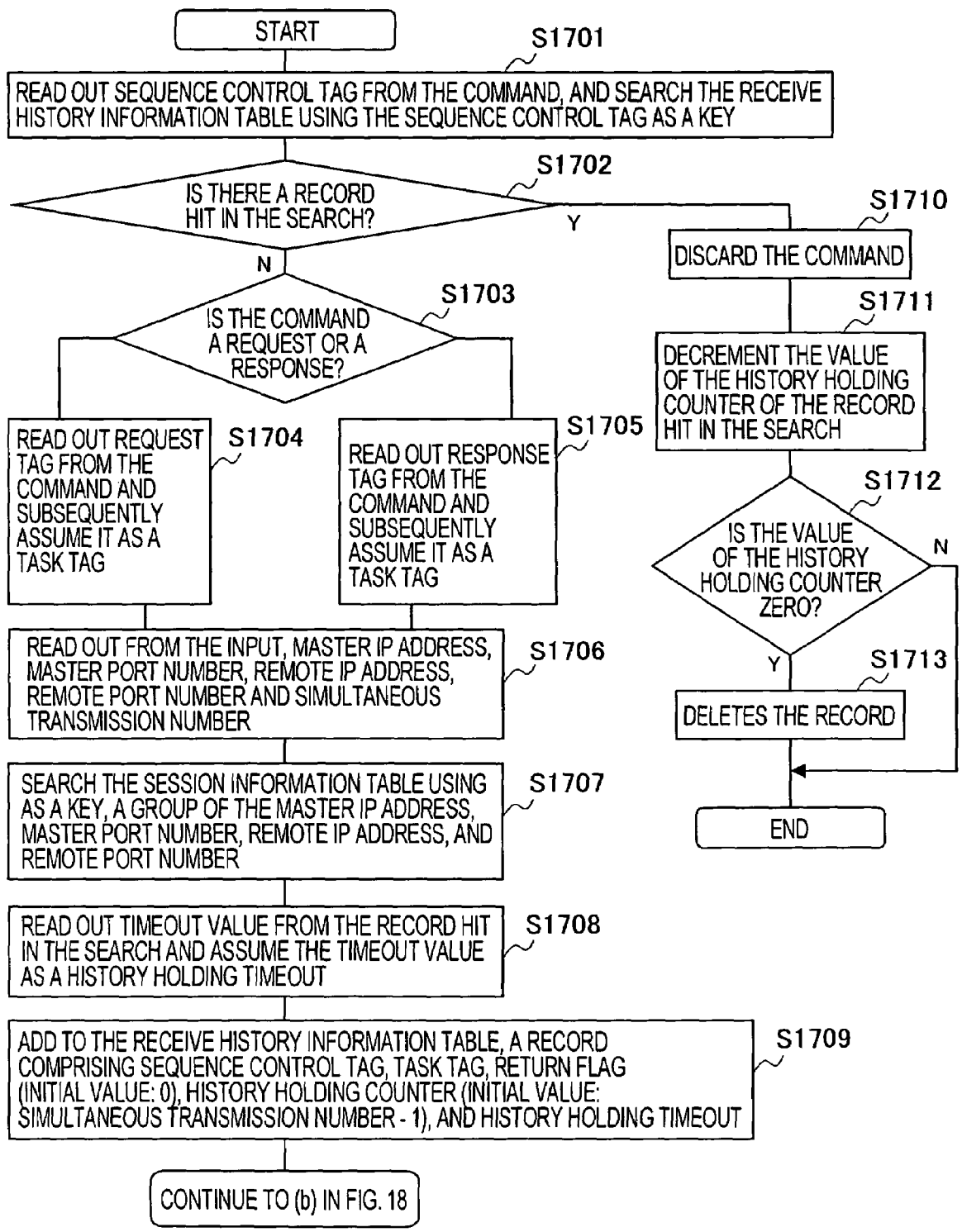
FIG. 17 is a flowchart showing operations of redundant command receive processing according to the first embodiment of the present invention.
Figure 18:
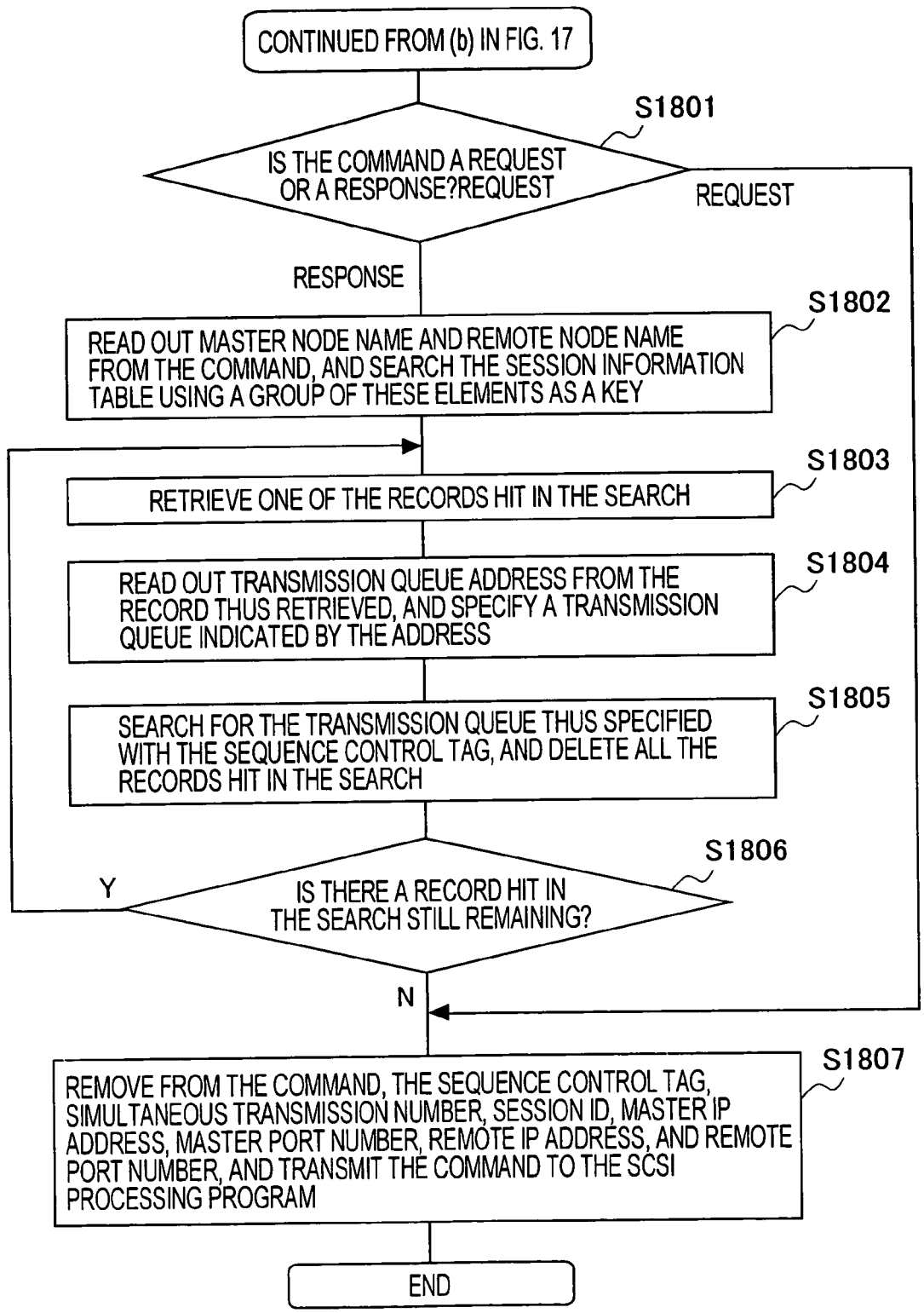
FIG. 18 is a flowchart showing operations of redundant command receive processing according to the first embodiment of the present invention.

FIG. 17 and FIG. 18 are flowcharts showing operational procedures of the redundant command receive processing being shown in FIG. 7 to FIG. 9 (S709, 802, 805, 814, 817, 906, 909, and 914). The CPU 109 in the master storage device 1 and in the remote storage device 2 executes the redundant receive control program 201, whereby the above processing is executed in the master storage device and in the remote storage device 2. In this processing, at first, the storage device reads out a sequence control tag from the command, and searches the receive history information table 300 by using the sequence control tag as a key (S1701). Next, the processing branches depending on the result of the search in S1701 (S1702). If there is a record hit in the search of S1701, firstly, the storage device discards the command (S1710), and decrements the value of the history holding counter 3005 of the record hit in the search (S1711). Next, if the value of the history holding counter 3005 becomes zero as a result of the processing in S1711, the storage device deletes the record from the table (S1712, S1713), and this processing is completed. On the other hand, if there is no record hit in the search of S1701, the processing branches depending on whether the command is a request or a response (S1703). If the command is a request, the storage device reads out a request tag from the command, and thereafter the request tag is assumed to be a task tag (S1704). If the command is a response, the storage device reads out a response tag from the command and thereafter the response tag is assumed to be a task tag (S1705). Next, the storage device reads out from the command the master IP address, the master port number, the remote IP address, the remote port number and the simultaneous transmission number (S1706). Then, the storage device searches the session information table 302 using as a key, a group of the master IP address, the master port number, the remote IP address and the remote port number (S1707). Next, the storage device reads out the timeout value 302a from the record hit in the search, and it is assumed to be a history holding timeout (S1708). Then, the storage device adds to the receive history information table 300, a record comprising the sequence control tag, the task tag, the return flag (initial value: 0), the history holding counter (initial value: simultaneous transmission number−1) and the history holding timeout (S1709)

Again, the processing branches depending on whether the command is a request or a response (S1801) If the command is a request, the processing from S1807 is carried out. On the other hand, if the command is a response, the storage device firstly reads out the master node name and the remote node name from the command, and searches the session information table 302 using a group of the master node name and the remote node name as a key (S1802). Next, the storage device retrieves one of the records which are hit in the search of S1802 (S1803). Next, the storage device reads out a transmission queue address from the record thus retrieved, and specifies a transmission queue indicated by the address (S1804). Then, the storage device searches the transmission queue information table 301 with the sequence control tag, as to the transmission queue thus specified, and all the records hit in the search are deleted (S1805). In other words, if there remains a request associated with this response in the transmission queue when a response is received, the request is deleted from the transmission queue. The storage device executes the processing from S1803 to S1805 with respect to all the records hit in the search of S1802 (S1806). At the last, the storage device removes from the command, the sequence control tag, the simultaneous transmission number, the master IP address, the master port number, the remote IP address and the remote port number, transmits the command to the SCSI processing program 205 (S1807), and this processing is completed. It is to be noted here that when a response is received and if there remains a request associated with the response, this request is deleted. However, it is also possible to configure such that when a request is received and if there remains a response associated with the request, this response is deleted.

Figure 19:
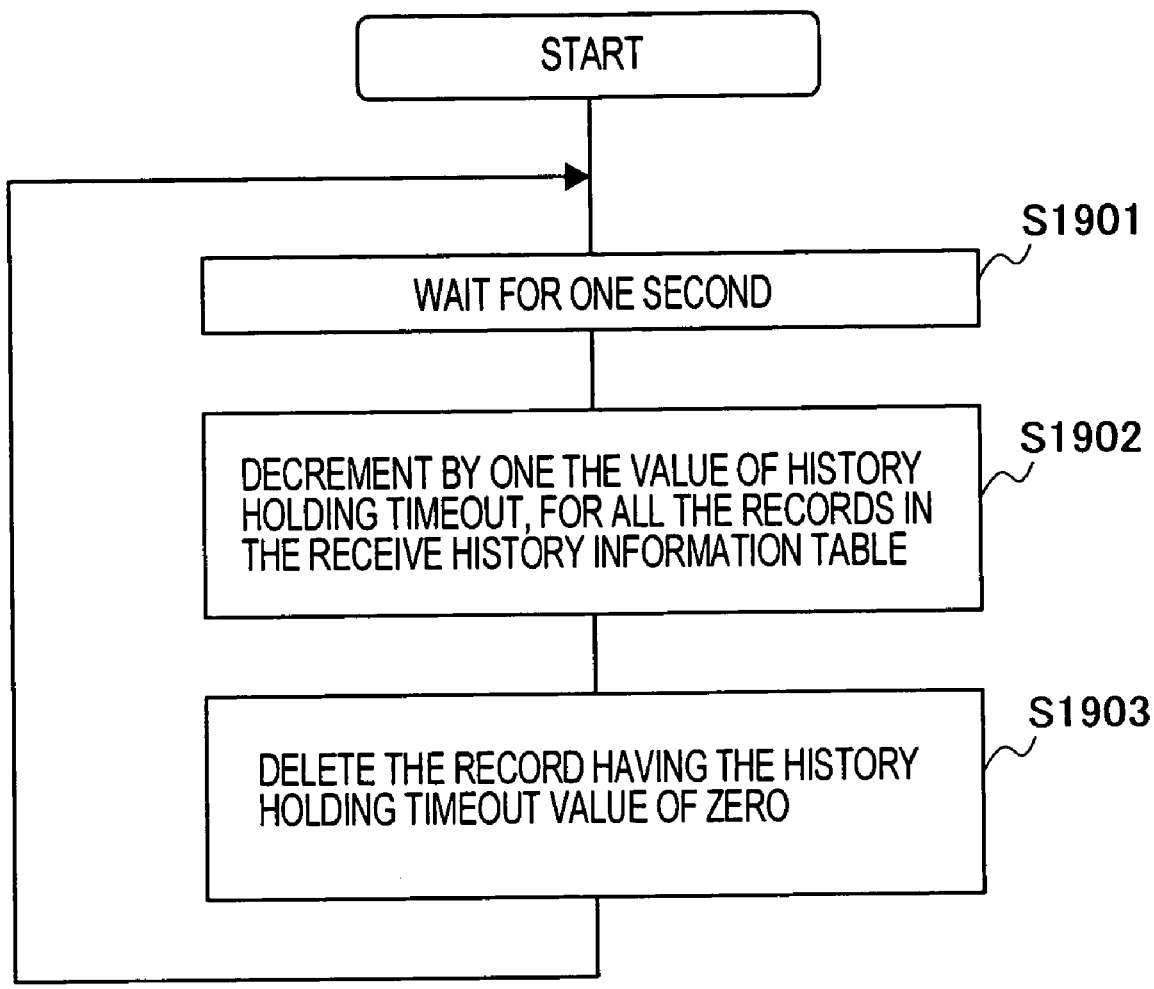
FIG. 19 is a flowchart showing operations of receive history timer control processing according to the first embodiment of the present invention.

FIG. 19 is a flowchart showing operational procedures of the receive history timer control processing (S710, 803, 806, 815, 818, 907, 910, 915) being shown in FIG. 7 to FIG. 9. The CPU 109 in the master storage device 1 or in the remote storage device 2 executes a timer control program 200, whereby the above processing is executed in the master storage 1 or in the remote storage 2.

Firstly, the storage device waits for one second (S1901). Then, the storage device decrements a value in the entry 3005 (history holding timeout) with respect to all the records in the receive history information table 300 (S1902). At the last, the storage device deletes the record that has a value of zero as to the entry 3005 (S1903), and the processing is returned to S1901. Here, the initial value of the history holding timeout is set to 10 seconds, and above processing is started from the time when there is an entry of record in the receive history information table 300.

Figure 20:
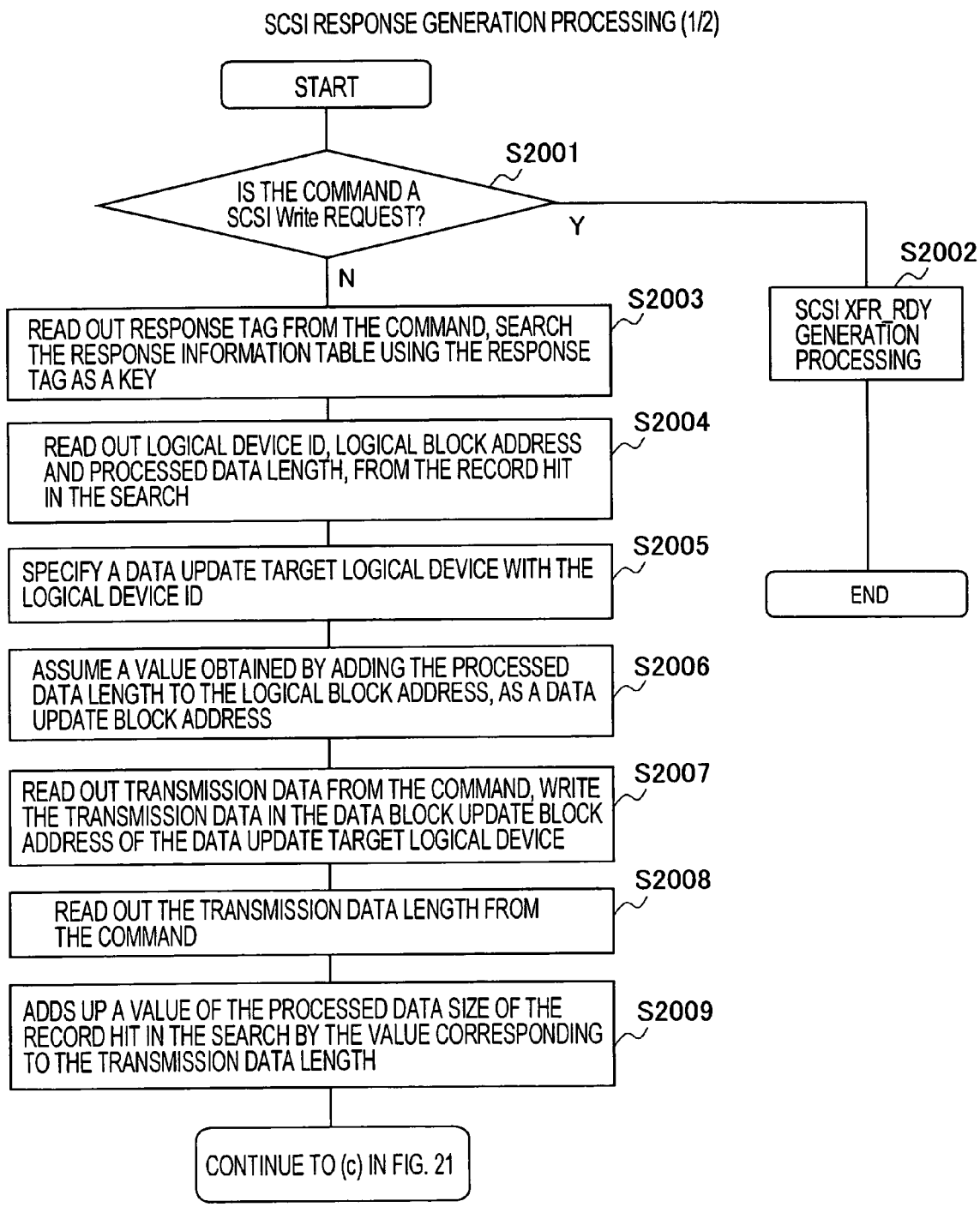
FIG. 20 is a flowchart showing operations of SCSI response generation processing according to the first embodiment of the present invention.
Figure 21:
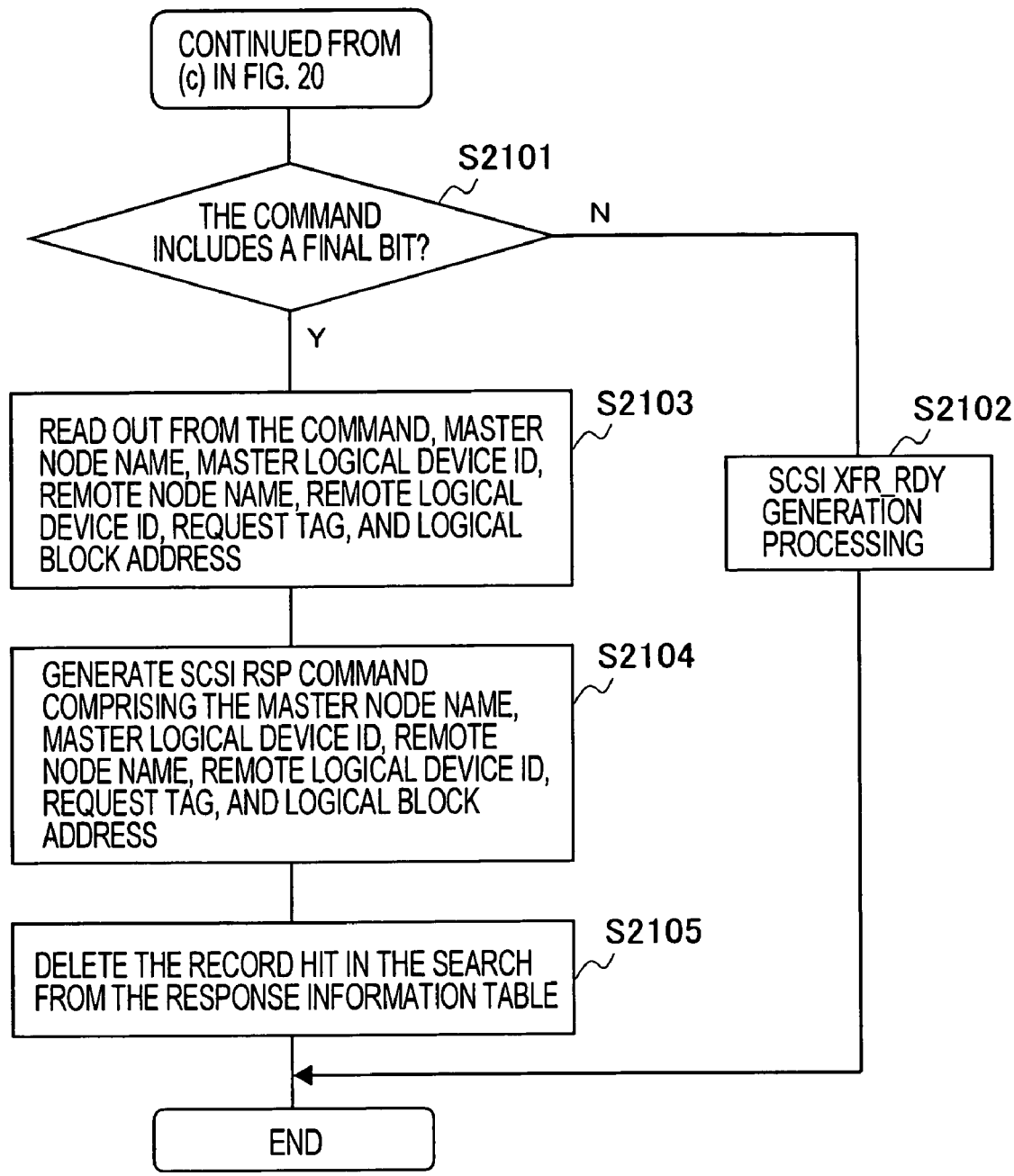
FIG. 21 is a flowchart showing operations of SCSI response generation processing according to the first embodiment of the present invention.

FIG. 20 and FIG. 21 are flowcharts showing operational procedures of the SCSI response generation processing (S711, 819) being shown in FIG. 7 and FIG. 8. The CPU 109 of the remote storage device 2 executes the SCSI processing program 205, whereby the above processing is executed in the remote storage device 2. Firstly, the processing branches depending on whether or not the command is a SCSI Write request (S2001). If the command is not a SCSI Write request, the remote storage device 2 executes a SCSI XFR_RDY generation processing which will be explained with FIG. 22 (S2002), and the SCSI response generation processing is completed. On the other hand, when the command is a SCSI Write request, the remote storage device 2 reads out a response tag from the command, and searches the response information table 303 using the response tag as a key (S2003). Next, the remote storage device 2 reads out the logical device ID, the logical block address and the processed data length from the record hit in the search (S2004). Then, the remote storage device 2 specifies a data update target logical device with the logic device ID (S2005). Next, the value obtained by adding the processed data length to the logical block address is assumed to be a data update block address (S2006). Then, the remote storage device 2 reads out transmission data from the command, and writes in the area within the data update target logical device specified in S2005, the beginning of the area being the data update block address (S2007). Then, the remote storage device reads out the transmission data length from the command (S2008). Next, the remote storage device 2 adds up a value of the processed data size of the record hit in the search in S2003 by the value corresponding to the transmission data length (S2009).

Next, the processing branches depending on whether or not the command includes a final bit (S2101). If the final bit is not included, the remote storage device 2 executes a SCSI XFR_RDY generation processing (S2102) which will be explained with FIG. 22, and the SCSI response generation processing is completed. On the other hand, if the command includes a final bit, the remote storage device 2 reads from the command, the master node name, the master logical device ID, the remote node name, the remote logical device ID, the request tag, and the logical block address (S2103). Next, the remote storage device 2 generates a SCSI RSP response comprising the master node name, the master logical device ID, the remote node name, the remote logical device ID, the request tag, and the logical block address (S2104). At the last, the remote storage device 2 deletes the record hit in the search in S2003 from the response information table 303 (S2105), and this processing is completed.

Figure 22:
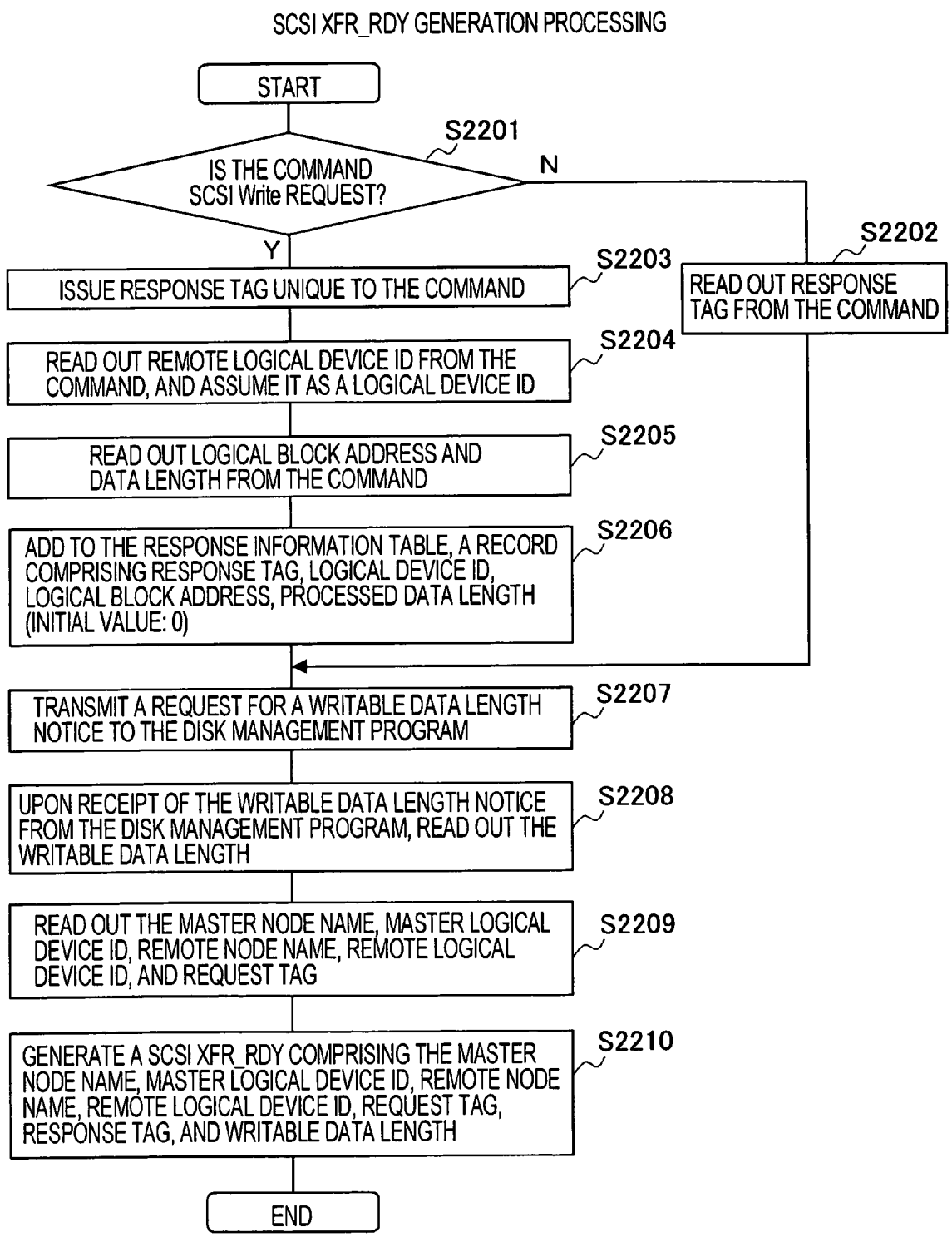
FIG. 22 is a flowchart showing operations of SCSI XFR_RDY generation processing according to the first embodiment of the present invention.

FIG. 22 is a flowchart showing operational procedures of the SCSI XFR_RDY generation processing being shown in FIG. 20 and FIG. 21 (S2002, 2102). The CPU 109 of the remote storage device 2 executes the SCSI processing program 205, whereby the above processing is executed in the remote storage device 2. This processing firstly branches depending on whether or not the command is the SCSI Write request (S2201). If the command is not the SCSI Write request, the remote storage device 2 reads a response tag from the command (S2202), and executes the processing from S2207. If the command is the SCSI Write request, the remote storage device 2 issues a response tag which is unique to the command (S2203). Then, the remote storage device 2 reads out from the command a value of the remote logical device ID, and the value is assumed to be a logical device ID (S2204). Next, the remote storage device 2 reads out the logical block address and the data length from the command (S2205). Then, the remote storage device 2 adds to the response information table 303, a record comprising the response tag issued in S2203, the logical device ID and the logical block address read out in S2202, and processed data length (initial value: 0) (S2206). Next, the remote storage device 2 transmits a request for a writable data length notice to the disk management program 207 (S2207), thereafter, upon receipt of the writable data length notice, the remote storage device 2 reads out a writable data length from the notice (S2208). Next, the remote storage device 2 reads out from the command, the master node name, the master logical device ID, the remote node name, the remote logical device ID and the request tag are read out (S2209). At the last, the remote storage device 2 assembles a SCSI XFR_RDY comprising the master node name, the master logical device ID, the remote node name, the remote logical device ID, the request tag, the response tag, and the writable data length (S2210), and this processing is completed.

Figure 23:
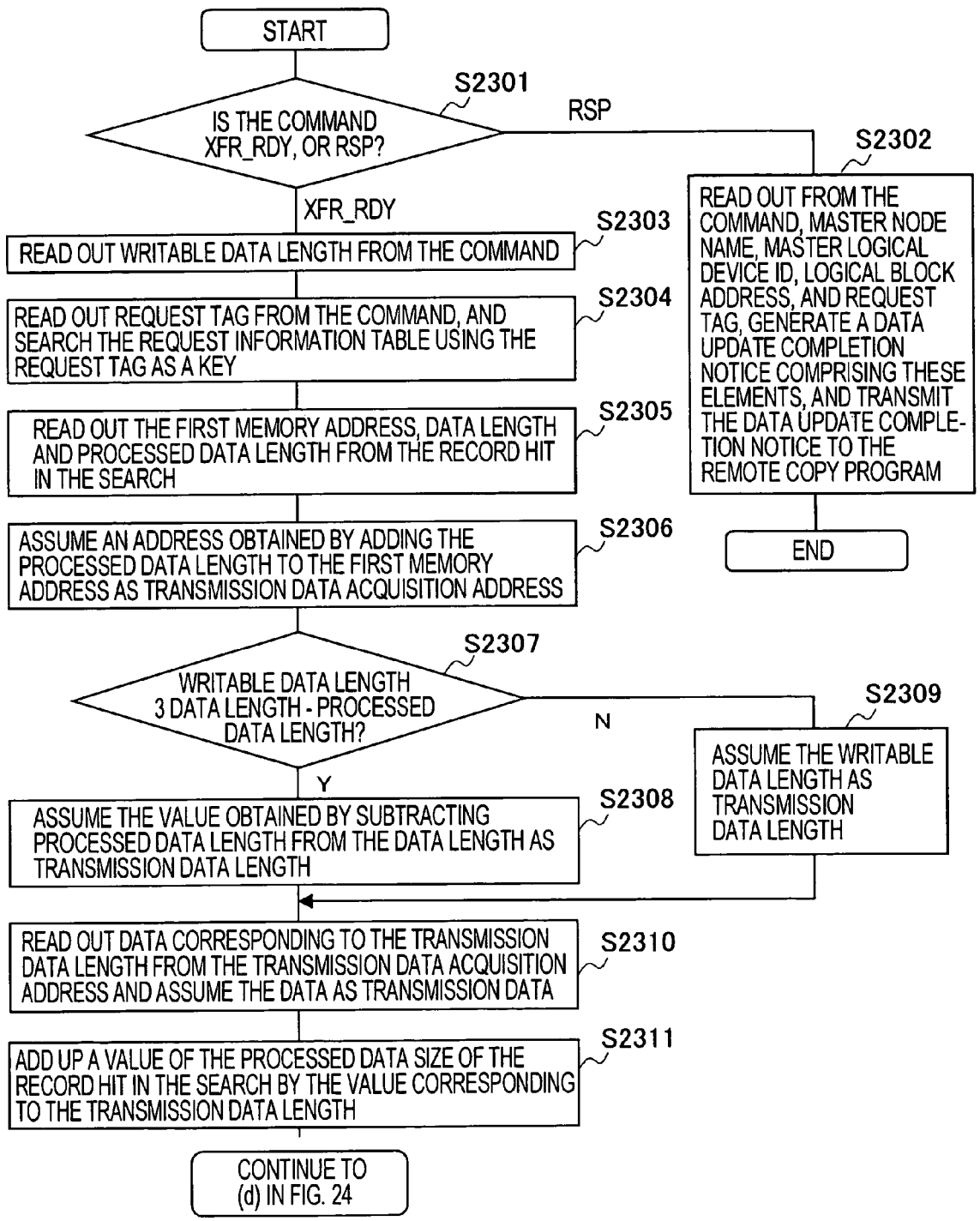
FIG. 23 is a flowchart showing operations of SCSI response receive processing according to the first embodiment of the present invention.
Figure 24:
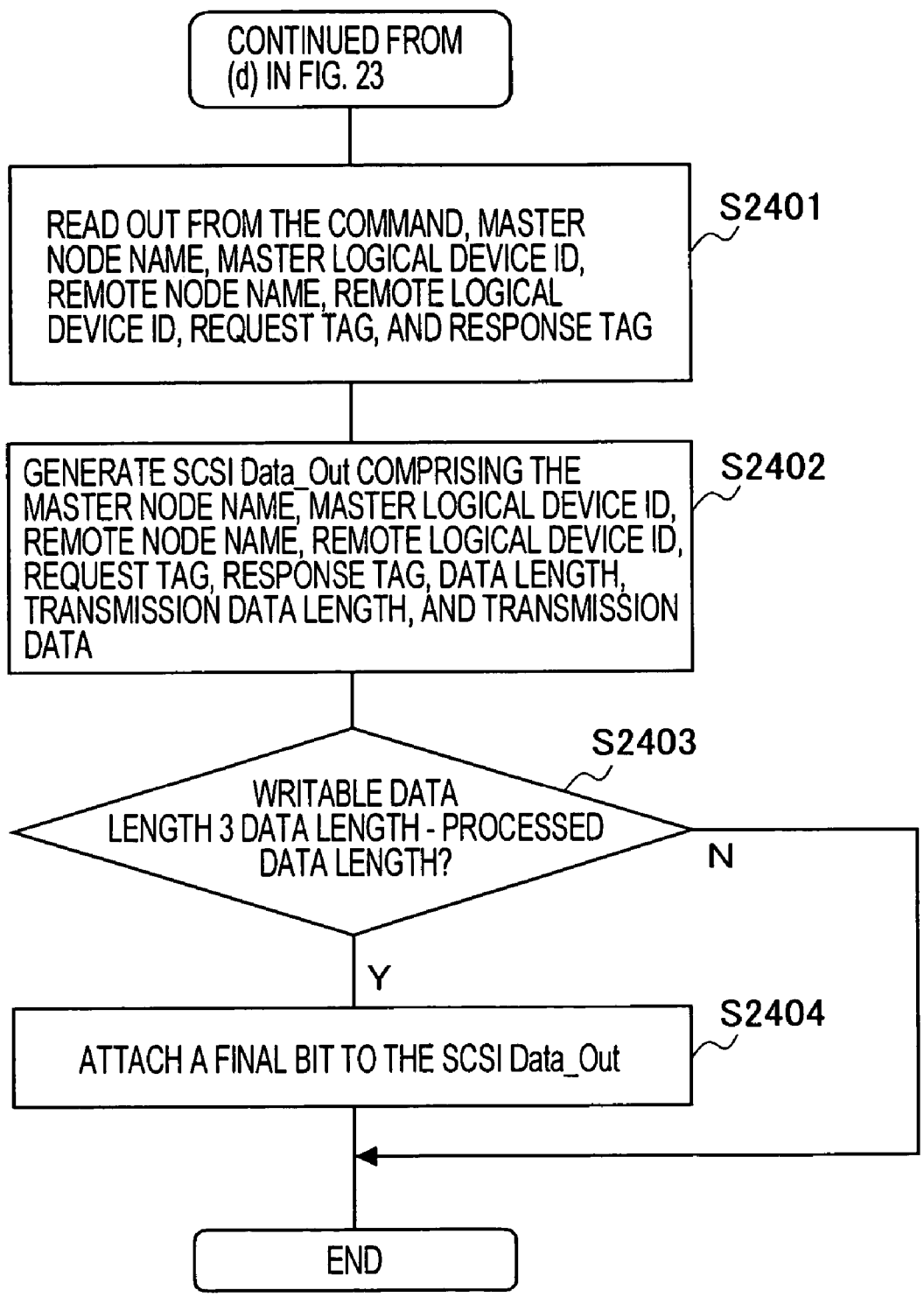
FIG. 24 is a flowchart showing operations of SCSI response receive processing according to the first embodiment of the present invention.

FIG. 23 and FIG. 24 are flowcharts showing operational procedures of the SCSI response receive processing (S807, 911) being shown in FIG. 8 and in FIG. 9. The CPU 109 in the master storage device 1 executes the SCSI processing program 205, whereby the above processing is executed in the master storage device 1. The present processing firstly branches depending on whether the received command is XFR_RDY or RSP response (S2301). If the command is the RSP response, the master storage device 1 reads out from the command, the master node name, the master logical device ID, the logical block address and the request tag, creates a data update completion notice comprising the elements above, and then, transmits the notice to the remote copy program 206 (S2302). Then, the present processing is completed. On the other hand, if the command is the XFR_RDY response, the master storage device 1 reads out the writable length from the command (S2303), also reads out the request tag from the command, and searches the request information table 304 using the request tag as a key (S2304). Next, the master storage device 1 reads out the first memory address, the data length and the processed data length from the record hit in the search of S2304 (S2305). Then, the address obtained by adding the processed data length to the first memory address by the master storage device 1 is assumed to be a transmission data acquisition address (S2306).

Next, if the writable data length is equal to or longer than the result by subtracting the processed data length from the data length (S2307), the value obtained by subtracting the processed data length from the data length is assumed to be a transmission data length (S2308). Otherwise, the writable data length is assumed to be the transmission data length (S2309) Next, data corresponding to the transmission data length from the transmission data acquisition address is assumed to be the transmission data (S2310). Next, the master storage device 1 adds up a value of the processed data size of the record hit in the search in S2304 by the value corresponding to the transmission data length (S2311).

Next, the master storage device 1 reads out from the command, the master node name, the master logical device ID, the remote node name, the remote logical device ID, the request tag and the response tag (S2401) Then, the master storage device 1 assembles a SCSI DATA_OUT request comprising the master node name, the master logical device ID, the remote node name, the remote logical device ID, the request tag, the response tag, the data length, the transmission data length and the transmission data (S2402). At the last, if the remote data length is equal to or longer than the result obtained by subtracting the processed data length from the data length (S2403), the master storage device 1 attaches a final bit to the SCSI DATA_OUT response which has been assembled in S2402 (S2404). Then, the present processing is completed.

Figure 25:
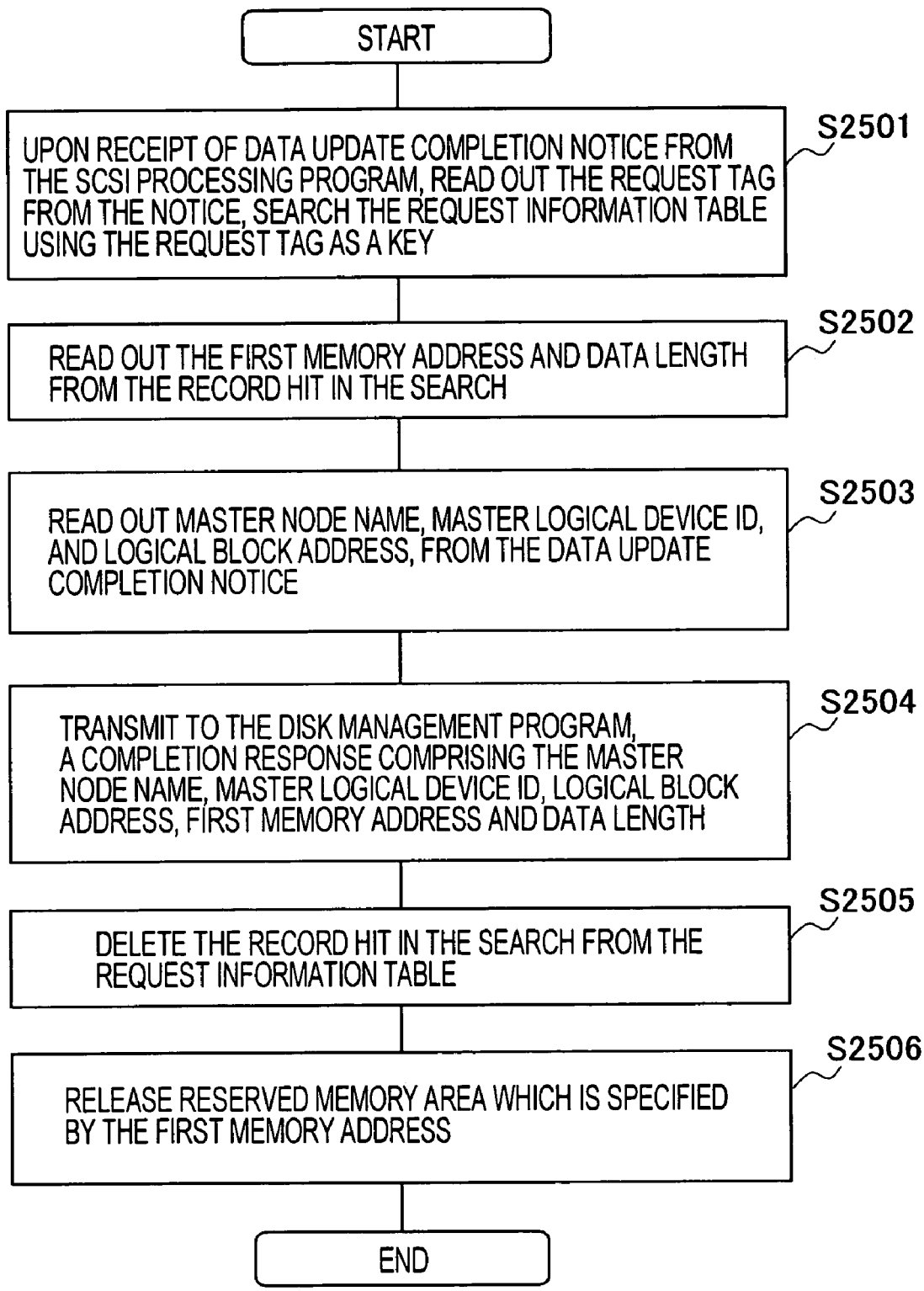
FIG. 25 is a flowchart showing operations of completion response transmission processing according to the first embodiment of the present invention.

FIG. 25 is a flowchart showing operational procedures of the completion response transmission processing (S912) being shown in FIG. 9. The CPU 109 in the master storage device 1 executes the remote copy program 206, whereby the above processing is executed in the master storage device 1. In this processing, firstly upon receipt of a data update completion notice, the master storage device 1 reads out the request tag from the data update completion notice, and searches the request information table 303 using the request tag as a key (S2501). Next, the master storage device 1 reads out the first memory address and the data length from the record hit in the search of S2501 (S2502). Then, the master storage device 1 reads out the master node name, the master logical device ID and the logical block address from the data update completion notice (S2503). Next, the master storage device 1 transmits a completion response comprising the master node name, the master logical device ID, the logical block address and the data length to the disk management program 207 (S2504). Next, the master storage device 1 deletes the record hit in the search, from the request information table 303 (S2505). At the last, the master storage device 1 specifies and releases the memory area already reserved with the first memory address (S2506), and the present processing is completed.

Figure 39A:
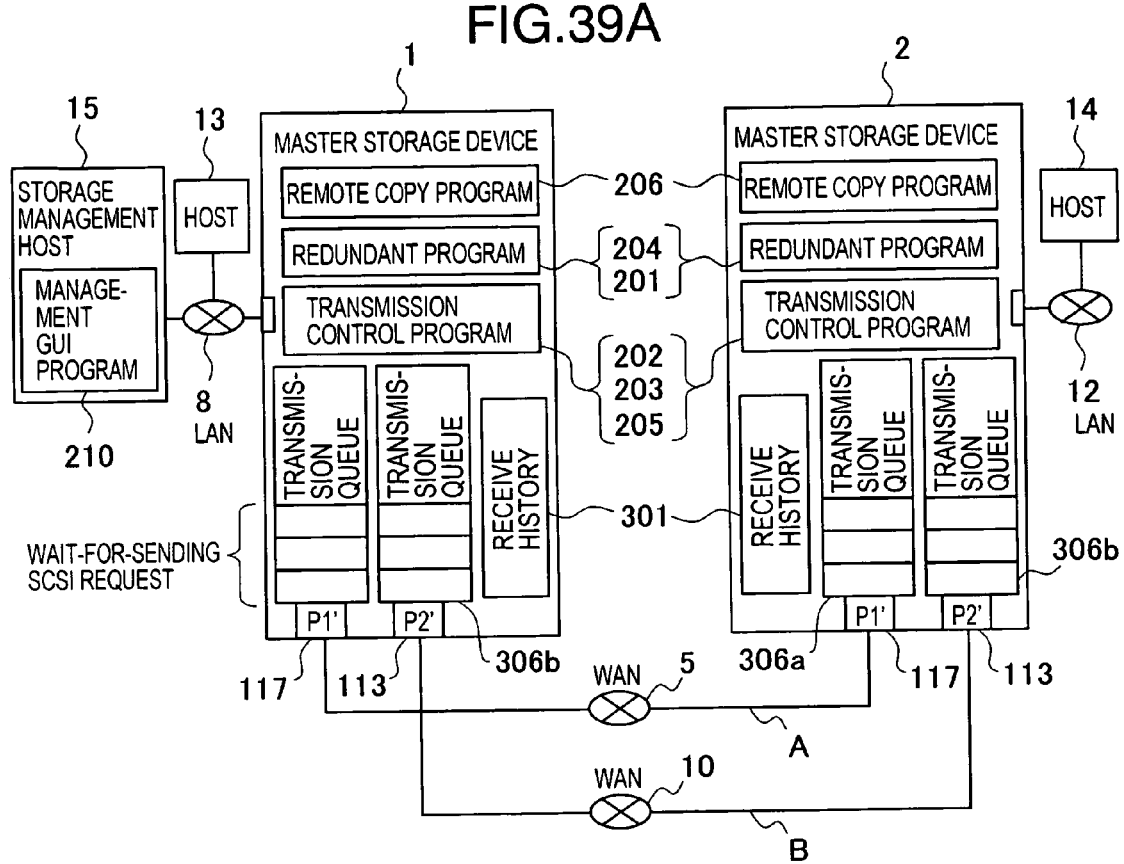
FIGS. 39A and 39B include diagrams schematically showing the first embodiment of the present invention.
Figure 39B:
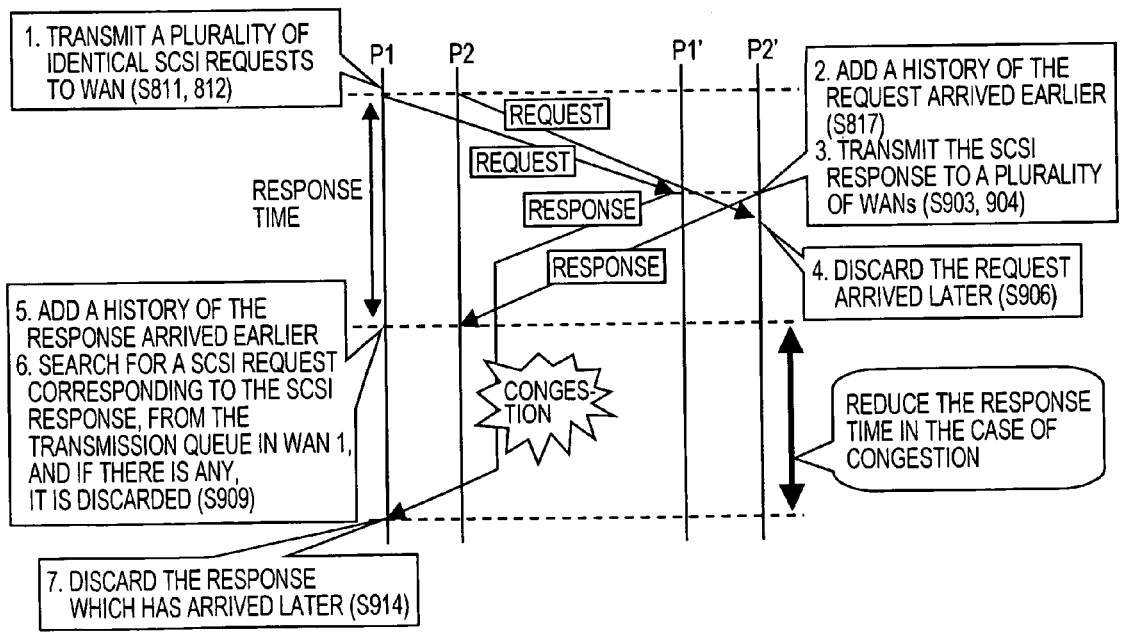

In the present embodiment, as shown in FIG. 39, each of the storage devices 1, 2 are provided with transmission queues 306a, 306b respectively for the transmission paths A, B, and the same request data items or the same response data items are respectively stored in the transmission queues 306a and 306b. Then, the request data items or the response data items are transmitted to the counterpart storage device 2 and storage device 1, via the transmission paths A and B respectively. The counterpart storage devices 2 and 1 store a history of the request data item or the response data item, which has arrived earlier, in the received history information table 300, and discard the request data or the response data arrived later. Furthermore, when the storage device 1 as a transmission source of the request data receives at least one response data corresponding to the request data, the storage device 1 searches the transmission queues 306a, 306b. Then, if there remains any request data in the transmission queues 306a, 306b, the storage device deletes the request data.

Therefore, in the first embodiment, in the case where a remote copy using the iSCSI is carried out, when a large difference occurs in transmission rate among a plurality of communication paths due to a property of TCP/IP, it is prevented that the number of requests to be transmitted in the communication path with a low rate becomes exceedingly larger than the number of requests to be transmitted in the communication path with a high rate. Therefore, it is possible to prevent an increase of the response time difference among a plurality of communication paths. In addition, it is also possible to reduce the amount of data sent out into the communication path with a low rate, thereby enhancing the transmission rate in this communication path. In other words, in the present embodiment, it is possible to prevent stagnation of remote copying in the case of failure of the communication path with a high rate, and further prevent a halt of key business operations. In addition, useless data transmission can be cut down, and a waste of bandwidth of the communication path can be reduced.

The second embodiment is directed to a storage system having a host and a storage device, which carries out a storage access by use of iSCSI between the host and the storage device.

Figure 26:
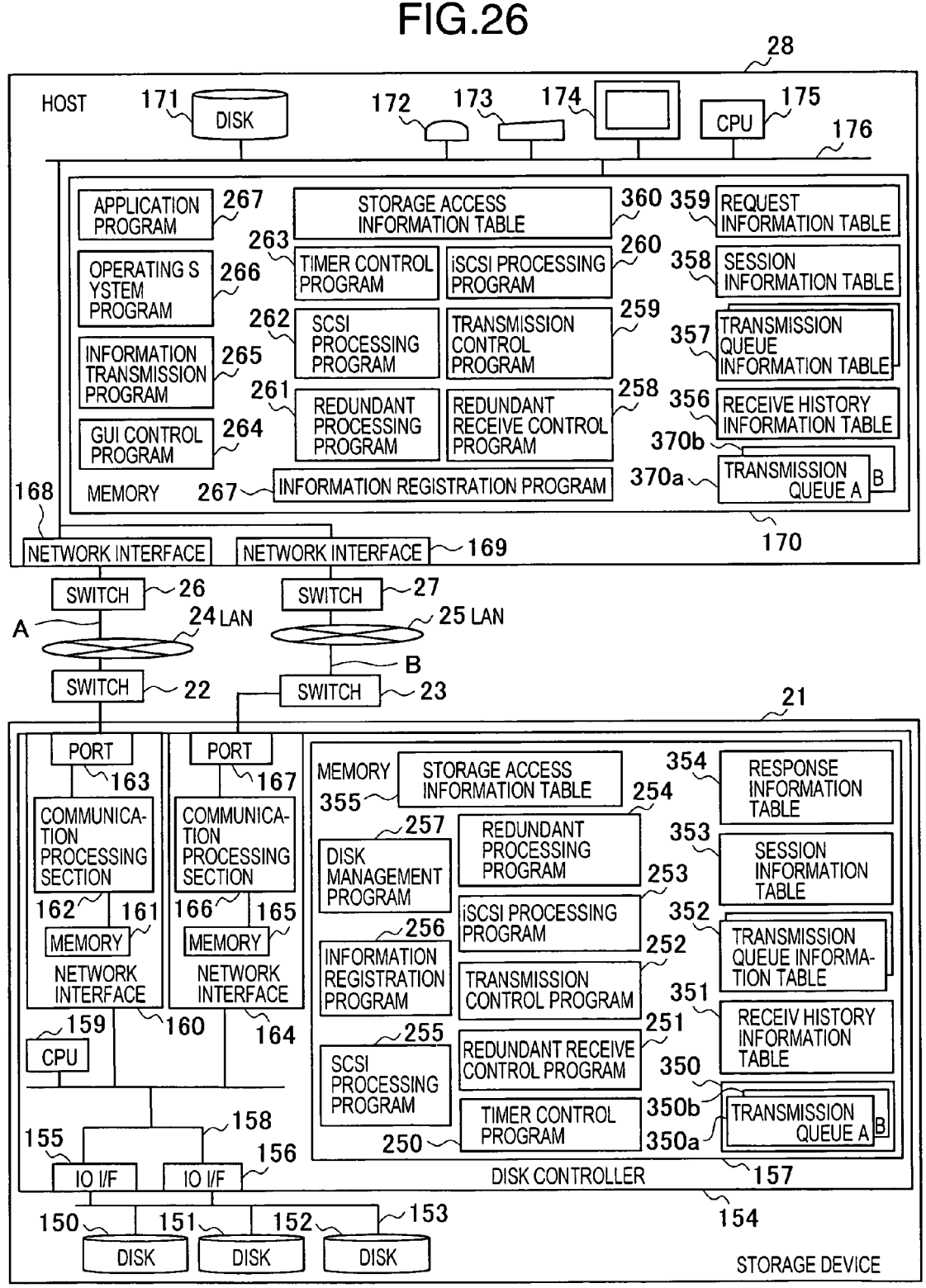
FIG. 26 is an explanatory diagram showing a structural example of a storage system according to the second embodiment of the present invention.

FIG. 26 is a diagram showing a configuration example of a storage system according to the second embodiment. As described above, this storage system comprises the host 28 and the storage device 21, and they are connected via a primary path A comprising a switch 22, LAN 24 and a switch 26, and via a secondary path B comprising a switch 23, LAN 25 and a switch 27.

The storage device 21 is a storage system having a single storage unit or a plurality of storage units. The storage unit includes equipment which utilizes a nonvolatile storage medium, such as hard disk drive and DVD. It may be possible to employ RAID configuration in this storage system. The storage device 21 comprises a plurality of storage units (hereinafter, referred to as "disk") 150,151, 152, a disk controller 154 which controls data read or data write from/to these disks 150, 151, 152, and an IO path 153 which is a communication line such as a bus to establish a connection between each of the disks 150, 151, 152 and the disk controller 154.

The disk controller 154 comprises network interfaces 160, 164 to communicate with other devices via the switch 22 or the switch 23, a memory 157 to store various programs and the like, a CPU 159 which executes each program stored in the memory 157, an IO I/F 155 which is an interface to connect the disk controller 154 with the IO path 153, and communication line 158 such as a bus (hereinafter referred to as "internal bus").

The memory 157 stores, information registration program 256 which is executed when the storage device registers received information into the storage means such as a table, a disk management program 257 which is executed when the data stored in the disk is updated, SCSI processing program 255 which is executed when a SCSI command is generated for data write/read, a redundant processing program 254 which is executed when a redundant processing for the SCSI command is carried out, iSCSI processing program 253 which is executed when the SCSI command is encapsulated with TCP/IP, a transmission control program 252 which is executed when the SCSI command thus encapsulated is transmitted to the network interface 160, 164, a redundant receive control program 251 which is executed when a redundant command receive processing for processing the SCSI commands in order of arrival, which have been received redundantly, and a timer control program 250 which is executed when the receive history is erased according to a lapse of time.

The memory 157 further stores a cache memory 350 which stores update data caused by writing the data read out from the disk, a storage access information table 355 which stores correspondence information between identifies of the storage device and logical disks within the storage device, and identifiers of the host and logical disks within the host, which access the data stored in the storage device and the logical disks, a response information table 354 which stores information for uniquely identifying a group of a series of SCSI responses which are generated by a certain data write/read, out of the SCSI requests and responses, a session information table 353 which stores information of the iSCSI session established between the host 28 and the storage device 21, a transmission queue information table 352 which stores wait-for-sending out SCSI request/response, and a receive history information table 351 which stores information of already-received SCSI command. Further on the cache memory 350, wait-for-transmission queues 350a and 350b are formed in which the wait-for-sending out SCSI request/response are stored. The wait-for-transmission queues 350a and 350b are provided being associated with the ports 163, 167, respectively. In the present embodiment, the tables as described above are stored in the memory 157 which has a high read/write rate. However, they may be stored in the disks 150 to 152. The programs 250 to 257 as described above are stored in the disk 150 in advance. Alternatively, they are read from a portable recording medium or downloaded from other devices via LAN 24 or LAN 25, and stored in the disk 150. Then, these programs are transferred to the memory 157 as required, and executed by the CPU 159.

The network interface 160 comprises a memory 161 used as a communication buffer, a communication processing section 162 which handles communication with other devices, and a port 163 which connects a cable to the switch 22. Similarly, the network interface 164 comprises a memory 165, a communication processing section 166, and a port 167 which connects a cable to the switch 23.

The host 28 comprises a memory 170 which stores various programs and the like, a disk 171, a CPU 175 which executes various programs stored in the memory 170, a display 174 as output device, a character input device 173 such as a keyboard, a pointing device 172 such as a mouse and touch panel, and network interfaces 168, 169, which are interfaces to connect the internal bus 176 and the host 21 with the switch 26 or the switch 27.

The memory 170 in the host 28 stores, an application program 267 which is executed when the host 28 offers services such as database, an operating system program 266 which is executed when general operations are carried out, such as data write/read, required for executing the application program 267, a GUI control program 264 which is executed when a system administrator and the like displays a GUI screen to carry out operations to input information required for the storage access by the host 28, an information registration program 268 which the CPU 175 executes when the information inputted by the system administrator is registered in the table and the like, an information transmission program 265 which is executed when the information or instruction inputted by the system administrator and the like is transmitted to the storage device 21, a timer control program 263 which is executed to erase the receive history according to lapse of time, a SCSI processing program 262 which is executed in generating a SCSI command for data write/read, a redundant processing program 261 which the CPU 175 executes when the redundant processing of the SCSI command is carried out, an iSCSI processing program 260 which is executed when the SCSI command is encapsulated with TCP/IP, a transmission control program 259 which is executed when the SCSI command thus encapsulated is transmitted to the network interfaces 168, 169, and a redundant receive control program 258 which is executed when a redundant command receive processing is carried out for handling the SCSI commands received redundantly, in order of arrival of the SCSI commands. The memory 170 further stores a storage access information table 360 which stores correspondence information between identifies of the storage device and logical disks within the storage device, and identifiers of the host and logical disks within the host, which access the data stored in the storage device and the logical disks, a request information table 359 which stores information which uniquely identifies a group of a series of SCSI requests which are generated for a certain data write/read, out of the SCSI requests and responses, a session information table 358 which stores information of the iSCSI session established between the host 28 and the storage device 21, a transmission queue information table 357 which stores wait-for-sending out SCSI request/response, and a receive history information table 356 which stores information of already-received SCSI command. Further on the cache memory 170, wait-for-transmission queues 370a and 370b are formed in which the wait-for-sending out SCSI request/response are stored. The wait-for-transmission queues 370a and 370b are provided respectively, being associated with the ports 168, 169. In the second embodiment, the tables as described above are stored in the memory 170 which has a high read/write rate. However, they may be stored in the disk 171. The programs 258 to 267 as described above are stored in the disk 171 in advance. Alternatively, they are read from a portable recording medium or downloaded from other devices via LAN 24 or LAN 25, and stored in the disk 171. Then, these programs are transferred to the memory 170 as required, and then executed by the CPU 175.

Next, data structure of various tables stored in the memory 157 of the storage device 21 and in the memory 170 of the host 28 will be explained.

Storage access information tables 355, 360, request information table 359, response information table 354, session information table 353, 358, transmission queue information table 352, 357 and receive history information table 350, 356 have an array structure, and these table can store at least one record. However, the data structure is not limited to the array structure.

FIG. 27A is a view showing a data structure example of the storage access information table 355, 360. Each record in the storage access information table 355, 360 includes entry 3551 where a host name being an identifier of the host is registered, entry 3552 where a host logical device ID being an identifier of a logical disk in the host is registered, entry 3553 where a storage name being an identifier of the storage device is registered, and entry 3554 where a storage logical device ID being an identifier of the logical disk in the storage device is registered. For example, the record 3550 represents that data which appears to be stored in the logical disk with the host logical device ID "sdb1" within the host with the host name "X1" is actually stored in the disk with the storage logical device ID "sdb2" within the storage device with the storage name "Y1".

FIG. 27B is a view showing a data structure example of the session information table 353, 358. Each record of the session information table 353,358 comprises, entry 3521 where the session ID for uniquely identifying the session which transmits data is registered, entry 3522 where the host name is registered, entry 3523 where the host IP address as an IP address of the session on the host 28 side is registered, entry 3524 where a host port number as a port number of the session on the host 28 side is registered, entry 3525 where the storage name is registered, entry 3526 where a storage IP address as an IP address of the session on the storage device 21 side is registered, entry 3527 where a storage port number as a port number of the session on the storage device 21 is registered, entry 3528 where a transmission queue address holding an address of the SCSI command (SCSI request or SCSI response) before sending out to this session is registered, and entry 3529 where a timeout value of the session formed on the path is registered. For example, the record 3520 represents that a session identified by the session ID "S1" is formed by connecting the end point on the host 28 side, being identified by the host name "X1", the host IP address "211.1.1.20", and the host port number "10000", with the end point on the storage device 21 side, being identified by the storage name "Y1", the storage IP address "211.1.1.21" and the storage port number "12000". The record 3520 further represents that if the communication is cut off, the time to be determined as timeout is timeout value "10" seconds.

The data structures of the request information table 359 and the response information table 354 are basically the same as those explained with reference to FIG. 2B and FIG. 2C in the first embodiment. Furthermore, the data structure of the transmission queue information table 352 and 357 is basically the same as that explained with reference to FIG. 2E in the first embodiment. The data structure of the receive history information table 351 and 356 is basically the same as that explained with reference to FIG. 2F in the first embodiment. However, in the present embodiment, as for the task tag, the request tag is assumed as the task tag in the host 28, and the response tag is assumed as the task tag in the storage device 21.

Next, GUI (Graphical User Interface) used in the second embodiment will be explained. The GUI screen is displayed on the display 174 when the CPU 175 of the host 28 executes the GUI control program 264. A system administrator and the like utilizes the character input device 173 and the pointing device 172 to set each parameter on the GUI screen thus displayed.

Figure 28:
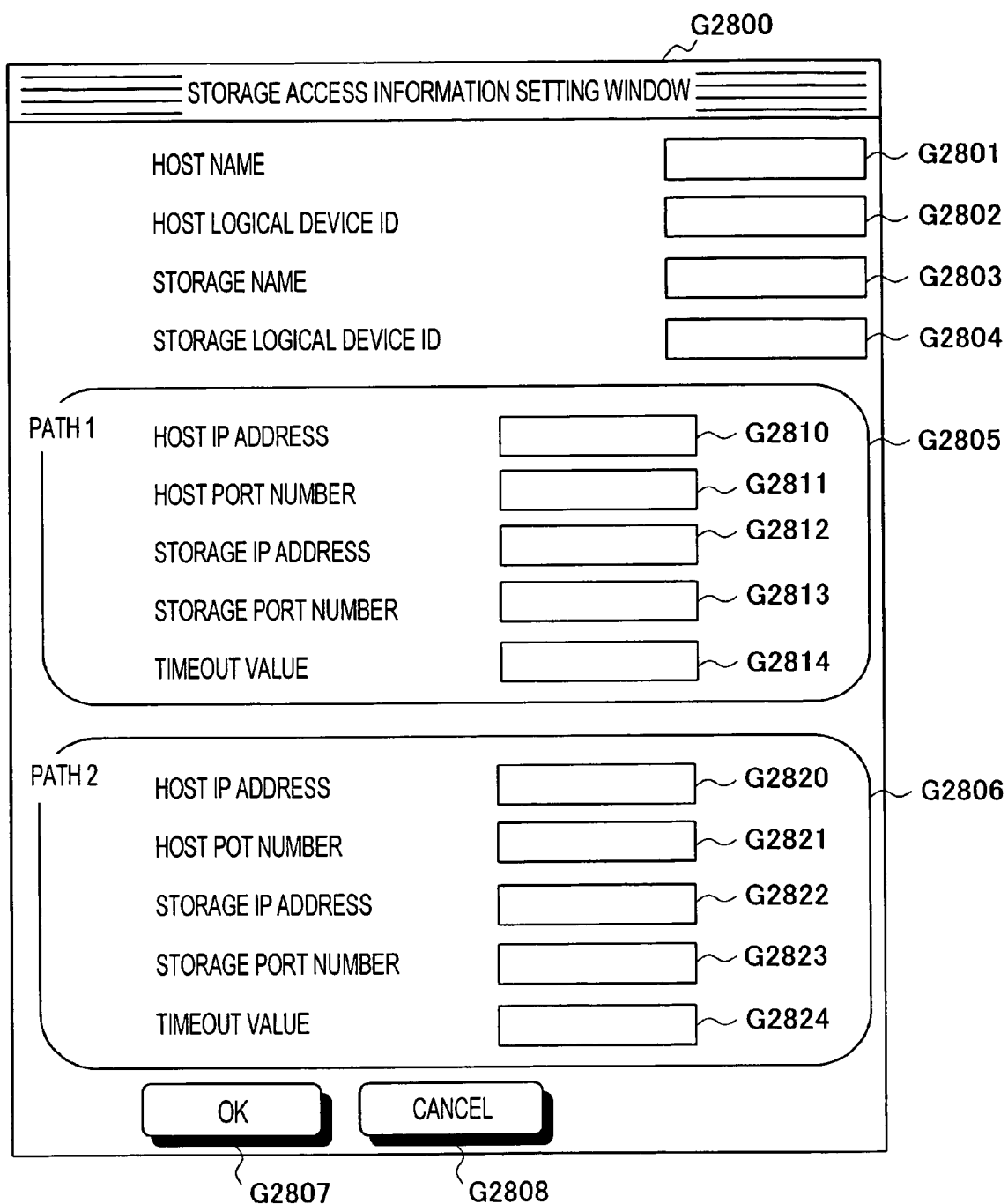
FIG. 28 is an explanatory view showing a display example of a storage access information setting window according to the second embodiment of the present invention.

FIG. 28 is a view showing a display example of the storage access information setting window G2800 which is used for the system administrator and the like to input information required for the storage access by the host 28. The storage access information setting window 2800 includes area G2801 for inputting the host name, area G2802 for inputting the host logical device ID, area G2803 for inputting the storage name, area G2804 for inputting the storage logical device ID, area G2805 for inputting information regarding the primary path, area G2806 for inputting information regarding the secondary path, button G2807 to be designated when the information items in the above areas are registered in the host 28, and button 2808 to be designated when the registration is canceled. In addition, the area G2805 includes area G2810 for inputting the host IP address, area G2811 for inputting the host port number, area G2812 for inputting the storage IP address, area G2813 for inputting the storage port number, and area G2814 for inputting the timeout value. Similarly, the area G2806 includes area G2820 for inputting the host IP address, area G2821 for inputting the host port number, area G2822 for inputting the storage IP address, area G2823 for inputting the storage port number, and area G2824 for inputting the time out value.

Next, a communication sequence between each of the devices in the second embodiment will be explained.

Figure 29:
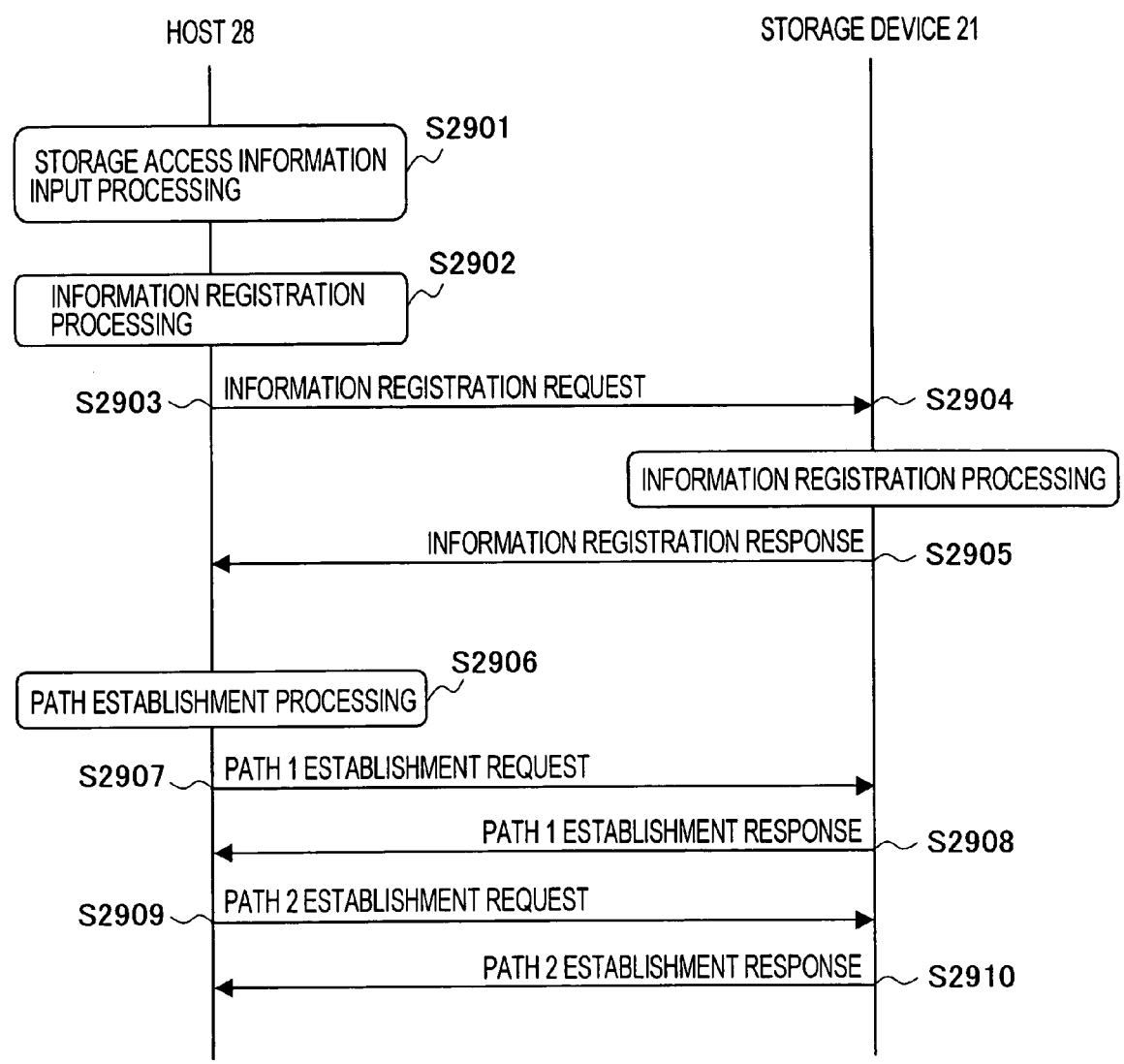
FIG. 29 is a communication sequence diagram regarding input processing to input information which is necessary for the storage access, according to the second embodiment of the present invention.

FIG. 29 is a diagram showing a communication sequence example between the devices, from the time when a system administrator and the like utilizes the host 28 to input the information necessary for the storage access by the host until the time when the information is registered into the host 28 and the storage device 21.

In a beginning, the CPU 175 of the host 28 executes the GUI control program 264, and the host 28 displays the storage access information setting window G2800. Then, the host 28 executes the storage access information input processing to receive an input from the system administrator and the like (S2901). Thereafter, when the system administrator and the like designate the button G2807, firstly, the CPU 175 executes the information registration program 268, and the host 28 carries out the information registration processing, as explained with FIG. 30, in accordance with the information items inputted in the areas G2801 to G2806. Then, the host 28 registers in the various tables the information necessary for the storage access by the host (S2902). Next, the CPU 175 executes the information transmission program 265, and the host 28 assembles an information registration request comprising the information items inputted in the areas from G2801 to G2806. Then, the host 28 transmits the information registration request to the storage device 21 (S2903). When the storage device 21 receives the information registration request, the CPU 159 executes the information registration program 256. Then, the storage device 21 executes the information registration processing which will be explained with FIG. 30, and registers the information necessary for the storage access by the host in the various tables (S2904). Then, the storage device 21 transmits to the host 28 an information registration response indicating that the information has been registered (S2905).

Next, when the host 28 receives the information registration response, it carries out the following path establishment processing (S2906). At first, The host 28 retrieves the host name of the path 1, the storage name, the host IP address of the path 1, the host port number, the storage IP address and the storage port number from the path establishment request. Then, the host 28 assembles a path 1 establishment request representing a login request from the initiator indicated by the host name to the target indicated by the storage name. Then, the host 28 transmits the path 1 establishment request to the storage device 21 (S2907). A source IP address of this path 1 establishment request is the host IP address, and a destination IP address is the storage IP address. A source TCP port number is the host port number, and a destination TCP port number is the storage port number. When the storage device 21 receives the path 1 establishment request, it transmits a path 1 establishment response indicating that an iSCSI session is permitted (S2908). In this way, the iSCSI session is established on the primary path. Thereafter, in similar manner, an iSCSI session is established on the secondary path (S2909, S2910). The description so far explains the communication sequence concerning the information registration necessary for the storage access by the host.

Figure 30:
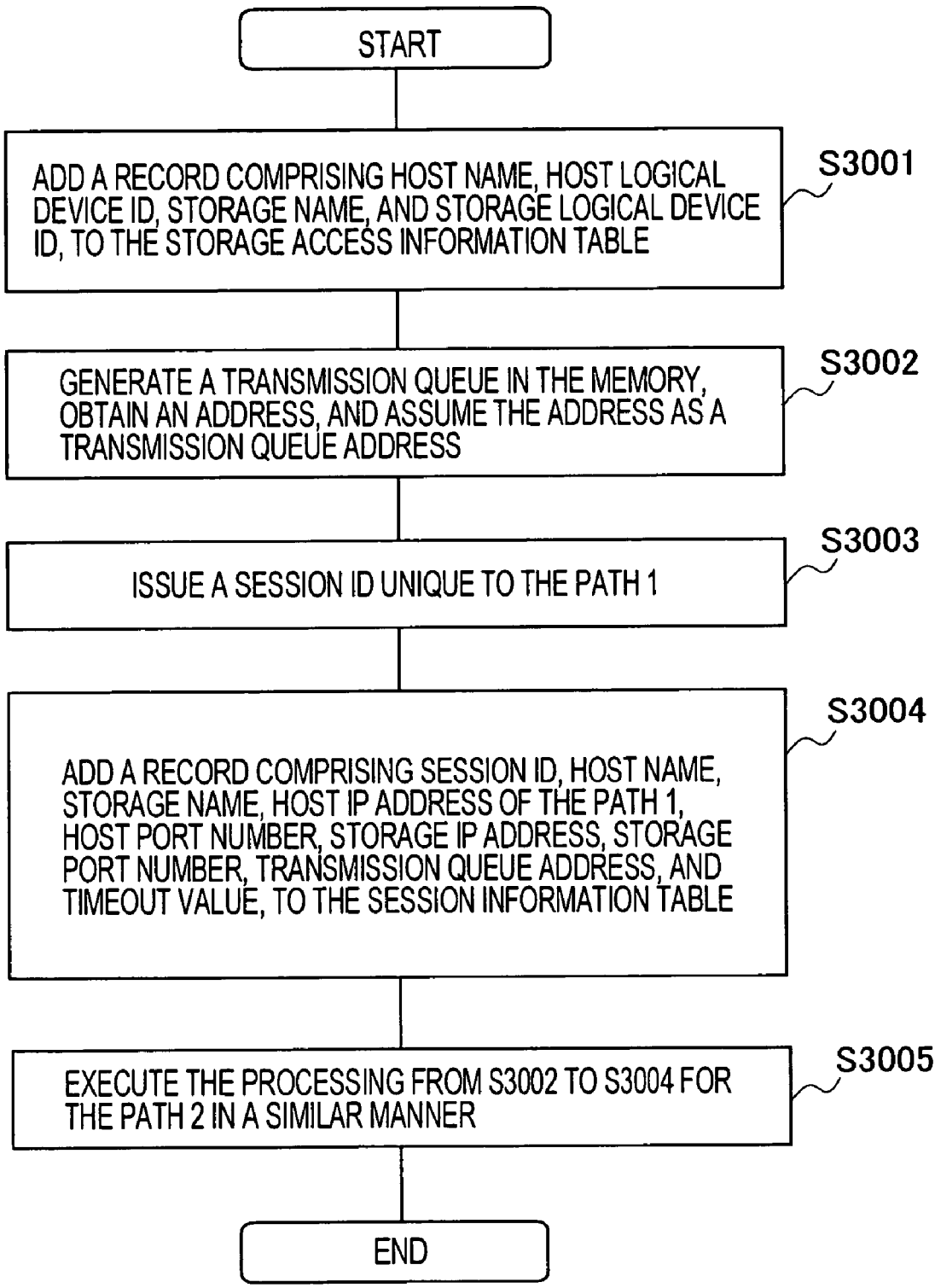
FIG. 30 is a flowchart showing operations of information registration processing according to the second embodiment of the present invention.

FIG. 30 is a flowchart showing operational procedures of the information registration processing. The CPU 175 in the host 28 executes the information registration program 268 or the CPU 159 in the storage device 21 executes the information registration program 256, whereby the above processing is carried out. In the present processing, firstly, the host 28 or the storage device 21 adds a record to the storage access information table 360 or 355, on the basis of the information items inputted from the areas G2801 to G2804 (S3001). Entries 3551, 3552, 3553, and 3554 of the record thus added here respectively register a host name, a host logical device ID, a storage name, a storage logical device ID. Next, the host 28 forms transmission queues 370a, 370b in the memory 170, and also creates transmission queue information table 357. Then, the first addresses of the transmission queues 370a, 370b are assumed to be the transmission queue address. Furthermore, the storage device 21 forms transmission queues 350a, 350b in the cache memory 350, and also creates transmission queue information table 352. Then, the first addresses of the transmission queues 350a, 350b are assumed to be the transmission queue address (S3002). Next, the host 28 or the storage device 21 issues a unique session ID to the primary path A (S3003). Next, the host 28 or the storage device 21 adds a record to the session information table 358 or 353 on the basis of the contents in the areas G2801 to G2806 (S3004). Entries 3521, 3522, 3523, 3524, 3525, 3526, 3527, 3528, and 3529 of the record thus added here respectively register the session ID obtained in S3003, the host name, the host IP address, the host port number, the storage name, the storage IP address, the storage port number, the transmission queue address obtained in S3002, and a timeout value. Then, the host 28 or the storage device 21 executes the processing from S3002 to S3004, similarly for the secondary path B (S3005). By executing the above processing in a similar manner for the secondary path B, more particularly, by repeating S602, transmission queues 350a, 370a for the primary path A and transmission queues 350b, 370b for the secondary path B are generated.

Figure 31:
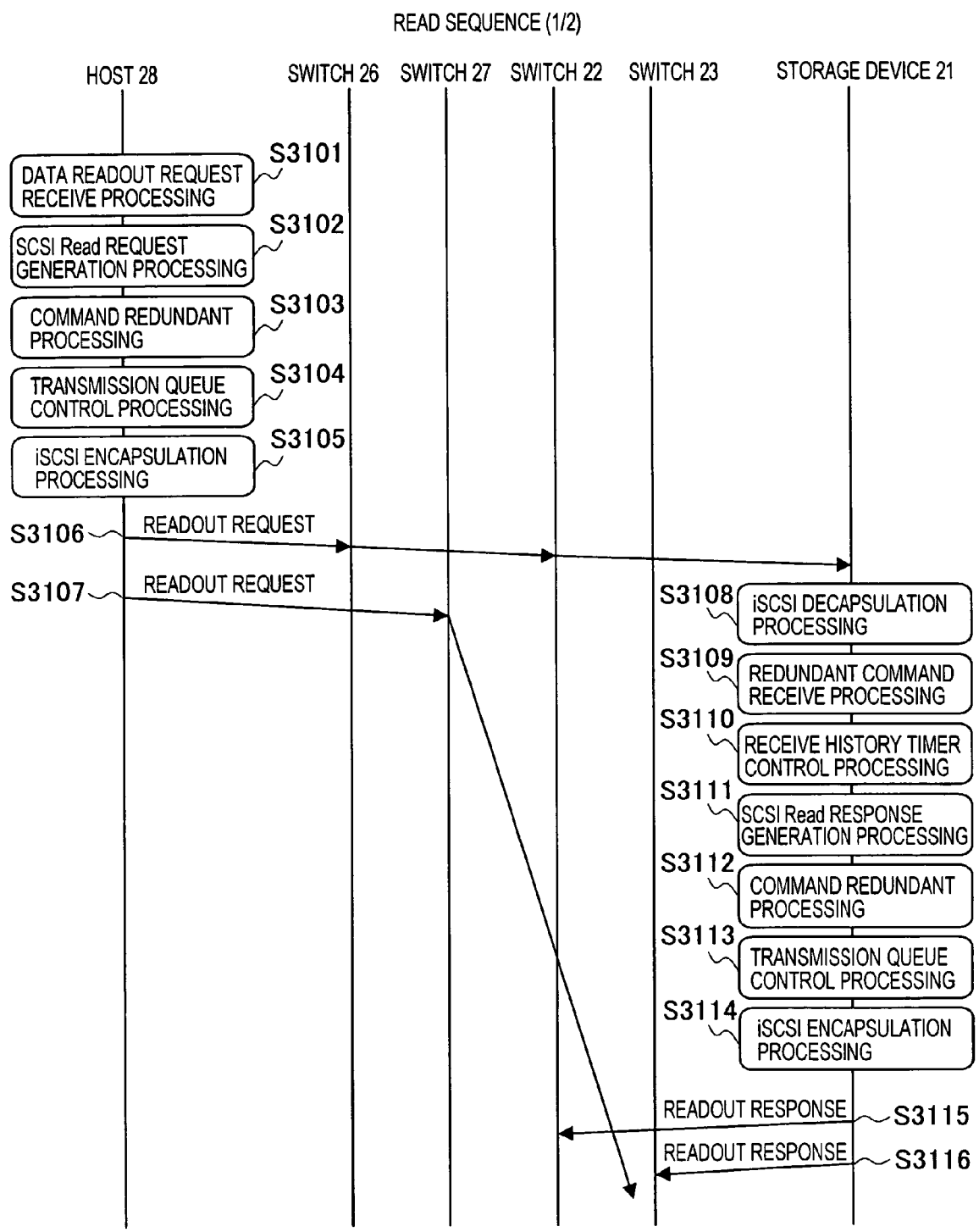
FIG. 31 is a communication sequence diagram at a time when the host transmits a Read request to the storage to access thereto according to the second embodiment of the present invention.
Figure 32:
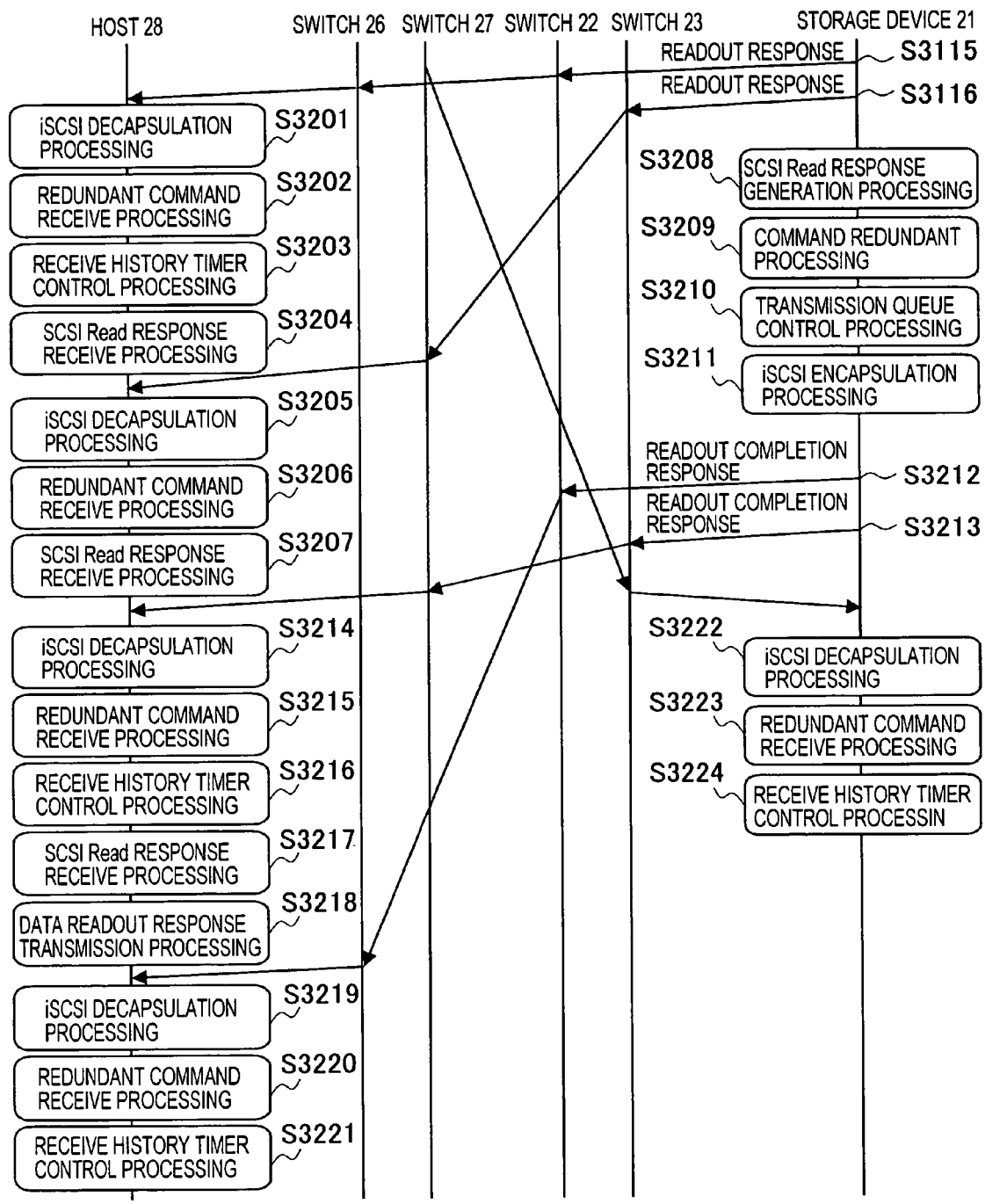
FIG. 32 is a communication sequence diagram at a time when the host transmits a Read request to the storage to access thereto according to the second embodiment of the present invention.

FIG. 31 and FIG. 32 are diagrams showing a communication sequence example between the devices when the application program 267 of the host 28 transmits a data read request to the operating system program 266.

In the host 28, the CPU 175 of the host 28 constantly executes the application program 267 so as to offer services such as database. When data readout becomes necessary for a purpose such as referring to the database, the application program 267 assembles a data readout request comprising the host name, the host logical device ID, the logical block address, and the data length. Then, using the data readout request as an input, the CPU 175 executes the operating system program 266.

When the operating system program 266 of the host 28 receives the data readout request from the application program 267, the host 28 carries out the data readout request receive processing which will be explained with FIG. 33, assembles a Read request and transmits to the SCSI processing program 262 (S3101). Next, the CPU 175 executes the SCSI processing program 262 using the above Read request as an input. Then, the host 28 carries out the SCSI Read request generation processing which will be explained with FIG. 34, and assembles the SCSI command for requesting the data readout (S3102). Next, the CPU 175 executes the redundant processing program 261 using the above SCSI command as an input. Then, the host 28 carries out the command redundant processing, having been explained with FIG. 12 and FIG. 13, so as to send out the identical command to a plurality of paths. Further, the host 28 adds the SCSI command to the transmission queue in the primary path A and to the transmission queue in the secondary path B. It is to be noted that in the second embodiment, the processing descried above with FIG. 13 is executed, by replacing the "master node name", "remote node name", and "cache memory", with the "host name", "storage name", and "memory", respectively (S3103). On the other hand, the CPU 175 constantly executes the transmission control program 259 from the time when the host 28 is activated. Consequently, the host 28 repeatedly executes the aforementioned transmission queue control processing as explained with FIG. 14, and when the SCSI command added to the transmission queue in S3103 reaches to the top of the transmission queue, the host 28 transmits the SCSI command to the iSCSI processing program 260 (S3104). Next, the CPU 175 executes the iSCSI processing program 260. Then, the host 28 carries out the aforementioned iSCSI encapsulation processing as explained with FIG. 15, assembles an iSCSI PDU, and transmits it to the storage device 21. Here, it is to be noted that in the second embodiment, the aforementioned processing as explained with FIG. 15 is executed by replacing the "master" and "remote", with "host" and "storage", respectively (S3105). As a result of the processing from S3103 to S3105 as described above, the host 28 redundantly transmits the readout request to the switch 26 and the switch 27 (S3106, S3107).

Thereafter, when the storage device 21 receives the readout request passed through the primary path A earlier than the readout request passed through the secondary path B, the CPU 159 in the storage device 21 executes the iSCSI processing program 253. Then, the storage device 21 carries out the aforementioned iSCSI decapsulation processing as explained with FIG. 16B, and retrieves a SCSI command from the update setup request thus received (S3108). Next, the CPU 159 executes the redundant receive control program 251. Then, the storage device 21 carries out the aforementioned redundant command receive processing as explained with FIG. 17 and FIG. 18, and checks whether or not an identical readout request has already been received. At the current timing, since the identical readout request has not been received yet, the storage device 21 transmits the SCSI Write request retrieved in S3108 to the SCSI processing program 255. However, in the second embodiment, the processing as explained with FIG. 17 and FIG. 18 is executed by replacing the "master" and "remote", with "host" and "storage", respectively (S3109). Furthermore, the receive history information table 351 stores a receive history indicating that the aforementioned readout request has been received. On the other hand, the CPU 159 of the storage device 21 constantly executes the timer control program 250 from the time when the storage device 21 is activated. Consequently, the storage device 21 executes repeatedly the aforementioned receive history timer control processing as explained with FIG. 19, and when the timeout value of the receive history stored in the receive history table 351 becomes zero in S3109, the storage device 21 erases the receive history from receive history table 351 (S3110). Next, the CPU 159 executes the SCSI processing program 255. Then, the storage device 21 carries out a SCSI Read response generation processing which will be explained with FIG. 36, assembles a SCSI Data_In response being a response to the SCSI Read request retrieved in S3109, and transmits the SCSI Data_In response to the redundant processing program 254 (S3111). Next, the CPU 159 executes the redundant processing program 254. Then, the storage device 21 carries out the command redundant processing, and adds the SCSI command to the transmission queue in the primary path A and to the transmission queue in the secondary path B (S3112). On the other hand, similar to the case of the host 28, the CPU 159 in the storage device 21 executes the transmission control program 252 from the time when the storage device 21 is activated. Consequently, the storage device 21 repeatedly executes the aforementioned transmission queue control processing as explained with FIG. 14. When the SCSI command added to the transmission queue in S3112 reaches to the top of the transmission queue, the storage device 21 transmits the SCSI command to the iSCSI processing program 253 (S3113). Next, the CPU 159 executes the iSCSI processing program 253. Then, the host 28 carries out the aforementioned iSCSI encapsulation processing as explained with FIG. 15, assembles an iSCSI PDU, and transmits it to the host 28 (S3114). As a result, the storage device 21 redundantly transmits the readout response to the switch 22 and to the switch 23 (S3115, 3116).

Further in S3111, if the transmission of all the readout request data is completed by the SCSI Data_Out response, the storage device 21 assembles the SCSI RSP response and transmits it to the redundant processing program 254 (S3208). Next, the CPU 159 executes the redundant processing program 254. Then, the storage device 21 carries out the command redundant processing, and adds the SCSI command to the transmission queue in the primary path and to the transmission queue in the secondary path (S3209). On the other hand, similar to the case of the host 28, the CPU 159 in the storage device 21 constantly executes the transmission control program 252 from the time when the storage device 21 is activated. Consequently, the storage device 21 executes repeatedly the aforementioned transmission queue control processing as explained with FIG. 14. When the SCSI command added in the transmission queue in S3209 reaches the top of the transmission queue, the storage device 21 transmits the SCSI command to the iSCSI processing program 253 (S3210). Next, the CPU 159 executes the iSCSI processing program 253. Then, the host 28 carries out the aforementioned iSCSI encapsulation processing as explained with FIG. 15, assembles iSCSI PDU, and transmits it to the host 28 (S3211). Consequently, the storage device 21 redundantly transmits the readout completion response to the switch 22 and to the switch 23 (S3112, 3113).

Thereafter, when the storage device 21 receives the readout request which passed through the secondary path B, the CPU 159 executes the iSCSI processing program 253. Then, the storage device 21 carries out the iSCSI decapsulation processing, and retrieves the SCSI command from the readout request thus received (S3222). Next, the CPU 159 executes the redundant receive control program 251. Then, the storage device 21 carries out the redundant command receive processing, determines that an identical readout request has already been received, and deletes the request (S3223). It is to be noted that as explained in S3110, the CPU 159 constantly executes the timer control program 250 from the time when the storage device 21 is activated, and the storage device 21 constantly carries out the receive history timer control processing for deleting the receive history whose timeout value has become zero (S3224).

On the other hand, when the host 28 receives the readout response passed through the primary path A earlier than the readout response passed through the secondary path B, the CPU 175 of the host 28 executes the iSCSI processing program 260. Then, the host 28 carries out the iSCSI decapsulation processing, and takes out the SCSI Data_In response from the readout response thus received (S3201). Next, the CPU 175 executes the redundant receive control program 258. Then, the host 28 carries out the redundant command receive processing, and checks whether or not an identical readout response has already been received. At the current timing, since the identical readout response has not been received yet, the host 28 transmits the SCSI Data_In response retrieved in S3201 to the SCSI processing program 262 (S3202). Furthermore, the host 28 stores in the receive history information table 356 a receive history indicating that the readout response has been received. It is to be noted that similar to the case of the storage device 21, the CPU 175 of the host 28 constantly executes the timer control program 263 from the time when the host 28 is activated, whereby the host 28 constantly carries out the receive history timer control processing (S3203). Next, the CPU 175 executes the SCSI processing program 262. Then, the host 28 carries out the SCSI Read response receive processing which will be explained with FIG. 37, and stores the readout data in the memory 170, on the basis of the SCSI Data_In response retrieved in S3201 (S3204).

Thereafter, when the host 28 receives a readout response passed through the secondary path B, the CPU 175 executes the iSCSI processing program 260. Then, the host 28 carries out the iSCSI decapsulation processing and retrieves the SCSI command from the readout response thus received (S3205). Next, the CPU 175 executes the redundant receive control program 258. Then, the host 28 carries out the redundant command receive processing, determines that an identical readout response has already been received, and deletes the response (S3206). It is to be noted that as explained in S3203, the CPU 175 in the host 28 constantly executes the timer control program 263 from the time when the host 28 is activated, and the host 28 constantly carries out the receive history timer control processing to delete the receive history (S3207)

On the other hand, when the host 28 receives the readout completion response passed through the secondary path B earlier than the readout completion response passed through the primary path A, the CPU 175 in the host 28 executes the iSCSI processing program 260. Then, the host 28 carries out the iSCSI decapsulation processing, and retrieves a SCSI RSP response from the readout completion response thus received (S3214). Next, the CPU 175 executes the redundant receive control program 258. Then, the host 28 carries out the redundant command receive processing, and checks whether or not an identical readout completion response has already been received. At the current timing, since the identical readout completion response has not been received yet, the host 28 transmits the SCSI RSP request to the SCSI processing program 255 (S3215). Furthermore, the host 28 stores in the receive history information table 356 a receive history indicating that the update request has been received. It is to be noted that the CPU 175 in the host 28 constantly executes the timer control program 263 from the time when the host 28 is activated, and the host 28 constantly carries out the receive history timer control processing (S3216). Next, the CPU 175 executes the SCSI processing program 262. Then, the host 28 carries out the SCSI Read response receive processing which will be explained with FIG. 37, assembles a Read response on the basis of the SCSI RSP response retrieved in S3214, and transmits the Read response to the operating system program (S3217). Next, the CPU 175 executes the operating system program 266. Then, the host 28 carries out the data readout response transmission processing which will be explained with FIG. 38, assembles a data readout response on the basis of the Read response, and transmits the data readout response to the application program (S3218). Thereafter, the application program executed by the CPU 175 retrieves the readout data from the data readout request, and refers to the readout data.

Then, when the host 28 receives the readout completion response passed through the primary path A, the CPU 175 executes the iSCSI processing program 260. Then, the host 28 carries out the iSCSI decapsulation processing, and retrieves the SCSI command from the readout completion response thus received (S3219). Next, the CPU 175 executes the redundant receive control program 258. Then, the host 28 carries out the redundant command receive processing, determines that an identical readout completion response has already been received, and deletes the response (S3220). It is to be noted that as explained in S3216, the CPU 175 constantly executes the timer control program 263 from the time when the host 28 is activated, and the host 28 constantly carries out the receive history timer control processing (S3221).

With the description so far, the communication sequence example between the devices when the application program 267 of the host 28 refers to the data stored in the storage device 21 has been explained.

Figure 33:
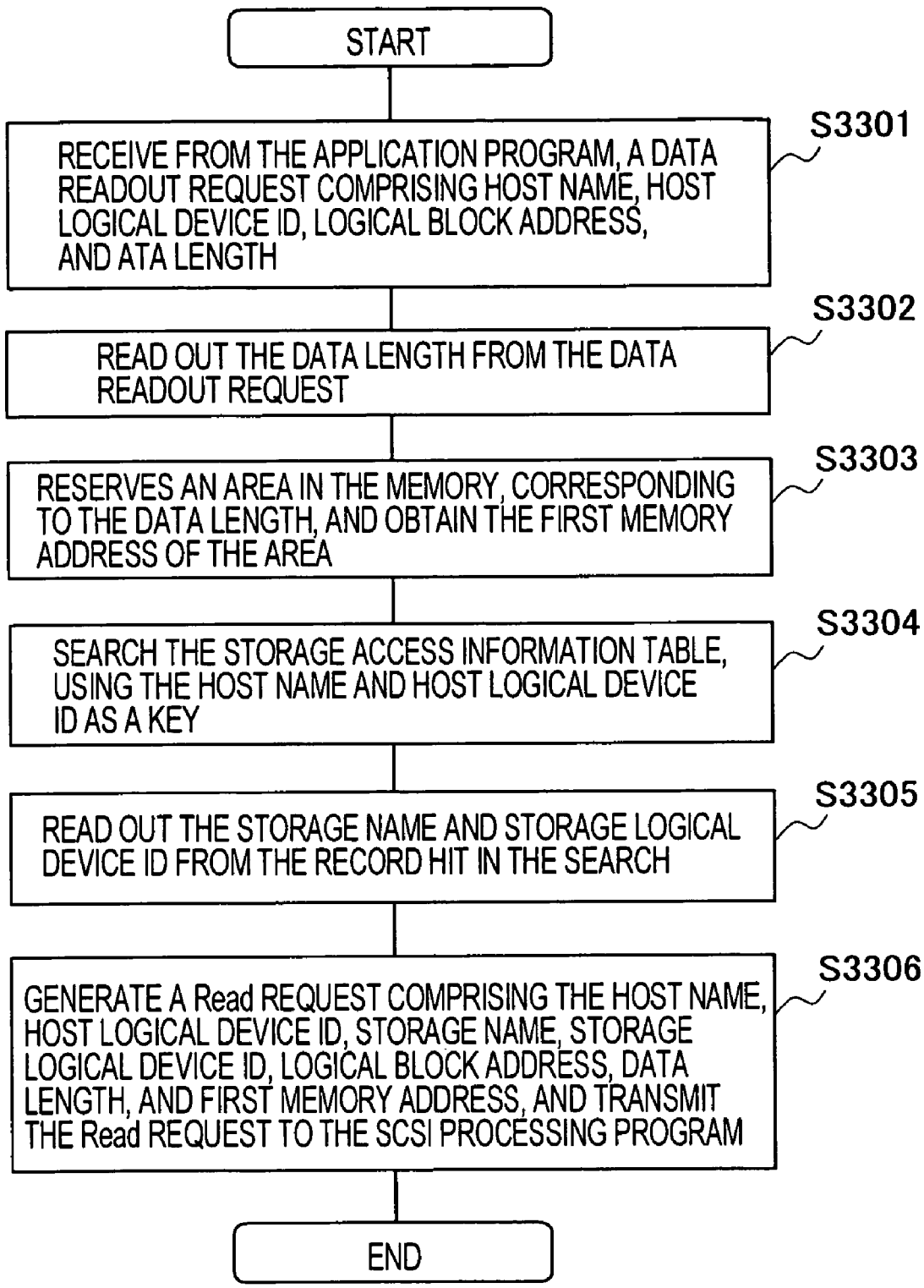
FIG. 33 is a flowchart showing operations of data readout request receive processing according to the second embodiment of the present invention.

FIG. 33 is a flowchart showing operational procedures of the data readout request receive processing (S3101) as shown in FIG. 31. The CPU 175 of the host 28 executes the operating system program, and then the host 28 executes the above processing. In the present processing, firstly, the host 28 receives a data readout request comprising the host name, the host logical device ID, the logical block address and the data length (S3301), and the host 28 reads out the data length from the data readout request (S3302). Next, the host 28 reserves in the memory, an area corresponding to the data length thus read out in S3302, and obtains the first memory address of the area (S3303). Next, the host 28 searches the storage access information table 360 using a group of the host name and the host logical device ID as a key (S3304) and the host 28 reads out the storage name and the storage logical device ID, from the record hit in the search (S3305). At the last, the host 28 generates a Read request comprising the host name, the host logical device ID, the storage name, the storage logical device ID, the logical block address, the data length and the firs memory address, and transmits the Read request to the SCSI processing program (S3306). Then, the present processing is completed.

Figure 34:
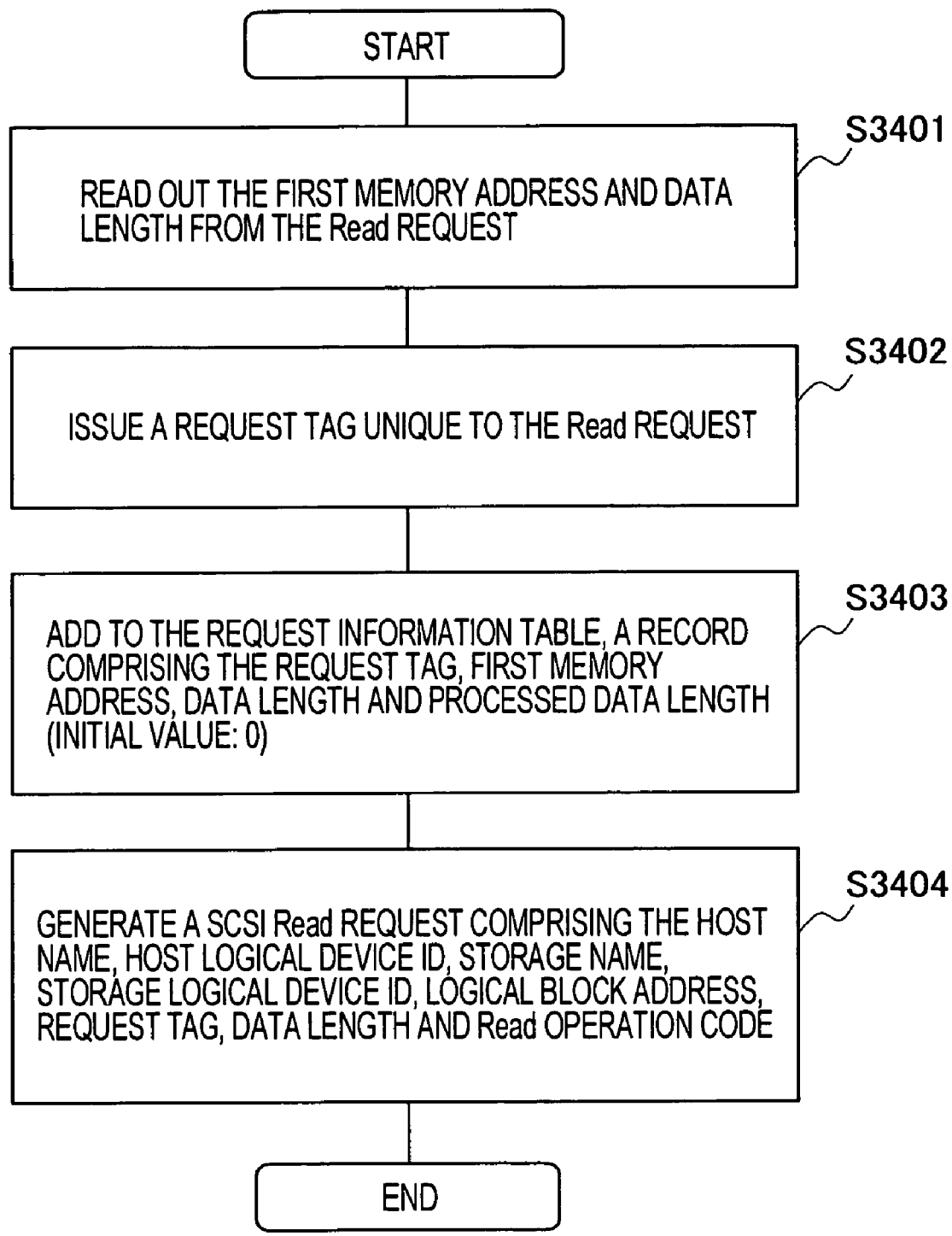
FIG. 34 is a flowchart showing operations of SCSI Read request generation processing according to the second embodiment of the present invention.

FIG. 34 is a flowchart showing operational procedures of the SCSI Read request generation processing (S3102) as shown in FIG. 31. The CPU 175 in the host 28 executes the SCSI processing program 262, whereby the host 28 executes the above processing. In the present processing, firstly, the host 28 reads out the first memory address and the data length from the Read request received from the operating system program (S3401). Next, the host 28 issues a request tag which is unique to the Read request (S3402). Then, the host 28 adds to the request information table 359, a record comprising the request tag, the first memory address, the data length and the processed record length (initial value is zero) (S3403). At the last, the host 28 generates a SCSI Read request comprising the host name, the host logical device ID, the storage name, the storage logical device ID, the data length and a Read operation code (S3404). Then, the present processing is completed.

Next, the command redundant processing (S3103, 3112, 3209) as shown in FIG. 31 and FIG. 32 will be explained according to the flowcharts shown in FIG. 12 and FIG. 13 which are also used for explaining the first embodiment. The command redundant processing of the present embodiment is basically the same as that of the first embodiment. It is to be noted that in the present embodiment, it is necessary to replace "master node", "remote node", and "cache memory" in FIG. 13, with "host", "storage", and "memory or cache memory", respectively. Then, by use of the FIG. 12 and FIG. 13, the command redundant processing in the present embodiment will be further explained.

The CPU 175 in the host 28 or the CPU 159 in the storage device 21 executes the redundant processing program 261 or 254, whereby the host 28 or the storage 21 executes the above processing. Firstly, the present processing branches depending on whether the command is a request or a response (S1201). If the command is a request, the storage device reads out a request tag from the command, and the request tag is assumed to be a task tag (S1202). Then, the host 28 or the storage device 21 attaches a unique sequence control tag to the command (S1203), and executes the processing from S1301. On the other hand, if the command is a response, the host 28 or the storage device 21 reads out a value of the response tag from the command, and it is assumed to be the task tag (S1204) Then, the host 28 or the storage device 21 searches the receive history information table 356 or 351 under the condition that the value read out in S1204 matches the contents in entry 3002, and the contents of the entry 3003 is "zero" (S1205). Then, the host 28 or the storage device 21 allows the processing to branch according to a result of the search in S1205 (S1206). If there is a record hit in the search in S1205, the host 28 or the storage device 21 reads out a sequence control tag of the record thus hit, and attaches the sequence control tag to the command (S1207). Furthermore, the host 28 or the storage device 21 sets "1" as a return flag value of the record hit in the search (S1208). On the other hand, if there is no record hit in the search, the host 28 or the storage device 21 executes S1203.

Next, the host 28 or the storage device 21 reads out the host name and the storage name from the command (S1301). Then, the host 28 or the storage device 21 searches the session information table 302 for a record whose entry 3021 and the entry 3022 respectively include contents corresponding to the host name and the storage name read out in S1301 (S1302). The host 28 or the storage device 21 assumes the number of records hit in the search in S1302 as a simultaneous transmission number, and attaches it to the command (1303). Next, the host 28 or the storage device 21 retrieves one record out of the records hit in the search (S1304) Then, the host 28 or the storage device 21 reads out from the record thus retrieved, the session ID (host IP address, host port number, storage IP address, and storage port number) and the transmission queue address, and attaches these elements to the command (S1305). Next, the host 28 or the storage device 21 obtains a first address of the area (transmission queue) in the memory or cache memory where the command is stored, and assumes the first address as a command address (S1306). Then, the host 28 or the storage device 21 specifies a transmission queue with the transmission queue address read out in S1305, and adds a record comprising the sequence control tag, the task tag, and the command address, next to the rearmost record in the transmission queue information table (S1307). The host 28 or the storage device 21 executes the processing from S1305 to S1307 with respect to all the records hit in the search in S1302 (S1308). Then, the present processing is completed.

The CPU 175 in the host 28 or the CPU 159 in the storage device 21 executes the transmission control program 259 or 252, whereby the host 28 or the storage device 21 executes the transmission queue control processing (S3104, 3113, 3210) as shown in FIG. 31 and FIG. 32. This transmission queue control processing is basically the same as the transmission queue control processing of the first embodiment as explained with FIG. 14. Therefore, redundant explanations as to the operation will not be made.

Next, the iSCSI encapsulation processing (S3105, 3114, 3211) as shown in FIG. 31 and FIG. 32 will be explained according to the flowchart as shown in FIG. 15, which is used for explaining the first embodiment. The iSCSI encapsulation processing of the present embodiment is basically the same as that of the first embodiment. However, it is necessary to replace the "master" and the "remote" in FIG. 15 with "host" and "storage", respectively. Then, the iSCSI encapsulation processing of the present embodiment will be further explained with FIG. 15.

The CPU 175 in the host 28 or the CPU 159 in the storage device 21 executes the iSCSI processing program 260 or 253, whereby the host 28 or the storage device 21 executes the above processing. In this processing, the host 28 or the storage device 21 firstly reads out a command address from the received record (S1501), and specifies a command in the cache memory with the command address (S1502). Then, the host 28 or the storage device 21 reads out the session ID from the command thus specified, and searches the session information table 302 using the session ID as a key (S1503). Next, the host 28 or the storage device 21 reads out the host IP address, the host port number, the storage IP address and the storage port number from the record hit in the search in S1503 (S1504). Then, the host 28 or the storage device 21 specifies a TCP connection on the basis of the information read out in S1504, and obtains a status indicating whether transmission is available or not as to the TCP connection (S1505). At the last, the processing branches depending on whether or not the transmission is available according to the status of the TCP connection obtained in S1505 (S1506). If status of the TCP connection indicates that transmission is available, the host 28 or the storage device 21 attaches an iSCSI PDU header to the command specified in S1502, generates an iSCSI PDU, and transmits it to the TCP connection specified in S1505 (S1508). Then, the host 28 or the storage device 21 sends a transmission successful notice the transmission control program 202 (S1509), and the present processing is completed. If the status of the TCP connection indicates that transmission is not available, the host 28 or the storage device 21 sends a transmission failure notice to the transmission control program 202 (S1507), and the present processing is completed.

Next, a transmission available status notice processing will be explained according to the flowchart as shown in FIG. 16A, which is used for explaining the first embodiment. The transmission available status notice processing of the present embodiment is basically the same as that of the first embodiment. However, in the present embodiment, it is necessary to replace the "master", "remote", "cache memory" in FIG. 16A, with "host", "storage", "memory or cache memory" respectively. Then, the transmission available status notice processing of the present embodiment will be further explained with reference to FIG. 16A.

The CPU 175 of the host 28 or the CPU 159 of the storage device 21 executes the iSCSI processing program 260 or the 253. Then, the host 28 or the storage device 21 executes the above processing. In the present processing, firstly, the storage device reads out a command address from the transmission available status notice request (S1601), specifies a command on the memory 170 or on the cache memory 350 (S1602), reads out a session ID from the command thus specified, and searches the session information table 302 using the session ID as a key (S1603). Next, the host IP address, the host port number, the storage IP address and the storage port number are read out from the record hit in the search in S1603 (S1604). Next, the host 28 or the storage device 21 specifies a TCP connection on the basis of the information read out in S1604, and waits until a transmission available status can be obtained from the TCP connection (S1605) Thereafter, when the host 28 or the storage device 21 obtains the transmission available status from the TCP connection, the host 28 or the storage device 21 sends the transmission available status notice to the transmission control program (S1606).

When the CPU 175 in the host 28 and the CPU 159 in the storage device 21 executes the iSCSI processing program 260 or 253, whereby the host 28 or the storage device 21 executes the iSCSI decapsulation processing (S3108, 3201, 3205, 3214, 3219) as shown in FIG. 31 and FIG. 32. Since this iSCSI decapsulation processing is basically the same as that of the first embodiment, which is explained with FIG. 16B, redundant explanations will not be made.

Next, the redundant command receive processing (S3109, 3202, 3206, 3215, 3220 and 3223) as shown in FIG. 31 and FIG. 32, will be explained according to FIG. 17 and FIG. 18 which are used to explain the first embodiment. However, it is necessary to replace "master/master node", and "remote/remote node" in FIG. 17 and FIG. 18 are respectively replaced by "host" and "storage". Then, by use of FIG. 17 and FIG. 18, the redundant command receive processing of the present embodiment will be further explained.

The CPU in the host 28 and the CPU 159 in the storage device 21 executes the redundant receive control program 258 or 251, whereby the host 28 or the storage device 21 executes the above processing. In the present processing, firstly, the host 28 or the storage device 21 reads out a sequence control tag from the command, and search the receive history information table 356 or 351 using the sequence control tag as a key (S1701). Next, the result of the search in S1701 causes the processing to branch (S1702). When there is a record hit in the search in S1701, the host 28 or the storage device 21 firstly discards the command (S1710), and decrements the value of the history holding counter 3005 of the record thus hit (S1711). Then, as a result of the processing of S1711, when the value of the history holding counter 3005 becomes zero, the host 28 or the storage device 21 deletes the record from the table (S1712, S1713), and the present processing is completed. On the other hand, if there is no record hit in the search in S1701, the processing further branches depending on whether the command is a request or a response (S1703). If the command is a request, the host 28 or the storage device 21 reads out a request tag from the command, and subsequently assumes it as a task tag (S1704). If the command is a response, the host 28 or the storage device 21 reads out a response tag from the command, and subsequently assumes it as a task tag (S1705). Next, the host 28 or the storage device 21 reads out the host IP address, the host port number, the storage IP address, the storage port number and the simultaneous transmission number from the command (S1706). Then, the host 28 or the storage device 21 searches the session information table 358 or 351 using as a key, a group of the host IP address, the host port number, the storage IP address and the storage port number (S1707). Next, the host 28 or the storage device 21 reads out a timeout value 3529 from the record hit in the search, and assumes it as a history holding timeout (S1708). Then, the host 28 or the storage device 21, adds a record comprising the sequence control tag, the task tag, the return flag (initial value: 0), the history holding counter (initial value: simultaneous transmission number−1) and a history holding timeout to the receive history information table 356 or 351 (S1709).

Again, the processing branches depending on whether the command is a request or a response (S1801) If the command is a request, the processing from S1807 is carried out. On the other hand, if the command is a response, the storage device firstly reads out the host name and the storage name from the command, and searches the session information table 358 or 353 using a group of the host name and the storage name as a key (S1802). Next, the storage device retrieves one of the records which are hit in the search of S1802 (S1803) Next, the storage device reads out a transmission queue address from the record thus retrieved, and specifies a transmission queue indicated by the address (S1804). Then, the host 28 or the storage device 21 searches the transmission queue information table 357 or 352 with the sequence control tag, as to the transmission queue thus specified, and all the records hit in the search are deleted. In other words, if there remains a request associated with this response in the transmission queue, the request is deleted (S1805). The host 28 or the storage device 21 executes the processing from S1803 to S1805 with respect to all the records hit in the search of S1802 (S1806). At the last, the host 28 or the storage device 21 removes from the command, the sequence control tag, the simultaneous transmission number, the host IP address, the host port number, the storage IP address and the storage port number, transmits the command to the SCSI processing program 262 or 255 (S1807), and this processing is completed.

The CPU 175 in the host 28 or the CPU 159 in the storage device 21 executes the timer control program 263 or 250, whereby the host 28 or the storage device 21 executes the receive history timer control processing (S3203, 3207, 3221, 3224) as shown in FIG. 31 and FIG. 32. Since the receive history timer control processing is basically the same as that of the first embodiment, the operations will not be explained redundantly.

Figure 35:
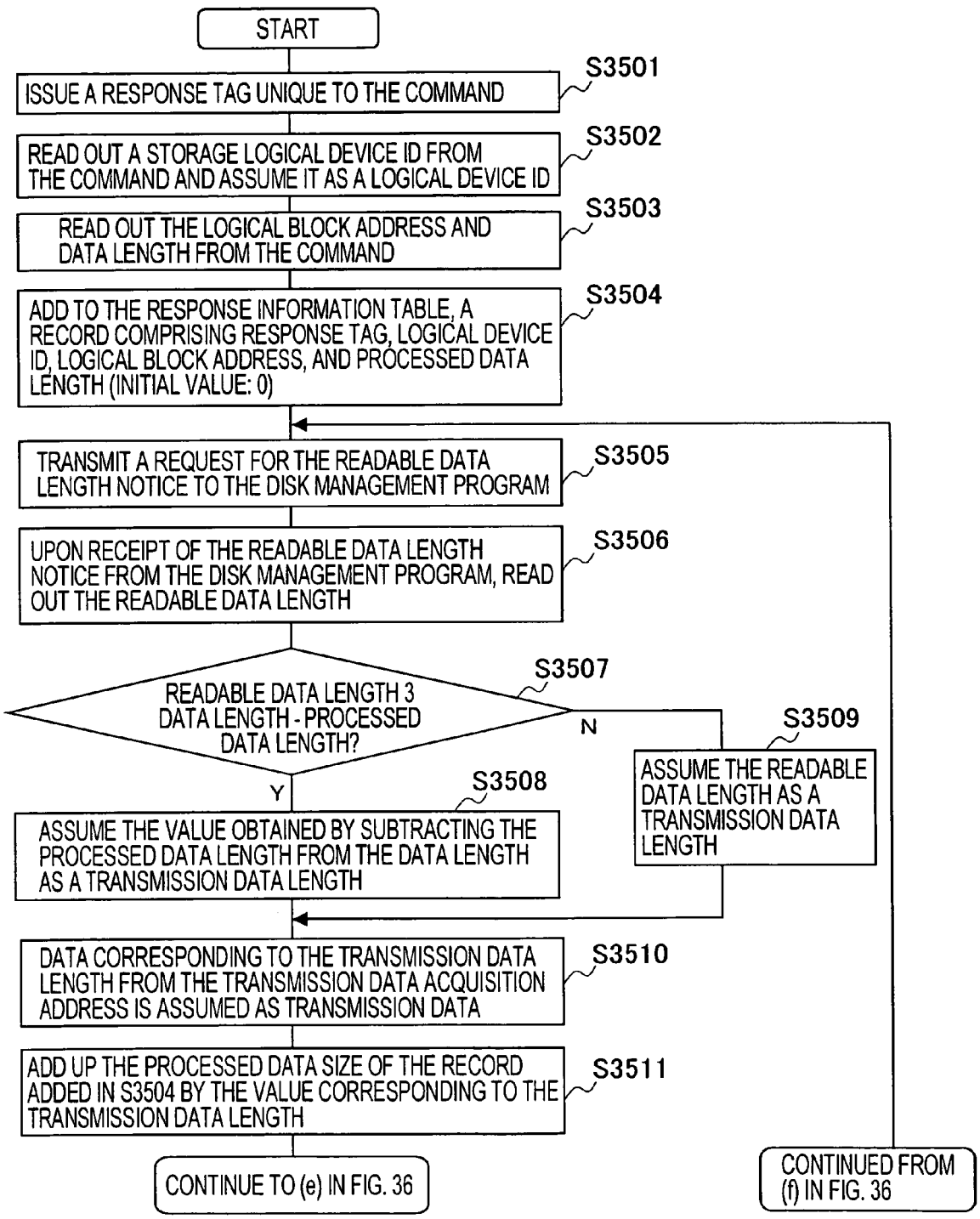
FIG. 35 is a flowchart showing operations of SCSI Read response generation processing according to the second embodiment of the present invention.
Figure 36:
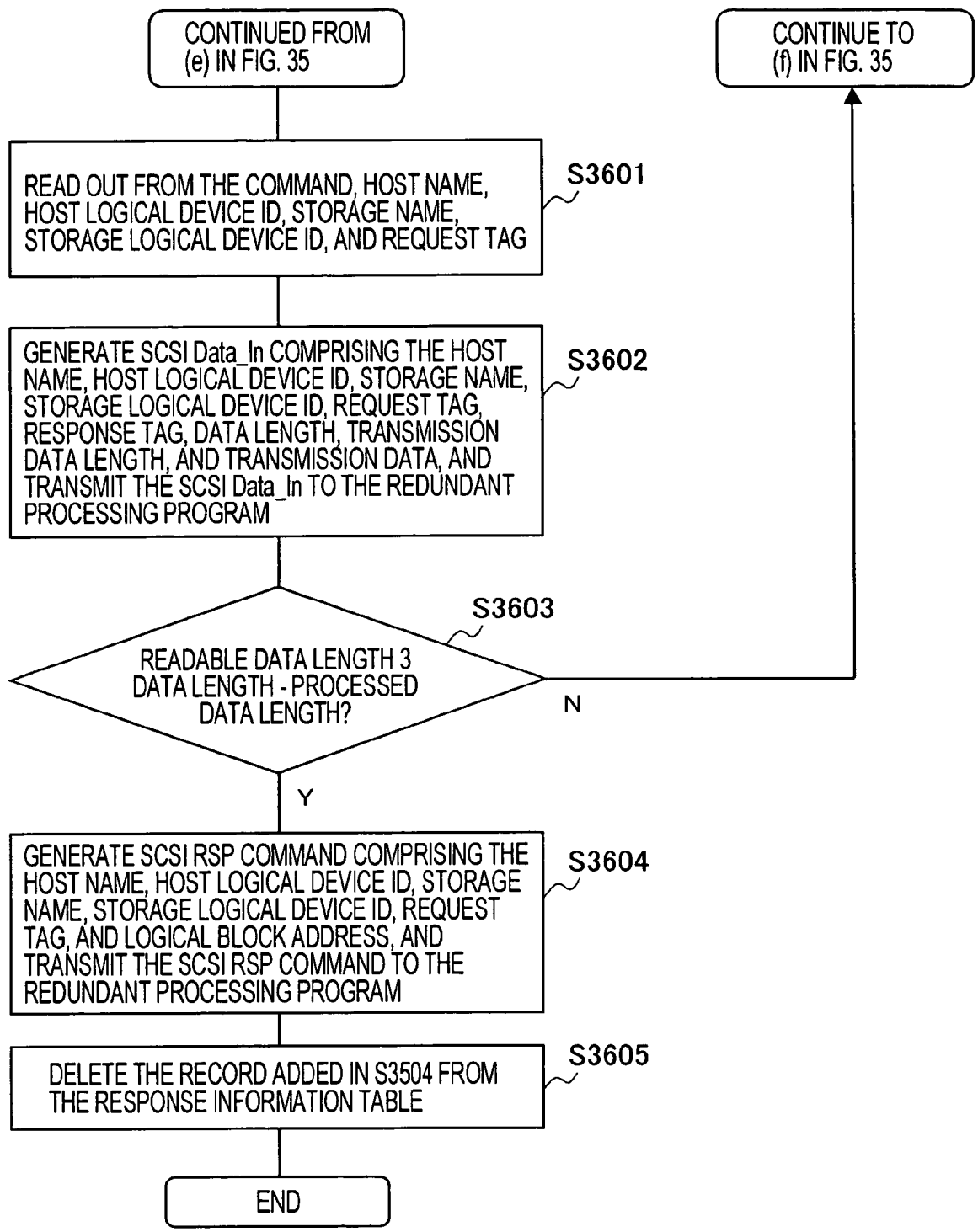
FIG. 36 is a flowchart showing operations of SCSI Read response generation processing according to the second embodiment of the present invention.

FIG. 35 and FIG. 36 are flowcharts showing operational procedures of the SCSI Read response generation processing (S3111, 3208) as shown in FIG. 31 and FIG. 32. The CPU 159 in the storage device 21 executes the SCSI processing program 255, whereby the storage device 21 executes the above processing. In the present processing, firstly, the storage device 21 issues a unique response tag to the SCSI command thus received (S3501). Next, the storage device 21 reads out the storage logical device ID from the SCSI command, assumes it as a logical device ID (S3502), and further, the storage device 21 reads out the logical block address and the data length from the SCSI command (S3503). Then, the storage device 21 adds to the response information table 354, a record comprising the response tag, the logical device ID, the logical block address and processed data length (initial value: 0) obtained in the operations in S3501 to S3503 (S3504). Next, the storage device 21 transmits a request for a readable data length notice to the disk management program 257 (S3505), and waits for the readable data length notice. When the storage device 21 receives the readable data length notice from disk management program 257, the readable data length is read out from the notice (S3506). Next, if the readable data length is equal to or longer than the result obtained by subtracting the processed data length from the data length (S3507), the value obtained by subtracting the processed data length from the data length is assumed as a transmission data length (S3508) Otherwise, the readable data length is assumed to be the transmission data length (S3509) Next, the data corresponding to the transmission data length from the transmission data acquisition address is assumed to be the transmission data (S3510). Next, the storage device 21 adds up the processed data size of the record added in S3504 by the value corresponding to the transmission data length (S3511). Next, the storage device 21 reads out from the command, the host name, the host logical device ID, the storage name, the storage logical device ID, the request tag (S3601). Then, the storage device 21 assembles a SCSI DATA_In response comprising the host name, the host logical device ID, the storage name, the storage logical device ID, the request tag, the response tag, the data length, the transmission data length and the transmission data, and transmits the SCSI DATA_In response to the redundant program (S3602). Next, if the readable data length is shorter than the result obtained by subtracting the processed data length from the data length, the processing from S3505 to S3602 is executed once again (S3603). Otherwise, the storage device generates a SCSI RSP command, which comprises the host name, the host logical device ID, the storage name, the storage logical device ID, the request tag and the logical block address, and transmits the SCSI RSP command to the redundant program (S3604). The storage device 21 finally deletes the record added in S3504 from the response information table 354, and the present processing is completed.

Figure 37:
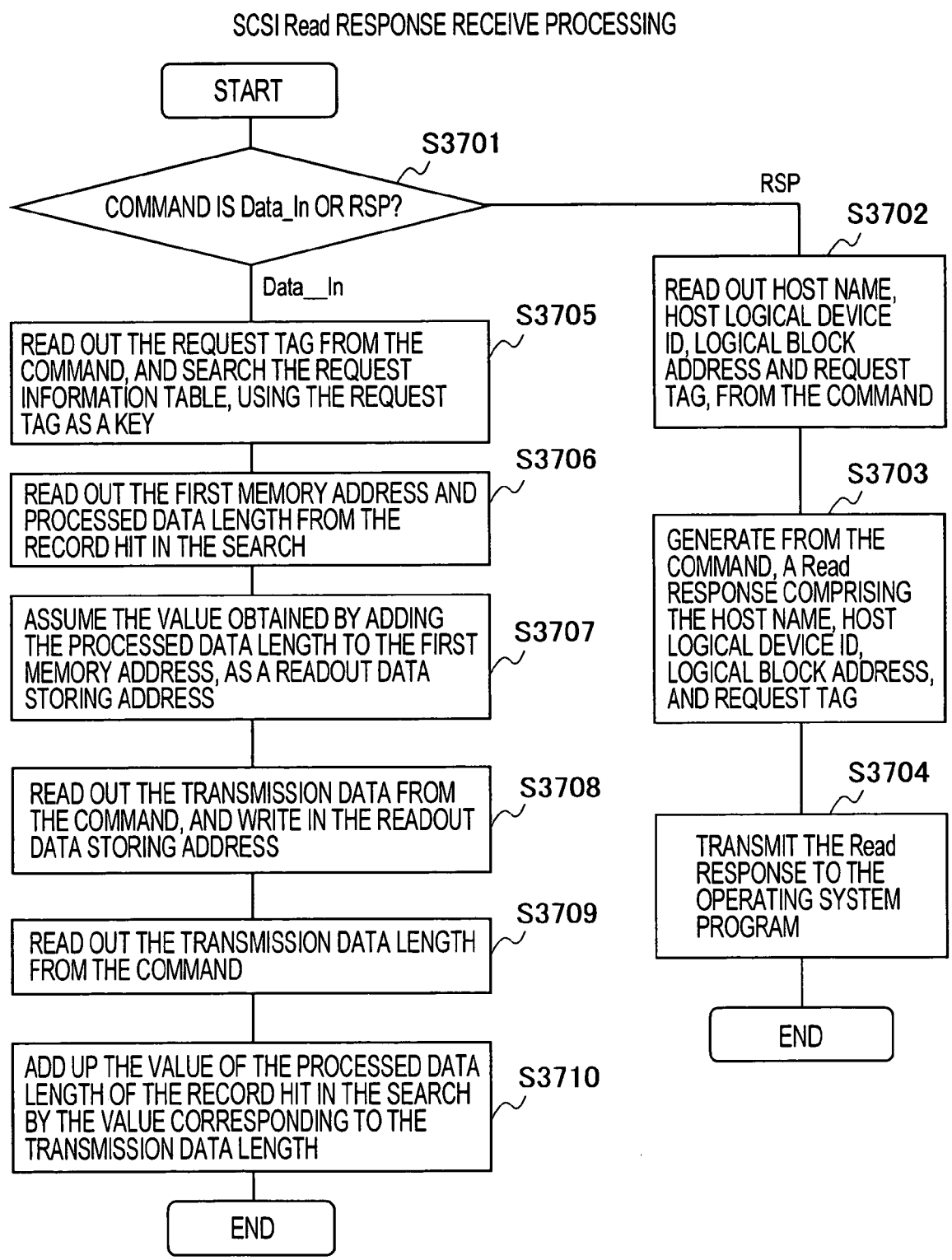
FIG. 37 is a flowchart showing operations of SCSI Read response receive processing according to the second embodiment of the present invention.

FIG. 37 is a flowchart showing operational procedures of the SCSI Read response receive processing (S3204, 3217) which is shown in FIG. 31 and FIG. 32. The CPU 175 of the host 28 executes the SCSI processing program, whereby the host 28 executes the above processing. The present processing firstly branches depending on whether the received command is a Data_In response or RSP response (S3701). If the received command is the RSP response, the host 28 reads out from the command the host name, the host logical device ID, the logical block address and the request tag (S3702), generates a Read response comprising the above elements (S3703), and transmits the Read response to the operating system program 266 (S3704). Then, the present processing is completed. On the other hand, when the command is a Data_In response, the host 28 reads out a request tag from the command, and searches the request information table using the request tag as a key (S3705). Next, the host 28 reads out the first memory address and the processed data length from the record hit in the search in S3705 (S3706), and the address obtained by adding the processed data length to the first memory address is assumed as a readable data storing address (S3707). Next, the host 28 reads out transmission data from the command, and writes the transmission data to the readout data storing address (S3708). Next, the host 28 reads out the transmission data length from the command (S3709), and adds up the value of the processed data length of the record hit in the search in S3705 by the value corresponding to the transmission data length (S3710). Then, the present processing is completed.

Figure 38:
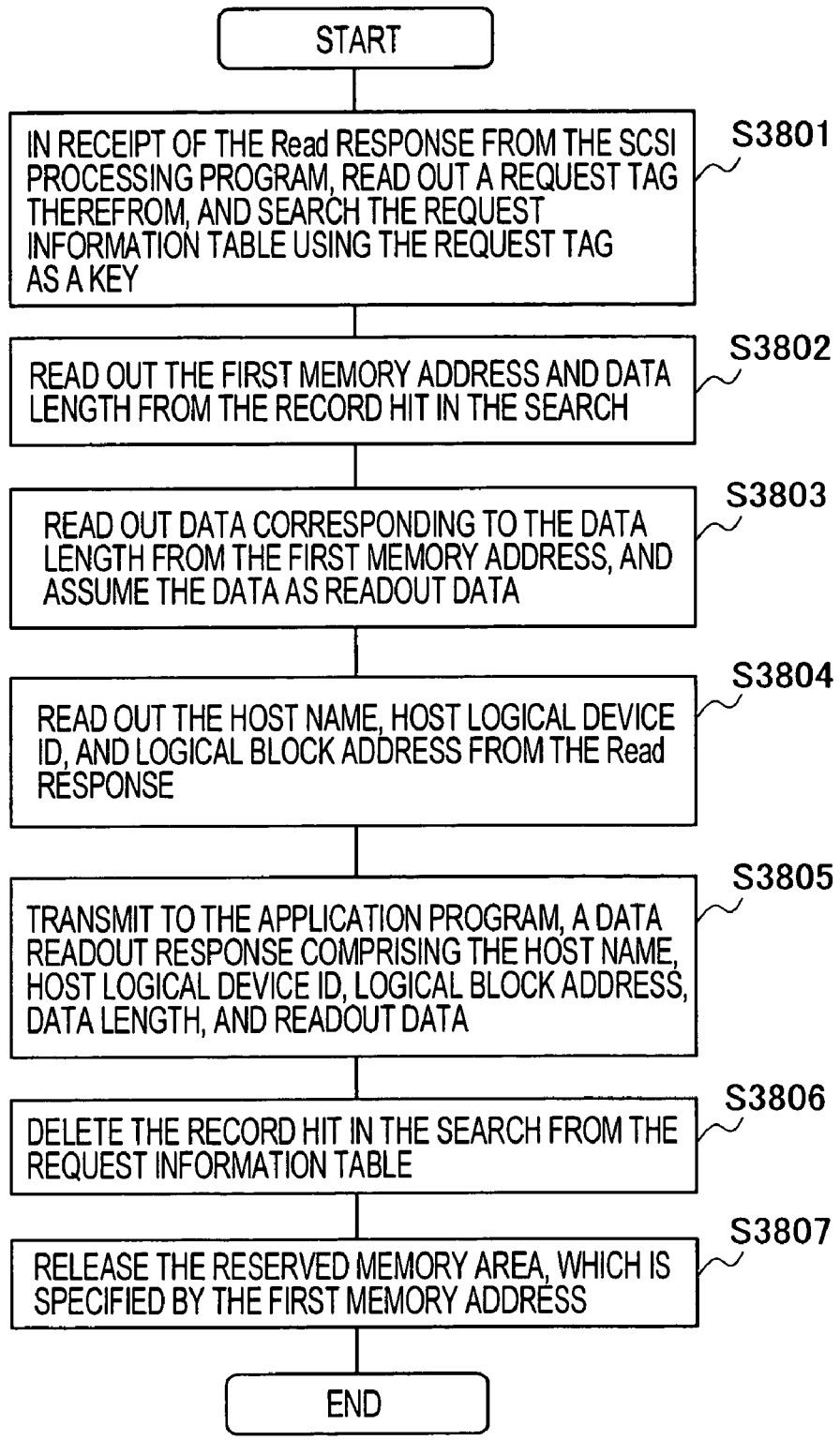
FIG. 38 is a flowchart showing the data readout response transmission processing according to the second embodiment of the present invention.

FIG. 38 is a flowchart showing the operational procedures of the data readout response transmission processing (S3218) as shown in FIG. 31 and FIG. 32. The CPU 175 in the host 28 executes the operating system program 266, whereby the host 28 executes the above processing. When the host 28 firstly receives a Read response, the host 28 reads out a request tag from the Read response, and searches the request information table 359 using the request tag as a key (S3801). Next, the host 28 reads out the first memory address and the data length from the record hit in the search in S3801 (S3802). Next, the host 28 reads out the data corresponding to the data length from the first memory address in the memory 179, and the data is assumed as readout data (S3803). Then, the host 28 reads out from the Read response, the host name, the host logical device ID, and the logical block address (S3804). Next, the host 28 transmits to the application program 267, a data readout response comprising the host name, the host logical device ID, the logical block address, the data length, the readout data master node name, the master logical device ID, the logical block address, the data length, and the readout data (S3805) Next, The host 28 deletes the record hit in the search from the request information table 359 (S3806). At the last, the host 28 specifies the already reserved memory area with the first memory address, and releases the memory area (S3807). Then, this process is completed.

As explained so far, also in the present embodiment, in the case where storage access is carried out by use of iSCSI, when a difference in transmission rate among a plurality of communication paths becomes large, searching is conducted in the wait-for-transmission requests in another communication path, for a request whose transmission is completed and a response thereto has been received in a certain communication path. When such a request is found, it is deleted. Accordingly, when there occurs a large difference in transmission rate among a plurality of communication paths due to a property of TCP/IP, it is possible to prevent that the number of wait-for-transmission requests in the network of low transmission rate becomes extremely larger than that in the network of high transmission rate. Furthermore, it is possible to prevent an increase of response time difference among the plurality of communication paths. Consequently, in the case of failure of communication path of high transmission rate, stagnation of storage access from the host can be prevented, and it is further possible to prevent a halt of the host application such as a database. In addition, useless data transmission can be cut down, and a waste of bandwidth of the communication path can be reduced.

It is to be noted that in each above-mentioned embodiment, all comprises two communication paths A and B. However, the present invention is not limited to this example. The present invention may be applied to an example including at least three communication paths. Furthermore, in the above embodiment, physically independent send/receive ports are provided in the respective communication paths, but only one send/receive port may be provided to a plurality of communication paths. In this case, the communication path branches into multiple paths over the port, with router and the like.

Further in all of the above mentioned embodiments, communication is established by use of TCP/IP, but the present invention is not limited to this example. Any other communication style may be applied as far as there is a response from a destination side, against data transmission from a sending source.

Furthermore, the above mentioned embodiments show examples where the present invention is applied to a mutual communication between storage devices, or a communication between the host and the storage device. However, the present invention is not limited to these examples, and it may be applied to any other communication device as far as they are communication devices mutually connected via a plurality of communication paths.

According to the present invention, if transmission data that is identical to another transmission data, whose transmission is completed in a certain communication path out of a plurality of communication paths, still remains in the transmission queue in a different communication path, the remaining transmission data is deleted, and it is not sent out into the different communication path. Accordingly, if there is a large difference in the transmission rates among a plurality of communication paths, it is possible to prevent that the number of wait-for-transmission data in the communication path of low transmission rate becomes extremely larger than the number of wait-for-transmission data in the communication path of high transmission rate. Therefore, it is possible to suppress the increase of response time difference among the plurality of communication paths. Furthermore, the data volume which is sent out in the communication path of low transmission rate can be cut down, whereby the transmission rate in this communication path can be enhanced.

What is claimed is:

1. A communication device which transmits data including an identifier to other communication device, via a plurality of communication paths, being different from one another, comprising:
    a plurality of transmission data storing areas which are provided with respect to each of said plurality of communication paths and temporarily store said data as transmission data;
    a redundant means which replicates and stores said transmission data in said plurality of transmission data storing areas respectively;
    a send/receive control means which transmits said transmission data stored in said plurality of data storing areas respectively to said other communication device via said plurality of communication path, being different from one another, and also receives data including an identifier (hereinafter, "receive data") via said plurality of communication paths, from said other communication device; and
    a redundant receive processing means which compares said identifier within said receive data received by said send/receive control means, with said identifier within said transmission data, when said receive data is determined to be the data associated with said transmission data, searches whether or not any one of said plurality of transmission data storing areas stores said replicated transmission data including an identifier associated with said identifier of said receive data, and if said transmission data is stored, deletes said transmission data.

2. A communication device which transmits data including an identifier to other communication device, via a plurality of communication paths, being different from one another, comprising:
    a memory having a plurality of storage areas provided in said plurality of communication paths respectively; and
    a processor which controls a communication with the other communication device,
    wherein,
        said processor replicates and stores said data as transmission data in said plurality of storage areas, transmits said transmission data stored in said plurality of storage areas to said other communication device via different communication paths respectively, out of said plurality of communication paths, also receives data including an identifier (hereinafter, "receive data"), via said plurality of communication paths, determines whether or not said receive data is associated with said transmission data according to said identifier within said receive data, searches whether or not any one of said plurality of storage areas stores said transmission data including an identifier associated with the identifier of said receive data, and if said transmission data is stored, deletes the transmission data thus searched.

3. A communication device according to claim 2, wherein,
    said memory includes a receive history information table which stores a history of said receive data thus received, and
    wherein,
        said processor determines from an identifier of said receive data thus received, whether or not identical receive data has already been recorded in said receive history information table; when the identical receive data is recorded, deletes the receive data which is received later; and when the identical receive data is not recorded, records information of said receive data in said receive history information table.

4. A communication device according to claim 3, wherein,
    said receive history information table is provided with a column of timeout value for holding information of the receive data, and
    wherein,
        said processor reduces the timeout value in said receive history information table, every constant period of time, and when the timeout value becomes zero, deletes the information of the receive data having the timeout value being zero from said receive history information table.

5. A communication device according to claim 4, wherein,
    said receive history information table is provided with a column of a counter value where an initial value of a number corresponding to said plurality of communication paths is set, and
    wherein,
        said processor decrements by one the counter value in said receive history information table, every time when the identical receive data is received, and when the number corresponding to said initial value has decreased, deletes the information of said receive data from said receive history information table.

6. A communication device according to claim 5, further comprising a storage unit which stores data.

7. A communication device according to claim 6, wherein, said processor transmits to said other communication device, the data stored or to be stored in said storage unit as transmission data.

8. A communication device according to claim 6, wherein,
    said processor stores in said storage unit, said receive data having been transmitted from said other communication device.

9. A storage system comprising:
    a processor;
    a first storage device;
    a second storage device;
    a management device connected to said first storage device and said second storage device; and
    a communication network which connects said first storage device said second storage device, wherein,
    said management device being connected with said first storage device and said second storage device,
    wherein,
        said management device transmits to said first storage device and to said second storage device, data for establishing a plurality of communication paths in said communication network between said first storage device and said second storage device,
    wherein,
        said first storage device further comprises:
        a memory having a plurality of storage areas which are provided in said plurality of communication paths respectively, and temporarily store data (hereinafter, "transmission data") to be transmitted to said second storage device and
        a processor which controls a communication with said second storage device; and
    wherein,
        said processor replicates and stores said transmission data together with an identifier corresponding to said transmission data, in each of said plurality of storage areas; transmits said transmission data stored in each of said plurality of storage areas to said second storage device via a plurality of different communication paths out of said plurality of communication paths, and also receives data including the identifier (hereinafter, "receive data") via said plurality of communication paths from said second storage device; if said receive data is determined to be associated with said transmission data according to said identifier within said receive data, searches whether or not there is stored in any one of said plurality of storage areas said transmission data including the identifier associated with the identifier of said receive data; and if said transmission data is stored, deletes said transmission data thus searched.

10. A storage system according to claim 9, wherein,
said memory includes a receive history information table which stores a history of said receive data thus received, and
wherein,
said processor determines from the identifier of said receive data thus received whether or not identical receive data has already been recorded in said receive history information table; if the identical receive data is recorded, deletes the receive data which is received later; and if the identical receive data is not recorded, records information of the receive data in said receive history information table.

11. A storage system according to claim 10, wherein,
said receive history information table is provided with a column of timeout value for holding said information of the receive data, wherein,
said processor reduces the timeout value of said receive history information table, every constant period of time, and when the timeout value becomes zero, deletes said information of the receive data having the timeout value being zero, from said receive history information table.

12. A storage system according to claim 11, wherein,
said receive history information table is provided with a column of a counter value where an initial value of a number corresponding to said plurality of communication paths is set, and
wherein,
said processor decrements by one the counter value in said receive history information table, every time when the identical receive data is received, and when the number corresponding to said initial value has decreased, deletes the information of said receive data from said receive history information table.

13. A storage system according to claim 12, wherein,
said second storage device further comprises:
a second memory having a plurality of second storage areas which are provided in said plurality of communication paths respectively, and temporarily store data (hereinafter, "second transmission data") to be transmitted to said first storage device; and
a second processor which controls a communication with said first storage device,
wherein,
said second processor stores said second transmission data together with identifiers corresponding to said second transmission data, respectively in said plurality of second storage areas; transmits said second transmission data respectively stored in said second storage areas to said first storage device via a plurality of different communication paths out of said plurality of communication paths; and also receives data including an identifier (hereinafter, "second receive data") via said plurality of communication paths from said first storage device; when said second receive data is determined to be associated with said second transmission data according to said identifier within said second receive data, searches whether or not there is stored in any one of said plurality of second storage areas, said second transmission data including the identifier associated with the identifier of said second receive data; and if said second transmission data is stored, deletes said second transmission data thus searched.

14. A storage system according to claim 13, wherein,
said second memory includes a receive history information table which stores a history of said second receive data thus received, and
wherein,
said second processor determines from the identifier of said second receive data thus received whether or not an identical second receive data has already been recorded in said receive history information table; if the identical second receive data is recorded, deletes the second receive data which is received later; and if the identical second receive data is not recorded, records the second receive data in said receive history information table.

15. A storage system according to claim 14, wherein,
said second receive history information table is provided with a column of timeout value for holding said information of the second receive data,
wherein,
said second processor reduces the timeout value of said receive history information table, every constant period of time, and when the timeout value becomes zero, deletes said information of the second receive data having the timeout value being zero from said receive history information table.

16. A storage system according to claim 15, wherein,
said receive history information table is provided with a column of a counter value where an initial value of a number corresponding to said plurality of communication paths is set, and
wherein,
said second processor decrements by one the counter value in said receive history information table, every time when the identical second receive data is received, and when the number corresponding to said initial value has decreased, deletes the information of said second receive data from said receive history information table.

17. A storage system comprising:
a processor;
a first storage device;
a second storage device;
a management device connected to said first storage device and said second storage device; and
a communication network which connects said first storage device said second storage device, wherein,
said management device being connected with said first storage device and said second storage device, wherein,
said management device transmits to said first storage device and to said second storage device, data for establishing a plurality of communication paths in said communication network between said first storage device and said second storage device,
wherein,
said processor replicates and stores said transmission data together with an identifier corresponding to said transmission data, in each of said plurality of storage areas; transmits said transmission data stored in each of said plurality of storage areas to said second storage device via a plurality of different communication paths out of said plurality of communication paths, and also receives data including the identifier (hereinafter, "receive data") via said plurality of communication paths from said second storage device; if said receive data is determined to be associated with said transmission data according to said identifier within said receive data, searches whether or not there is stored in any one of said plurality of storage areas said transmission data including the identifier associated with the identifier of said receive data; and if said transmission data is stored, deletes said transmission data thus searched, and wherein, said second storage device further comprises:

a second memory having a plurality of second storage areas which are provided in said plurality of communication paths respectively, and temporarily store data (hereinafter, "second transmission data") to be transmitted to said first storage device;

a second processor which controls a communication with said first storage device, wherein, said second processor replicates and stores said second transmission data together with an identifier corresponding to said second transmission data, in each of said plurality of second storage areas; transmits said second transmission data stored in each of said plurality of second storage areas to said first storage device via a plurality of different communication paths out of said plurality of communication paths, and also receives data including the identifier (hereinafter, "second receive data") via said plurality of communication paths from said first storage device; if said second receive data is determined to be associated with said second transmission data according to said identifier within said second receive data, searches whether or not there is stored in any one of said plurality of second storage areas, said second transmission data including the identifier associated with the identifier of said second receive data; and if said second transmission data is stored, deletes said second transmission data thus searched.

18. A communication method which transmits transmission data including a data identifier, via a plurality of different communication paths, from one communication device to another communication device, comprising the steps of:

a redundant step which replicates and stores said transmission data into each of transmission queues provided in said plurality of communication paths respectively, a send/receive step which transmits said transmission data stored respectively in said plurality of transmission queues via said plurality of communication paths, to said other communication device, and also receives from said other communication device, receive data including an identifier (hereafter "recieve data"), via said plurality of communication paths, and when said receive data is determined to be associated with said transmission data, according to said identifier within said receive data which is received in said send/receive step; searches whether or not any one of said plurality of transmission queues stores said transmission data including an identifier corresponding to the identifier of the receive data; and if the transmission data is stored, deletes the transmission data.

19. A communication method according to claim 18, wherein, a receive history information table for storing a history of receive data which is received in said send/receive step is prepared in advance, and wherein, said redundant step determines from the identifier of said receive data received in said send/receive step, whether or not identical receive data has already been stored in said receive history information table; and if the identical data is stored, deletes the receive data which is received later; and if the identical receive data is not stored, the information of the receive data is stored in the receive history information table.

20. A communication method according to claim 19, wherein, said receive history information table is provided with a column of timeout value for holding said information of the receive data, wherein, said communication method further comprises a registration processing which reduces the timeout value of said receive history information table, every constant period of time, and when the timeout value becomes zero, deletes said information of the receive data having the timeout value being zero, from said receive history information table.

* * * * *